United States Patent
Inagaki et al.

(10) Patent No.: US 7,939,002 B2
(45) Date of Patent: May 10, 2011

(54) RETARDATION FILM, METHOD FOR PRODUCING THE SAME, POLARIZING PLATE AND LIQUID CRYSTAL DISPLAY

(75) Inventors: Shinji Inagaki, Hachioji (JP); Takahiro Takagi, Sagamihara (JP); Koichi Saito, Kawagoe (JP)

(73) Assignee: Konica Minolta Opto, Inc., Tokyo (JP)

( * ) Notice: Subject to any disclaimer, the term of this patent is extended or adjusted under 35 U.S.C. 154(b) by 409 days.

(21) Appl. No.: 11/633,044

(22) Filed: Dec. 4, 2006

(65) Prior Publication Data

US 2007/0134446 A1 Jun. 14, 2007

(30) Foreign Application Priority Data

Dec. 8, 2005 (JP) ................... 2005-354828

(51) Int. Cl.
- B29C 55/00 (2006.01)
- B29C 49/08 (2006.01)
- B29D 7/00 (2006.01)

(52) U.S. Cl. ............... 264/289.6; 264/210.1; 264/210.7; 264/212; 264/216; 264/217; 264/288.4; 264/290.2; 264/342 RE

(58) Field of Classification Search ............... 264/210.1, 264/210.7, 212, 216, 217, 288.4, 290.2, 289.6, 264/342 RE
See application file for complete search history.

(56) References Cited

U.S. PATENT DOCUMENTS

| | | | |
|---|---|---|---|
| 3,551,546 A * | 12/1970 | Gosper et al. | 264/178 R |
| 6,517,762 B1 * | 2/2003 | Tsunekawa et al. | 264/290.2 |
| 6,562,274 B1 * | 5/2003 | Asakura et al. | 264/290.2 |
| 7,037,461 B1 * | 5/2006 | Denker et al. | 264/519 |
| 2003/0169391 A1 * | 9/2003 | Uchida et al. | 349/130 |
| 2004/0044127 A1 * | 3/2004 | Okubo et al. | 525/54.3 |
| 2005/0233095 A1 * | 10/2005 | Umeda et al. | 428/1.1 |
| 2005/0234231 A1 * | 10/2005 | Hashimoto et al. | 536/58 |

FOREIGN PATENT DOCUMENTS

WO WO 0145920 A1 * 6/2001

* cited by examiner

*Primary Examiner* — Christina Johnson
*Assistant Examiner* — Atul Khare
(74) *Attorney, Agent, or Firm* — Finnegan, Henderson, Farabow, Garrett & Dunner, L.L.P.

(57) ABSTRACT

A method of producing a long roll retardation film comprising the sequential steps of: (a) casting a film forming material on an endless support to form a long roll film; (b) stretching the long roll film in a lateral direction of the long roll film while both edges of the long roll film are held employing a plurality of clips for each of the edges in a tenter (First Process); (c) reducing distances in the lateral direction between the clips holding the both edges of the long roll film while the edges of the long roll film are held continuously from First Process with the clips (Second Process); (d) enlarging the distances in the lateral direction between the clips holding the both edges of the long roll film while the edges of the long roll film are held continuously from Second Process with the clips (Third Process).

7 Claims, 2 Drawing Sheets

RETARDATION FILM, METHOD FOR PRODUCING THE SAME, POLARIZING PLATE AND LIQUID CRYSTAL DISPLAY

This application is based on Japanese Patent Application No. 2005-354828 filed on Dec. 8, 2005, in Japanese Patent Office, the entire content of which is hereby incorporated by reference.

TECHNICAL FIELD

The present invention relates to a retardation film, a production method of the retardation film, a polarizing plate, and a liquid crystal display, and in particular, relates to a retardation film which minimizes light leakage and improves the dimensional stability under high temperature and high humidity of the polarizing plate, and enhances the front contrast of a liquid crystal display, a production method of the retardation film, a polarizing plate, and a liquid crystal display.

BACKGROUND OF THE INVENTION

Liquid crystal displays are widely employed as a display of liquid crystal TVs and computers since they can be directly connected to IC circuits and particularly, their thickness can be decreased. Such liquid crystal displays are basically structured in such a manner that polarizing plates are arranged on both sides of a liquid crystal cell.

In such liquid crystal displays, in view of contrast, a liquid crystal display employing twisted magnetic (TN) at a twist angle of 90 degrees, and a liquid crystal display employing super-twisted magnetic (STN) at a twist angle of at least 160 degrees have been developed. Recently, however, a vertical alignment (hereinafter also referred to as VA) type liquid crystal display has been developed. The VA type liquid crystal display exhibits features in which black reproduction is improved employing a liquid crystal cell of a so-called vertical orientation mode, contrast is higher, and the viewing angle is relatively wide compared to that of the TN and STN types.

However, as a liquid crystal image plane increases as seen in a large type TV, demand for an increase in the viewing angle has been pronounced, and to increase the viewing angle, retardation films have been employed. Consequently, the width of the retardation film tends to be more widened due to increased liquid crystal image planes.

For the above purpose, application of polymer films has been investigated. A TAC film commonly exhibits a constant retardation value (Rt) in the thickness direction, but results in a very small retardation value (Ro) in the in-plane direction. As a result, the TAC film has not been suitable to improve the viewing angle of displays such as the above VA type LCD.

Known as a film to overcome the above drawbacks is one exhibiting excellent uniformity of the retardation value, which is employed as a retardation film exhibiting a slow axis in the lateral direction, as well as a polarizing plate protecting film, by stretching a cellulose ester film in the lateral direction during casting.

However, in a large liquid crystal display, it is common knowledge that in the employed retardation film, the shift of the slow axis in the film plane results in a significant decrease in contrast. In order to secure the exhibited performance, a technique is disclosed which pays attention to the shift of the slow axis (refer, for example, to Patent Documents 1 and 2).

Furthermore disclosed as a specific method to retard the shift of the slow axis of a retardation film is one in which, by regulating the temperature during stretching to soften a film, non-uniform stretching is minimized (refer, for example, to Patent Document 3).

Further disclosed as a tenter stretching method is a technique in which a web is stretched in the first tenter device, and subsequently, in the second tenter device, the resulting web is further stretched in the lateral direction upon maintaining the web width at a constant value (refer, for example, to Patent Document 4).

Still further disclosed as a tenter stretching method is the following one (refer, for example, Patent Document 5). By employing a method to produce a stretched film via the first process in which a film is pre-heated at a constant distance between the clips, the second process in which the film is stretched in the lateral direction while gradually increasing the distance between the clips, and the third process in which the film is stretched in the lateral direction while gradually further increasing the distance between the clips, it is possible to produce a stretched film, composed of thermoplastic norbornene based resins, which results in no formation of bowing, exhibits uniform physical properties in the lateral direction and results in uniform thickness and uniform retardation.

However, as a retardation film for large displays, at present, any of these results in problems of contrast, dimensional stability against humidity and heat, and light leakage, and thus improvements of them have been sought.

(Patent Document 1) Japanese Patent Publication Open to Public Inspection (herein after referred to as JP-A) No. 11-160536
(Patent Document 2) JP-A No. 2002-22943
(Patent Document 3) JP-A No. 2001-215332
(Patent Document 4) JP-A No. 2002-311245
(Patent Document 5) JP-A No. 2005-254812

SUMMARY OF THE INVENTION

An object of the present invention is to provide a retardation film which minimizes light leakage and improves the dimensional stability of the polarizing plate under high temperature and high humidity, and enhances the front contrast of a liquid crystal display, a production method of the retardation film, a polarizing plate, and a liquid crystal display.

One of the aspects of the present invention to achieve the above object is a method of producing a long roll retardation film comprising the sequential steps of: (a) casting a film forming material on an endless support to form a long roll film; (b) stretching the long roll film in a lateral direction of the long roll film while both edges of the long roll film are held employing a plurality of clips for each of the edges in a tenter, the step (b) being designated as First Process; (c) reducing distances in the lateral direction between the clips holding the both edges of the long roll film while the edges of the long roll film are held continuously from First Process with the clips, the step (c) being designated as Second Process; (d) enlarging the distances in the lateral direction between the clips holding the both edges of the long roll film while the edges of the long roll film are held continuously from Second Process with the clips, the step (d) being designated as Third Process.

DESCRIPTION OF THE PREFERRED EMBODIMENTS

Figure 1:
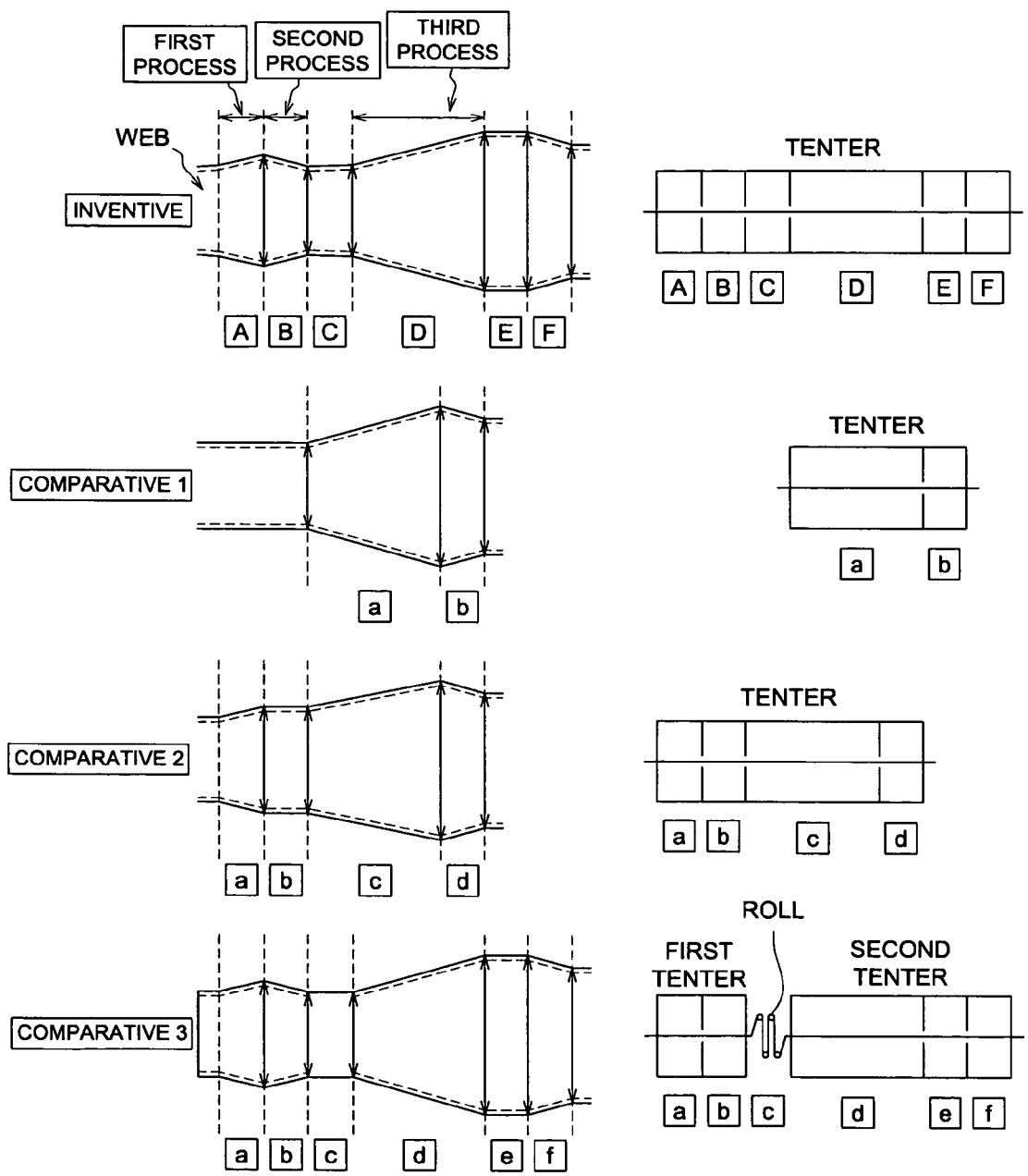
FIG. 1 shows one example of a stretching process (also referred to as a tenter process) to prepare the retardation film of the present invention.

The above object of the present invention is achieved by the following structures.

(1) A method of producing a long roll retardation film comprising the sequential steps of:

(a) casting a film forming material on an endless support to form a long roll film;

(b) stretching the long roll film in a lateral direction of the long roll film while both edges of the long roll film are held employing a plurality of clips for each of the edges in a tenter, the step (b) being designated as First Process;

(c) reducing distances in the lateral direction between the clips holding the both edges of the long roll film while the edges of the long roll film are held continuously from First Process with the clips, the step (c) being designated as Second Process; and (d) enlarging the distances in the lateral direction between the clips holding the both edges of the long roll film while the edges of the long roll film are held continuously from Second Process with the clips, the step (d) being designated as Third Process.

(2) The method of Item (1), wherein the long roll film is stretched in First Process so that a stretching force does not to exceed a yield point of the long roll film.

(3) The method of Item (1) or (2), wherein (i) a stretching ratio of the long roll film in First Process is 1.01 to 1.10;

(ii) a stretching ratio of the long roll film in Second Process is 0.90 to 0.99 based on a width of the long roll film stretched in First Process;

(iii) a stretching ratio of the long roll film in Third Process is 1.05 to 2.0 based on a width of the long roll film stretched in Second Process;

(iv) distances in the lateral direction between the clips are reduced while the edges of the long roll film are continuously held after Third Process is over.

(4) The method of any one of Items (1) to (3), wherein the long roll retardation film is a cellulose ester film.

(5) The method of Item (4), wherein a thickness of the cellulose ester film is 20 to 60 μm.

(6) The retardation film produced by the method of any one of Items (1) to (5).

(7) A polarizing plate having the retardation film of Item (6) adhered on a surface of a polarizing film.

(8) A liquid crystal display employing the polarizing plate of Item (7).

According to the present invention, it is possible to provide a retardation film which minimizes light leakage and improves the dimensional stability of the polarizing plate under high temperature and high humidity, and enhances the front contrast of a liquid crystal display, a production method of the retardation film, a polarizing plate, and a liquid crystal display.

Contrast, as described in the present invention, refers to front contrast unless otherwise specified.

The object of the present invention is to enhance the above front contrast. Front contrast, as described herein, refers to the contrast which is measured for the entire display panel from the normal direction of the display plane and does not refer to local contrast of any part of the display panel. For example, a phenomenon occurs in which the contrast decreases at the four corners of the display panel, or the contrast decreases locally in the form of a frame due to light leakage. However, these are generated locally and are not regarded as the front contrast which is to be improved in the present invention.

Contrast, as described in the present invention, refers to contrast of the entire display plane. Therefore, the mechanism is entirely different from a case in which a dynamic phenomenon such as local degradation of contrast under specified conditions (for example, an endurance test under high temperature and high humidity or under high temperature) is improved, and does not accord with the content of the present invention.

The preferred embodiments to realize the present invention will now be detailed, however the present invention is not limited thereto.

The present invention is characterized in that in the production method of a retardation film via stretching a continuously conveyed film employing a tenter stretching method, production is carried out via "First Process" in which at least both edges of the film in the lateral direction are held via holding devices and subsequently the film is stretched in the lateral direction by increasing the distance between the above holding devices, "Second Process" in which the distance between the holding devices is narrowed in the lateral direction, and "Third Process" in which the film is stretched in the lateral direction by again increasing the distance between the above holding devices. Holding devices, as described herein, refer to those, such as pins or clips, capable of holding a film, but the types are not particularly limited as long as they are devices capable of holding a film.

The inventors of the present invention conducted diligent investigation to overcome the above problems and achieved the present invention upon discovering the following novel findings. In order to minimize light leakage over the entire image plane during a black display and to enhance the front contrast, in a method to stretch a retardation film, major effects resulted by carrying out, prior to major stretching (being Third Process), pre-stretching (being First Process) and shrinkage (being Second Process) decreasing the distance between pins or clips in the lateral direction.

It is assumed that by carrying out pre-stretching and shrinkage prior to the main stretching, film-constituting polymers are quickly oriented in the stretched direction, whereby it is possible to retard formation (or crystallization) of microcrystals and micro-voids, and micro-phase separation of polymers and additives, resulting in reducing undesirable light leakage.

Heretofore, it has been known that in the tenter process, multistage stretching have been known. However, problems have occurred in which it is difficult to maintain a uniform slow axis direction in the lateral direction, and retardation values tend to fluctuate. This is due to difficulty of controlling the position of the holding devices, resulting in difficult in carrying out the multistage stretching.

To produce the retardation film according the present invention, it is preferable to produce it under the following production conditions, which are however not limited thereto.

(Production Method of Retardation Film of the Present Invention)

The production method of the retardation film of the present invention will now be detailed.

The retardation film of the present invention may be one which is produced by either a solution casting method or a melt casting method.

The retardation film of the present invention is characterized in that, as noted above, during stretching in the lateral direction, pre-stretching (being First Process) and contraction (being Second Process) of decreasing the distance between the holding devices in the lateral direction, prior to main stretching (being Third Process), are carried out. By doing so, it is possible to quickly orient film-constituting polymers in the stretching direction.

Further, the inventors of the present invention discovered that in order to improve front contrast, which is the object of the present invention, it was critical to minimize distortion of film-constituting polymers provided between the polarizing film and the liquid crystal cell. As noted above, in a stretched film, it is critical to eliminate causes which generate light leakage by quickly orienting the film-constituting polymers. For the same reason, in view of improvement in the front contrast, the film thickness is also critical. The thickness of the retardation film of the present invention is preferably at most 100 µm. When the film thickness increases, components, which result in the above light leakage, increases by the film thickness, and in addition, specifically, when the thickness exceeds 100 µm, light leakage tends to occur due to an increase in the film thickness. The film thickness is more preferably at most 80 µm.

Production of the retardation film of the present invention, employing the solution casting method, is carried out via a process in which a dope is prepared by dissolving, in solvents, polymers and additives such as plasticizers, described below, a process in which the resulting dope is cast onto a belt- or drum-shaped metal support, a process in which the cast dope is dried, a process in which the dried film is peeled from a metal support, a stretching process, another drying process, a process which thermally processes the resulting film, and a process which winds up the film after cooling. The retardation film of the present invention is one which incorporates polymers in an amount of 70-95% by weight with respect to the total solids.

Herein, cellulose ester is exemplified as a polymer preferably employed to proper the retardation film of the present invention and will now be described.

Initially described is the process for preparing a dope. A higher concentration of cellulose esters in the dope is preferred since it is possible to decrease the drying load after casting it onto the metal support. However, when the concentration of cellulose esters is excessively high, load increases during filtration, resulting in degradation of filtering accuracy. Concentration, which is compatible with both, is preferably 10-35% by weight, but is more preferably is 15-25% by weight.

Solvents employed in the dope of the present invention may be employed individually or in combinations of at least two types. In view of production efficiency, it is preferable to employ a mixture of good and poor solvents of cellulose esters, while in view of solubility of cellulose esters, it is preferable that the amount of good solvents is greater. A preferable mixing ratio is 70-98% by weight of good solvents and 2-30% by weight of poor solvents. Good solvents, as described herein, are defined as those which dissolve cellulose esters, while poor solvents, as described herein, are defined as those which do not dissolve or swell cellulose esters. Therefore, depending on the degree of acyl group substitution, a good solvent may become a poor solvent. For example, when acetone is used as a solvent, it becomes a good solvent for the acetic acid ester of cellulose ester (at a degree of acetyl group substitution of 2.4), while acetic acid ester of cellulose (at a degree of acetyl group substitution of 2.8) becomes a poor solvent.

Good solvents employed in the present invention are not particularly limited and include organic halogen compounds such as methylene chloride or dioxolanes, acetone, methyl acetate, and methyl acetacetate. Of these, methylene chloride or methyl acetate is particularly preferred.

Further, poor solvents employed in the present invention are also not particularly limited. Preferably employed examples include methanol, ethanol, n-butanol, cyclohexane, and cyclohexanone. It is preferable that dope incorporates water in an amount of 0.1-2% by weight.

Common solvents may be employed as a method for dissolving cellulose ester during preparation of the above dope. When heating is carried out under pressure, temperature may be raised to be equal to or higher than the boiling point exhibited at normal pressure. It is preferable that dissolution is carried out while stirring in a solvent which is heated to at least its boiling point at normal pressure within the range in which the solvent does not boil, since generation of lumped insoluble materials, called a gel and the like, is minimized. Further, a method is also preferably employed in which cellulose ester is mixed with poor solvents to be dampened or swollen, and subsequently, dissolution is carried out by further adding good solvents.

Pressure may be increased employing a method in which inert gasses are introduced under pressure, or a method in which the vapor pressure of solvents is elevated via heating. It is preferable that exterior heat is supplied. For example, a jacket type heater is preferable since the temperature is more readily controlled.

When heating is carried out after the addition of solvents, in view of solubility of cellulose ester, a higher heating temperature is preferred, but when the heating temperature is too high, such temperature increase results in lowered productivity. Heating temperature is preferably 45-120° C., is more preferably 60-110° C., but is still more preferably 70-105° C. Further, pressure is set so that the solvents do not boil.

Alternatively, a cooling dissolution method is also preferably employed, which enables dissolution of cellulose esters in solvents such as methyl acetate.

Subsequently, the resulting cellulose ester solution is filtered employing an appropriate filter, such as filter paper. In order to remove insoluble materials, filters exhibiting high absolute filtration accuracy are preferred. However, when the absolute filtration accuracy is excessively high, problems occur in which clogging of filters tends to occur. Accordingly, the absolute filtration accuracy of filters is preferably at most 0.008 mm, is more preferably 0.001-0.008 mm, but is still more preferably 0.003-0.006 mm.

Filter materials are not particularly limited, and most common filters may be employed. However, preferred are plastic filters composed of polypropylene or TEFLON (being a registered trade name) and metal filters composed of stainless steel, which do not release of fibers. It is preferable to remove and decrease impurities incorporated in cellulose esters of raw materials, especially those resulting in foreign matter bright spots.

"Foreign matter bright spots", as described herein, refer to spots (foreign matter) which are identified as follows. A cellulose ester film is placed between two polarizing plates arranged in crossed Nicols, and light is exposed on one side of a polarizing plate. When the other side of the polarizing plate is viewed, foreign matter bright spots are seen as a spot which is formed by leakage of light exposed to the other side. The number of bright spots, at a diameter of at least 0.01 mm, is preferably at most $200/cm^2$, is more preferably at most $100/cm^2$, is still more preferably at most $50/cm^2$, but is most preferably $0\text{-}10/cm^2$. Further, it is preferable that the number of bright spots at a diameter of at most 0.01 is small as possible.

It is possible to filter a dope employing any of the conventional methods. However preferred is a method in which filtration is carried out while heated at equal to or higher than the boiling point of solvents at normal pressure, and in the range in which the solvents do not boil, since the increase in the difference in filtration pressure (called pressure difference) prior to and after filtration is small. The temperature is preferably 45-120° C., is more preferably 45-70° C., but is most preferably 45-55° C.

It is preferable that the filtration pressure is as low as possible. The filtration pressure is preferably at most 1.6 MPa, is more preferably at most 1.2 MPa, but is most preferably at most 1.0 MPa.

Dope casting will now be described.

The surface of the metal support during the casting process is preferably subjected to mirror finishing. Preferably employed as a metal support is a stainless steel belt or a cast drum of which surface is plated. The casting width may be 1-4 m. The surface temperature of the metal support during the casting process is set between −50° C. and the temperature at which solvents do not volatilized due to boiling. A higher temperature is preferable since it is possible to increase the drying rate of the web, however when the temperature is excessively high, the web occasionally releases gas and results in poor film flatness. The set temperature of the support is preferably 0-100° C., but is more preferably 5-30° C. A method is also preferred in which a web is allowed to gel upon cooling and is peeled from the drum while incorporating residual solvents in a large amount. Methods to control the temperature of the metal support are not particularly limited and include a method to blow heated or cooled air or a method in which heated water is brought into contact with the rear surface of the metal support. Heated water is more preferably employed since heat is more efficiently transmitted, whereby temperature of the metal support reaches the specified value more quickly. When heated air is employed, upon considering a decrease in temperature due to latent heat of vaporization, air flow is occasionally employed which is at a higher temperature than the targeted temperature while employing heated air at a higher temperature then the boiling point of solvents to prevent volatilization. Specifically, it is preferable that upon changing temperature of the support and the drying air flow between the casting and the peeling, drying is more efficiently carried out.

In order that a cellulose ester film exhibits desired flatness, the residual solvent amount of a web, when peeled from the metal support, is preferably 10-150% by weight, is more preferably 20-40% by weight or 60-130% by weight, but is most preferably 20-30% by weight or 70-120% by weight. Further, the temperature set at the peeling position on the above metal support is preferably −50 to 40° C., is more preferably 10-40° C., but is most preferably 15-30° C.

In the present invention, the residual solvent amount is defined by the following formula.

Residual solvent amount (% by weight)=$\{(M-N)/N\} \times 100$ wherein M represents the weight of a sample taken at an optional point during or after production, and N represents the weight of the sample after being dried at 115° C. for one hour.

Further, during the drying process of a cellulose ester film, a web is peeled from the metal support and is further dried so that the residual solvent amount reaches at most 0.5% by weight.

In a film drying process, commonly employed is a system in which a web is dried while being conveyed employing a roller drying system (a system in which a web is passed over numerous upper and lower rollers in a staggered state and dried) or employing a tenter system.

During peeling the web from the above metal support, the web is stretched in the longitudinal direction via peeling tension and subsequent conveying tension. Consequently, in the present invention, when the web is peeled from the casting support, it is preferable that peeling is carried out in such a state that the conveying tension is dropped to the lowest possible value. Specifically, it is effective to set it, for example, in the range of 50-170 N/m. In such a case, an enhancing effect of the present invention, is that it is preferable to quickly fix the web by blowing cooled air at equal to or less than 20° C.

One example of a stretching process (also called a tenter process) to produce the retardation film according to the present invention will now be described with reference to FIG. 1, but the present invention is not limited thereto. Further, description is made with reference to an example in which clips are employed as holding devices. In FIG. 1, the arrow represents stretching or shrinkage in the lateral direction, and unchanged arrow length means that the film width remains unchanged.

In the example of the present invention, shown in FIG. 1, stretching is carried out via the following processes in a tenter: First Process (A) is one in which pre-stretching is carried out while holding both edges of the web employing a plurality of clips for each of the edges; Second Process (B) is one in which the distances between the clips are reduced in the lateral direction of the film while holding both edges of the web continuously from First Process (A) without releasing the clips; process (C) is one in which the distances between the clips are maintained while holding both edges of the web continuously from Second Process (B) without releasing the clips; Third Process (D) is one in which main stretching is carried out by enlarging the distances between the clips in the lateral direction to stretch the film in the lateral direction, while holding both edges of the web continuously from the process (C) without releasing the clips; and clip distance holding process (E), and clip distance reducing process (F). Each of the processes corresponds to each of zones A-F in the schematic tenter view. It is preferable that stretching is carried out while changing conditions such as temperature and humidity of each process. In such a case, it is also preferable to arrange a neutral zone between the different temperature zones so that no interference occurs between the zones.

In conventional stretching processes, a film in which polymers are oriented in the longitudinal direction due to force applied in the longitudinal direction (hereinafter also referred to as the film-conveying direction or the MD direction) is stretched without any treatment in the lateral direction (the direction in right angles to the film-conveying direction, or the TD direction), whereby problems have occurred in which when stretching is carried out in the lateral direction, distortion remains.

In the present invention, orientation in the longitudinal direction is minimized via the pre-stretching in First Process to result in orientation in the lateral direction. Thereafter, while maintaining clip holding, the width is reduced and relaxed (in such a state in which no tension is applied in the longitudinal direction), and subsequently, stretching in the lateral direction is carried out, whereby it is possible to produce a stretched film exhibiting minimal distortion. Namely, in the present invention, it is possible to produce a stretched film resulting in minimal distortion by performing the First Process stretching (being the pre-stretching) and by continuously holding the film employing film holding devices so that no tension is applied in the longitudinal direction during Third Process stretching (being the main stretching).

Comparative (1) in FIG. 1 is an example in which main stretching is only carried out without First Process stretching (pre-stretching), whereby distortion results due to effects of tension in the longitudinal direction. Further, as shown in Comparative (2), in the case in which a heating zone, in which the distance between clips remains constant, is located between the first stretching and the second stretching, the degree of relaxation is relatively small due to no change of the distance between the clips, whereby any distortion remains. Further, as shown in Comparative (3), in the case in which a film is released from clips by conveying the film between the first tenter and the second tenter, conveying tension is applied in the longitudinal direction, resulting in distortion in the longitudinal direction. The stretching process of the present invention includes a short-time release of a holding device followed by re-gripping, for example, for the purpose of changing the holding device, however, preferable is to carry out whole the stretching process, namely, First Process through Third Process, without releasing the holding device.

Accordingly, in the present invention, by continuing clipping and gradually reducing the distance between the clips, it is possible to produce a stretched film resulting in minimal distortion.

Pre-stretching, which is First Process of the present invention, is carried out under the following temperature conditions to result in a stretching ratio preferably to be in the range of a factor of 1.01-1.1 in the lateral direction, but is more preferably in the range of a factor of 1.02-1.05. The "stretching ratio" herein refers to a value of: (the width of the stretched film (P)) divided by (the width of the film before stretching (Q)), namely, the value of (P/Q). Further, in the present invention, stretching during the first stretching process does not exceed the yield point of the stretched film. "Yield point", as described herein, refers to the stress limit which initiates plastic deformation when exceeding the elastic limit of the film.

The yield point of the film can be measured, for example, by the following method: providing a load cell at a clip portion of a tenter; increasing the stretching ratio in the lateral direction of the film while measuring the load; and determining the yield point by detecting the point when the measuring load begins to decrease. The stretching in First Process is oreferabky carried out within the yield point.

Subsequently, in Second Process in which the distances between the clips is reduced in the lateral direction, the film is preferably shrunk in the stretching ratio of 0.8-0.99, more preferably 0.90-0.99 and still more preferably 0.95-0.99, based on the film width after First Process is over.

Thereafter, in the main stretching during the Third Process, stretching is preferably carried out at a stretching factor of 1.05-2 based on the film width after completing Second Process but is more preferably a stretching factor of 1.15-1.5.

Stretching time is preferably short. However, in view of web uniformity, the range of the stretching time required as the shortest required time is specified. In practice, the stretching time is preferably in the range of 1-10 seconds, but is more preferably in the range of 4-10 seconds. The effective temperature of the above film during stretching is in the range within glass transition temperature $-30--1°$ C., but is preferably 100-160° C.

In the above tenter process, the heat transfer coefficient may be a constant or vary. The heat transfer coefficient is preferably in the range of $41.9-419 \times 10^3$ J/m² hr, is more preferably in the range of $41.9-209.5 \times 10^3$ J/m² hr, but is most preferably $41.9-126 \times 10^3$ L/m² hr.

Stretching in the lateral direction may be carried out at a constant or variable rate. The stretching rate is preferably 50-500%/min, is more preferably 100-400%/min, but is most preferably 200-300%/min.

In the tenter process, in view of enhancing web uniformity, it is preferable that the temperature distribution in the lateral direction in the ambience is narrow, and the temperature distribution in the lateral direction in the tenter process is preferably within ±5° C., is more preferably within ±2° C., but is most preferably ±1° C. By narrowing the above temperature distribution, it is expected that the temperature distribution of the web in the lateral direction can also be narrowed.

Further, in the present invention, in order to carry out the orientation of polymers at high accuracy, it is also preferable to employ a tenter in which the left and right web holding distances (being the distance between the holding start and the holding end) can be independently controlled employing right and left tenter holding means.

Specifically, as is seen in the present invention, when stretching, shrinkage and stretching are repeated employing holding devices, it has been difficult to make the slow axis direction the same. However, by independently controlling the left and the right, it is possible to achieve accurate control.

Figure 2:
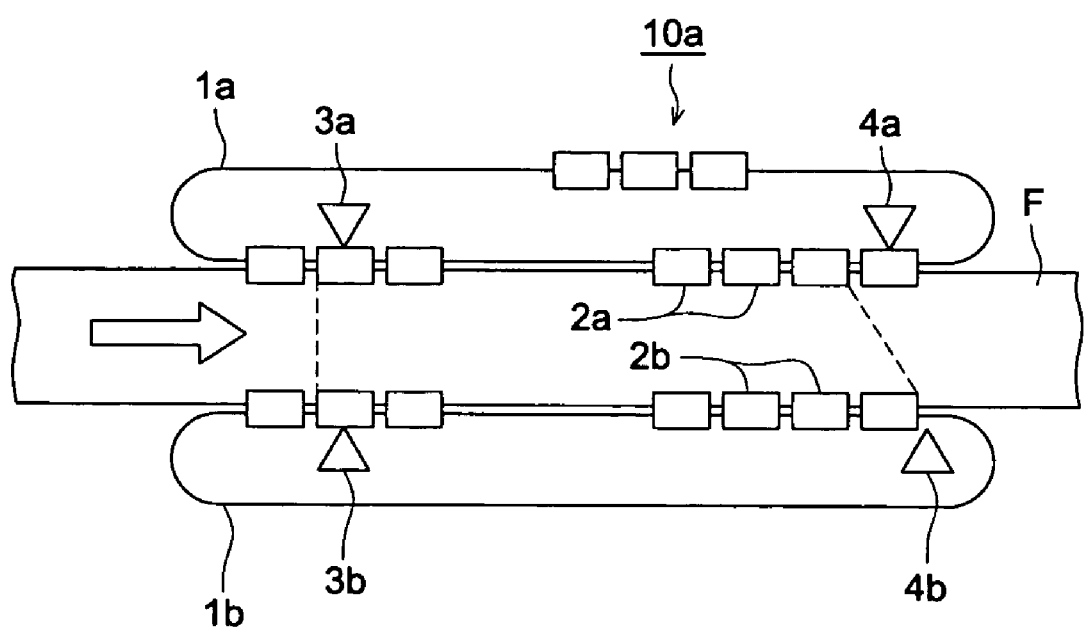
FIG. 2 is a schematic view of one example of tenter stretching apparatus 10a preferably employed in the present invention.

A Specific means, in which by independently controlling the distances of portions holding the left and right edges in a tenter stretching apparatus, the left web holding distance is made different from the right web holding distance include, for example, one shown in FIG. 2. FIG. 2 schematically shows one example of a preferably employed tenter stretching apparatus 10*a* to produce the polymer film employed in the present invention. As seen in FIG. 2, the left holding initiation position of the left holding means 2*a* (being a clip) is made to differ from the right one of the right holding means 2*b* (being a clip). Namely, by making the left holding initiation position differ from the right holding position via making the position of clip closer 3*a* different from that of clip closer 3*b*, the left holding distance of resin film F in tenter 10*a* is made to differ from the right holding distance of the same, resulting in a force which twists resin film F in tenter 10*a*, whereby it is possible to correct any position shift due to conveyance in outside of tenter 10*a*, and it is then possible to effectively minimize film meandering and stretching even though the conveying distance from the peeling section to the tenter section increases, and to minimize formation of wrinkles.

Tenter stretching apparatus 10*a* is schematically illustrated in FIG. 2. In practice, of many clips 2*a* and 2*b* arranged in one line on paired left and right rotation driving apparatus (ring-shaped chains) composed of a looped chain, the tracks of the left and right chains 1*a* and 1*b* are arranged so that clips 2*a* and 2*b* of the linearly moving portion on the outward chain side which pulls the film F, while holding its left and right edges, gradually leave in the lateral direction of film F, whereby stretching is applied in the lateral direction of the film F. In FIG. 2, 4*a* and 4*b* represent clip openers on the left hand side and right hand side, respectively.

Further, in the present invention, in order to accurately compensate for wrinkles, stretching, and distortion, it is preferable to install an apparatus which corrects meandering of the long roll film. It is preferable to employ meandering correction devices such as an edge position controller (also called EPC) and a center position controller (also called CPC), described in JP-A No. 6-8663. These devices detect film edges via an air servo sensor or a light sensor, and control the conveying direction based on the collected data so that the film edges and the center in the lateral direction are returned to the specified conveying position. As the actuator, specifically, meandering is corrected by waving left and right (or up and down) one or two guide rollers or a flat expander capable of being driven with respect to the line direction, or by clipping and pulling the film employing one set of paired downsized pinch rollers (one being arranged on the surface side and the rear side of the film, namely on both sides of the film) (being a cross-guider system). Meandering correction principles of these devices are as follows. During film conveyance, for example, when the film tends to run toward the left side, in the former system, a method is employed in which the roller is inclined so that the film is directed toward the right, while in the latter system, the pinch roller of one set on the right side is nipped so that the film is pulled toward the right. It is preferable that at least one of these meandering correction devices is installed between the film peeling position and the tenter stretching apparatus.

After the tenter process, it is preferable to arrange a post-drying process (hereinafter referred to process D1).

Web conveying tension during process D1, though affected by physical properties of the dope, the residual solvent amount during peeling and process D0, and the temperature during process D1, is preferably 120-200 N/m, is more preferably 140-200 N/m, but is most preferably 140-160 N/m.

To minimize elongation of a web in the conveying direction, it is preferable to arrange a tension cutting roller.

Methods to dry a web are not particularly limited, and commonly, it is possible to carry out drying employing heated air flow, infrared radiation, heating rollers and microwaves. Of these, in view of simplicity, it is preferable to carry out drying employing heated air flow.

In the web drying process, it is effective to carry out a thermal process at a temperature of preferably at most glass transition point of the film −5° C. to at least 100° C. for at least 60 minutes. A practical drying temperature range is preferably 100-200° C., is more preferably 110-160° C., but is most preferably 105-155° C. It is preferable to carry out the thermal process while conveying the web under an ambience in which the frequency of ambient air replacement is commonly at least 12 times/hour, but preferably 12-45 times/hour.

To enhance desired effects of the present invention, the free volume radius determined by the positron annihilation lifetime spectroscopy is preferably 0.250-0.350 nm, is more preferably 0.250-0.310 nm, but is most preferably 0.270-0.305 nm.

"Free volume", as described herein, refers to void portions which are not occupied by the molecular chains of cellulose resins. It is possible to determine the above free volume employing positron annihilation lifetime spectroscopy. In practice, time from the exposure of positrons onto a sample, to their annihilation is determined, and based on the annihilation lifetime, it is possible to obtain the free volume value via non-destructive observation of atom voids, the size of the free volume, and the concentration based on the number.

<Measurement of Free Volume Radius Employing Positron Annihilation Lifetime Spectroscopy>

The positron annihilation lifetime and relative intensity were determined under the following measurement conditions.

(Measurement Conditions)
Positron beam source: 22NaCl (at an intensity of 1.85 MBq)
  Gamma radiation detector: plastic scintillator and photo-multiplier tube
Device time resolution capacity: 290 ps
Measurement temperature: 23° C.
Total count: 1,000,000 counts Sample size: A sample was cut to 20 mm×15 mm pieces which were stacked to reach a thickness of about 2 mm.

Each samples was vacuum-dried 24 hours prior to measurement.

Exposure area: about 10 ϕmm
Time per channel: 23.3 ps/channel

Under the above measurement conditions, positron annihilation lifetime measurements were carried out. Three-component analysis was performed employing the method of least squares, and the annihilation lifetimes were designated as $\tau_1$, $\tau_2$, and $\tau_3$, which started from the shortest life tome value, while intensities corresponding to the lifetime were designated as I1, I2, and I3 (I1+I2+I3=100%). Free volume radius R3 (in nm) was obtained based on the following formula while employing the longest average annihilation lifetime $\tau_3$. It is assumed that $\tau_3$ corresponds to positron annihilation in voids, and as $\tau_3$ increases, the void size also increases.

$$\tau_3 = (1/2)[1 - \{R3/(R3+0.166)\} + (1/2\pi)\sin\{2\pi R3/(R3+0.166)\}]^{-1}$$

wherein 0.166 (nm) corresponds to the thickness of the electron layer exuded from the wall of the void.

Measurements were repeated twice and the resulting average value was obtained.

Positron annihilation lifetime spectroscopy is described, for example, in Material Stage Vol. 4, No. 5, 2004 pages 21-25, Toray Research Center, THE TRC NEWS, No. 80 (July 2002) pages 20-22, and in "Bunseki (Analysis), 1988, pages 11-20", under the title of "Yodenshi shometsuho niyoru kobunshi no jiyu taiseki no hyoka (Evaluation of Free Volume of Polymers Based on Positron Annihilation Method)", and these may be employed for reference.

Methods to regulate the free volume radius of the above retardation film are not particularly limited, and it is possible to regulate it employing the following methods.

The retardation film of a free volume radius of 0.250-0.310 determined by the positron annihilation lifetime spectroscopy may be prepared as a preferable polarizing plate protective film as follows. A web is prepared by casting a dope incorporating cellulose derivatives and plasticizers. After stretching the resulting web in the presence of solvents, drying is carried out to reach a residual solvent value to at most 0.3%, whereby a cellulose resin film is prepared. Subsequently, the resulting film is processed, while conveyed, between 105-155° C. under an ambience in which the ambient air is replaced at a frequency of at least 12 times/hour, but preferably at a frequency of 12-45 times/hour.

The frequency of ambient air replacement refers to the frequency of replacement of the air in the heat processing chamber with fresh air, which is calculated by the following formula. Fresh air, as described herein, does not refer to air, which is reused via circulation, but fresh air which does not incorporate any vaporized solvents or plasticizers, or has been subjected to removal of those.

Frequency of replacement of ambient air=$FA/V$(frequency/hour)

wherein V is the size (m³) of a heat processing chamber) and FA is the rate (m³/hour) of air flow.

Further, in order to produce the retardation film of the present invention, it is preferable that pressure in the range of 0.5-10 kPa in the direction of the thickness is applied onto a film during the thermal process after drying. It is preferable that uniform pressure is applied employing, for example, a nip roller. When pressure is applied in the thickness direction, it is preferable that drying is completely finished. In such a case, it is possible to control the free volume and entire free volume parameters of the retardation film by applying pressure of 0.5-10 kPa onto both sides of the film. A specific method is available in which pressure is applied employing two parallel nip rollers, while a method employing calendering rollers may also be employed. During application of pressure, the temperature is preferably 105-155° C.

After the specified heat processing, in order to obtain good roll formation, it is preferable to slit off edges employing a slitter which is arranged prior to winding. Further, it is preferable to apply a knurling treatment to both edges.

It is possible to achieve knurling embossing via pressing a heated embossing roller onto a film edge. Minute unevenness is formed on the embossing roller, and by pressing it onto a film, corresponding unevenness is formed on the film, whereby it is possible to increase the bulk height of edges.

The height and width of knurling of both edges in the lateral direction of the retardation film of the present invention are preferably 4-20 µm and 5-20 mm, respectively.

Further, in the present invention, it is preferable that the above knurling treatment is carried out after drying or prior to winding in the film casting process.

Still further, it is preferable to employ a retardation film composed of a multilayer which is prepared employing a co-casting method.

It is possible to cast the retardation film of the present invention employing not only the above solution casting method but also a melt casting method. After drying a mixture of cellulose esters, plasticizers, UV absorbers, and antioxidants, to be described below, employing heated air flow or under vacuum, the resulting mixture is melt-extruded from a T type die to form a film, brought into close contact with a cooling drum employing an electrostatic charge applying method, and solidified via cooling, whereby a film to be stretched is prepared. Subsequently, it is preferable to carry out the stretching operation according to the present invention. During the above operation, it is preferable that the temperature of the cooling drum is maintained within 90-150° C.

Melt extrusion may be carried out employing a uniaxial extruder, a biaxial extruder, and further another uniaxial extruder downstream, which is connected to a biaxial extruder. However, in terms of mechanical and optical characteristics of the resulting film, it is preferable to employ the uniaxial extruder. Further, it is preferable that the ambience in material feeding and the melting process such as a raw material tank, a raw material charging section, and the interior of the extruder is replaced with inert gases such as nitrogen gas or is placed under reduced pressure.

Temperature during the above melt-extrusion is preferably in the range of 150-250° C., but is more preferably in the range of 200-240° C. It is possible to carry out the melt casting method based on the method described in JP-A No. 2000-352620.

With respect to retardation film according to the present invention, preferable requirements include such as easy manufacturing, good adhesion with polarizer film and to be optically transparent, and polymer film is specifically preferable.

To be transparent referred in the present invention indicates that transmittance of visible light is not less than 60%, preferably not less than 80% and specifically preferably not less than 90%.

The aforesaid polymer film is not specifically limited provided having the above-described characteristics, however, includes cellulose ester type film such as cellulose diacetate film, cellulose triacetate film, cellulose acetate butyrate film and cellulose acetate propionate film, polyester type film, polycarbonate type film, polyaryrate type film, polysulfon (including polyethersulfon) type film, polyester film such as polyethylene terephthalate and polyethylene naphthalate, polyethylene film, polypropylene film, cellophane, polyvinylidene chloride film, polyvinyl alcohol film, ehtylenevinyl alcohol film, syndiotactic polystyrene type film, polycarbonate film, cycloolefin type polymer film (Arton, manufactured by JRS Corp.), Zeonex and Zeonoa (manufactured by Nippon Zeon Corp.), polymethylpentene film, polyether ketone film, polyether ketone imide film, polyamide film, fluorine resin film, nylon film, polymethylmethacrylate film, acryl film and a glass plate. Among them, preferable are cellulose ester type film, cycloolefin polymer film, polycarbonate type film and polysulfon (including polyethersulfon) type film, and in the present invention, specifically preferably utilized are cellulose ester type film, cycloolefin polymer film and polycarbonate type film, with respect to such as manufacturing, a cost aspect, transparency and an adhesive property. These films may be those manufactured either by a fusion casting method or a solution casting method.

Further, retardation film of the present invention is also preferably polymer film, in which an optical anisotropic layer comprising a polymer layer of such as polyamide and polyimide is provided on the above-described film, which is described in such as JP-A Nos. 2000-190385, 2004-4474 and 2005-195811.

[Cellulose Ester Film]

Cellulose ester preferable as a primary component of retardation film according to the present invention is preferably cellulose acetate, cellulose propionate, cellulose butyrate, cellulose acetate butyrate, cellulose acetate phthalate and cellulose acetate propionate, and among them, cellulose acetate butyrate, cellulose acetate phthalate and cellulose acetate propionate are specifically preferably utilized.

Specifically, utilized is a transparent film substrate provided with mixed fatty acid ester of cellulose having X and Y of the following range, when a substitution degree of an acetyl group is X and a substitution degree of a propionyl group or a butyryl group is Y.

$$2.0 \leq X+Y \leq 2.6 \qquad \text{Equation (I)}$$

$$0.1 \leq Y \leq 1.2 \qquad \text{Equation (II)}$$

Further, cellulose acetate propionate satisfying $2.4 \leq X+Y \leq 2.6$ and $1.4 \leq X \leq 2.3$ (total substitution degree of an acyl group=X+Y) is preferable. Among them specifically preferable are cellulose acetate propionate and cellulose acetate butyrate satisfying $2.4 \leq X+Y \leq 2.6$, $1.7 \leq X \leq 2.3$ and $0.1 \leq Y \leq 0.9$ (total substitution degree of an acyl group=X+Y). The portion not substituted with an acyl group generally exists as a hydroxyl group. These cellulose esters can be synthesized by a method well known in the art.

In the case of utilizing cellulose ester film as retardation film according to the present invention, cellulose as a raw material of cellulose ester is not specifically limited, however, includes such as cotton linter, wood pulp (derived from an acerose tree, and a broard-leaved tree) and kenaf.

Further, cellulose esters prepared from them can be utilized by mixing at an arbitrary ratio, respectively. These cellulose esters can be prepared, when an acylation agent is acid anhydride (such as acetic acid anhydride, propionic acid anhydride and butyric acid anhydride), by utilizing an organic solvent such as organic acid like acetic acid and methylene chloride and reacting said acylation agent with a cellulose raw material by use of a proton catalyst such as sulfuric acid.

In the case of an acylation agent being acid chloride (such as $CH_3COCl$, $C_2H_5COCl$ and $C_3H_7COCl$), the reaction is performed employing a basic compound such as amine as a catalyst. Specifically, the cellulose ester can be synthesized with reference to such as a method described in JP-A 10-45804. Further, cellulose ester utilized in the present invention is one in which reaction is performed by mixing the above-described acylation agents corresponding to each substitution degree, and these acylation agents reacts with an hydroxyl group of a cellulose molecule to prepare cellulose ester. A cellulose molecule is comprised of many glucose units connected, and each glucose unit has three hydroxyl groups. The number of acyl groups derived to these three hydroxyl groups is called as a substitution degree (mole %). For example, in cellulose triacetate, an acetyl group is bonded to every hydroxyl groups of a glucose unit (actually 2.6-3.0).

As cellulose ester utilized in the present invention, mixed fatty acid ester of cellulose such as cellulose acetate propionate, cellulose acetate butyrate and cellulose acetate propionate butyrate, which is bonded with a propionate group or a butyrate group in addition to an acetyl group, is specifically preferably utilized. Herein, cellulose acetate propionate which contains a propionate group as a substituent is superior in water resistance and useful as film for a liquid crystal display.

A number average molecular weight of cellulose ester is preferably 40,000-200,000 with respect to strong mechanical strength when being molded and suitable dope viscosity in the case of a solution casting method, and more preferably 50,000-150,000. Further, weight average molecular weight (Mw)/number average molecular weight (Mw) is preferably in a range of 1.4-4.5.

These cellulose ester films are preferably manufactured generally by a method called as a solution casting method in which a cellulose ester solution (a dope) is cast on a casting support of an infinitely transporting endless metal belt or a rotating metal drum to be formed into film.

An organic solvent utilized to prepare these dopes is one capable of dissolving cellulose ester and having a suitable boiling point, and includes such as methylene chloride, methyl acetate, ethyl acetate, methyl acetoacetate, acetone, tetrahydrofuran, 1,3-dioxolan, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitromethane and 1,3-dimethyl-2-imidazolidinone, however, a preferable organic solvent (that is a good solvent) includes such as an organic halogenide compound such as methylene chloride, a dioxolan derivative, methyl acetate, ethyl acetate, acetone and methyl acetoacetate.

Further, a boiling point of a utilized organic solvent is preferably 30-80° C. in view of preventing foaming in a web at the time of drying solvent from a web (dope film) having been formed on a casting support in a solvent evaporation process, and a boiling point of the above-described good solvent is that of such as methylene chloride (boiling point of 40.4° C.), methyl acetate (boiling point of 56.32° C.), acetone (boiling point of 56.3° C.) and ethyl acetate (boiling point of 76.82° C.).

Among the above-described good solvents, methylene chloride or methyl acetate, which is excellent in solubility, is preferably utilized.

In addition to the above-described organic solvent, 0.1-40 weight % of alcohol having a carbon number of 1-4 is preferably incorporated. Specifically preferably 5-30 weight % of the foresaid alcohol is incorporated. These are utilized as a gelation solvent to make a web easily peelable from a casting support due to gelation of a web (dope film) when a solvent starts to evaporate to increase an alcohol ratio, after the above-described dope has been cast on a casting support, whereby the web is strengthened; or are also provided with a role to accelerate dissolution of cellulose ester by non-chlorine type organic solvent in the case of these ratio being small.

Alcohol having a carbon number of 1-4 includes such as methanol, ethanol, n-propanol, iso-propanol, n-butanol, sec-butanol and tert-butanol.

Among these solvents, ethanol is preferable because of good stability of a dope, a relatively low boiling point and an excellent drying property. Preferably, a solvent, comprising 5-30 weight % of ethanol and 70-95 weight % of methylene chloride, is preferably utilized. Methyl acetate is also utilized instead of methylene chloride. In this case, a dope may be prepared by a cooled dissolution method.

In the case of utilizing cellulose ester film for retardation film according to the present invention, a plasticizer such as described below is preferably incorporated with respect to flexibility, moisture permeability and dimension stability. A plasticizer utilized is not specifically limited, however, is preferably provided with a functional group which is capable of interacting with a cellulose derivative by such as hydrogen bonding not to generate haze in film and not to bleed out or evaporate from film.

Such a functional group includes a hydroxyl group, an ether group, a carbonyl group, an ester group, a carboxylic acid residual group, an amino group, an imino group, an amido group, an imido group, a cyano group, a nitro group, a sulfonyl group, a sulfonic acid residual group, a phosphonyl group and a phosphonic acid residual group, however, preferably is a carbonyl group, an ester group or a sulfonyl group.

Phosphate ester plasticizers and non-phosphate ester plasticizers are preferably usable as plasticizers employed in the present invention.

Examples of phosphate ester plasticizers include triphenyl phosphate, tricresyl phosphate, cresyl diphenyl phosphate, octyl diphenyl phosphate, diphenyl biphenyl phosphate, trioctyl phosphate and tributyl phosphate.

Examples of non-phosphate ester plasticizers include phthalic acid ester, trimellitic acid ester, pyromellitic acid ester, polyalcohol ester, glycolate ester, citric acid ester, aliphatic acid ester, polyester and polycarboxylic acid ester. Of these, preferable is to use polyalcohol ester, polyester or polycarboxylic acid ester.

A polyhydric alcohol ester plasticizer is a plasticizer containing an ester of an aliphatic polyhydric alcohol of divalent or more and monocarboxylic acid, and it preferably contains an aromatic ring or a cycloalkyl ring in the molecule.

The polyhydric alcohol usable in the present invention is expressed by following Formula (1).

$$R1\text{-}(OH)n \qquad \text{Formula (1)}$$

wherein, R1 represents an organic group having a valence of n, n represents an integer of two or more.

Examples of preferable polyhydric alcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol and pentaerythritol. Specifically, trimethylol propane and pentaerythritol are preferable.

As the monocarboxylic acid to be used in the polyhydric alcohol ester, a known aliphatic monocarboxylic acid, alicyclic monocarboxylic acid and aromatic monocarboxylic acid may be employed, though the monocarboxylic acid is not specifically limited. Specifically, aliphatic monocarboxylic acid and aromatic monocarboxylic acid are preferable, since moisture permeation is reduced and retainability is improved. Examples of the preferable monocarboxylic acid are listed below but the present invention is not limited thereto.

A straight or branched chain carboxylic acid having 1 to 32 carbon atoms is preferably employed. The number of carbon atoms is more preferably 1-20, and specifically preferably 1-10. The addition of acetic acid is preferable for raising the compatibility with a cellulose ester, and the mixing of acetic acid with another carboxylic acid is also preferable.

As the preferable aliphatic monocarboxylic acid, saturated aliphatic acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated aliphatic acids such as undecylenic acid, oleic acid, sorbic acid, linolic acid, linolenic acid and arachidonic acid can be exemplified. Examples of preferable alicyclic carboxylic acid include cyclopentane carboxylic acid, cyclohexane carboxylic acid, cyclooctane carboxylic acid and derivatives thereof. Examples of preferable aromatic monocarboxylic acid include ones formed by introducing an alkyl group into the benzene ring of benzoic acid such as benzoic acid and toluic acid; and an aromatic monocarboxylic acid having two or more benzene rings such as biphenylcarboxylic acid, naphthalene carboxylic acid and tetralin carboxylic acid, and derivatives thereof, of these, benzoic acid is specifically preferable.

The molecular weight of the polyhydric alcohol ester is preferably 300-1500, and more preferably 350-750, though the molecular weight is not specifically limited. Larger molecular weight is preferable for storage ability, while smaller molecular weight is preferable for compatibility with cellulose ester. The carboxylic acid to be employed in the polyhydric alcohol ester may be one kind or a mixture of two or more kinds of them. The OH groups in the polyhydric alcohol may be fully esterified or a part of OH groups may be left unreacted. Specific examples of the polyhydric alcohol ester are listed below.

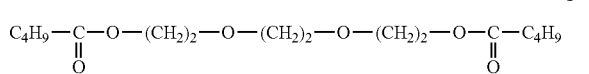

1

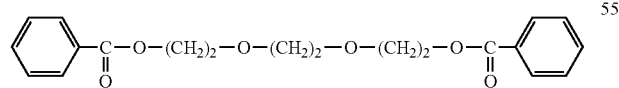

2

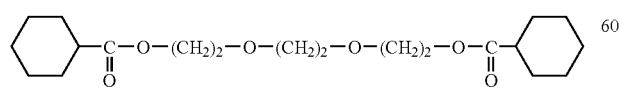

3

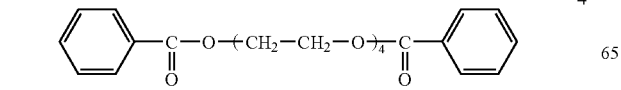

4

-continued

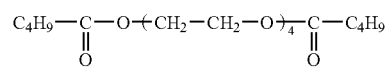

5

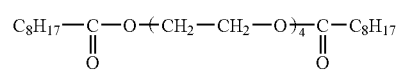

6

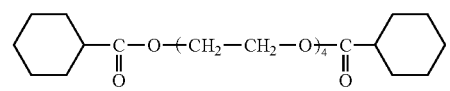

7

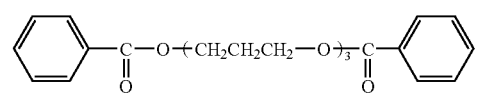

8

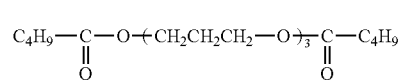

9

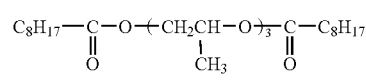

10

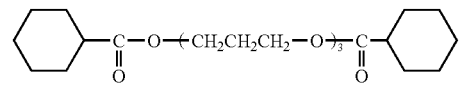

11

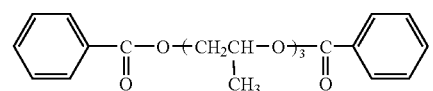

12

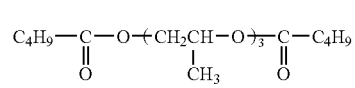

13

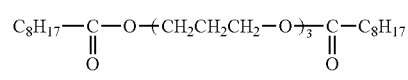

14

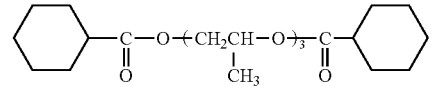

15

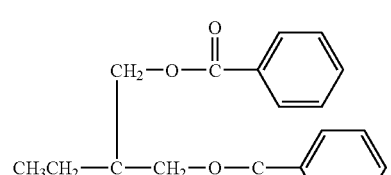

16

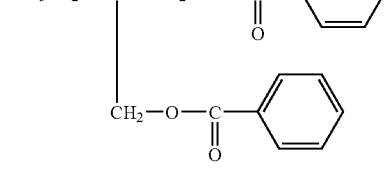

17

18
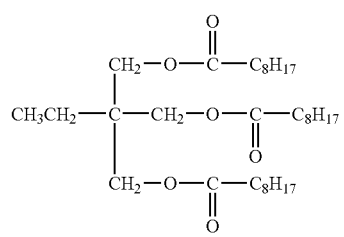
19
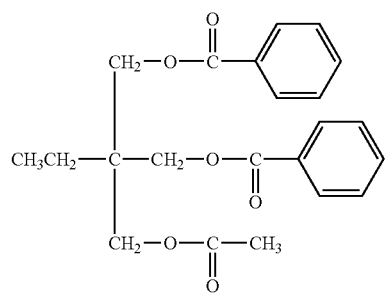
20
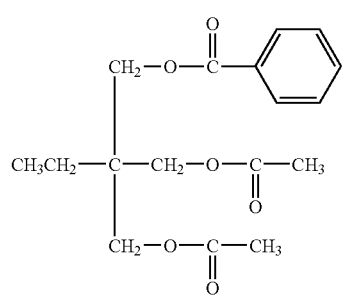
21
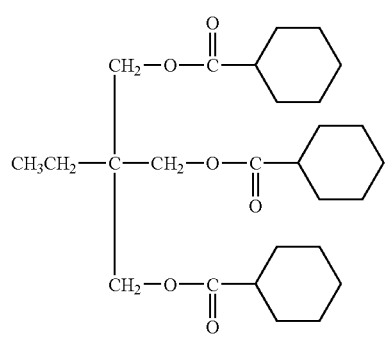
22
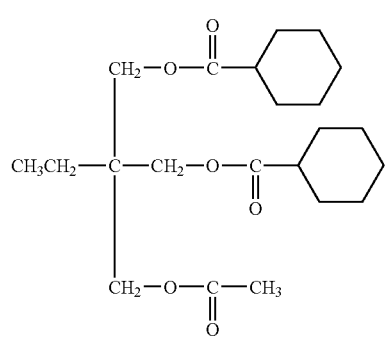
23
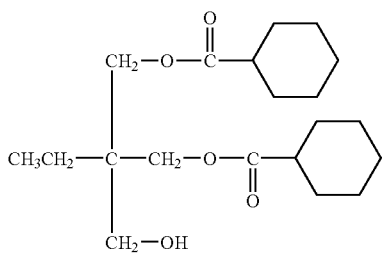
24
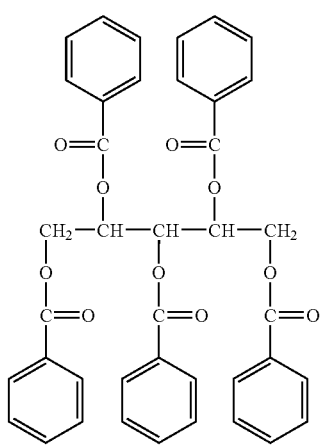
25
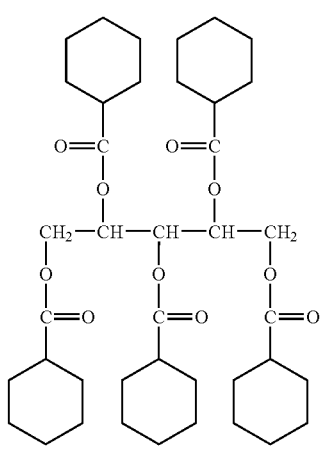
26
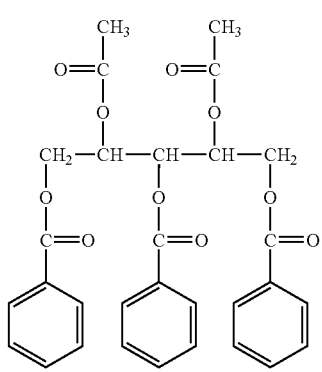

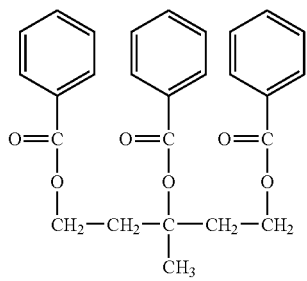

27

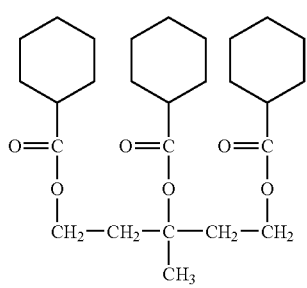

28

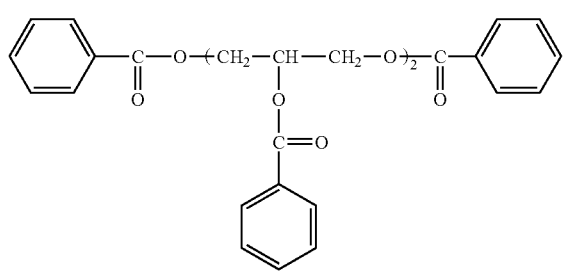

29

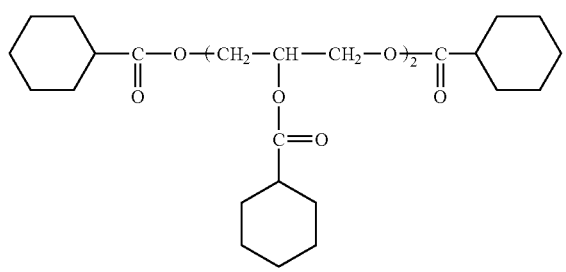

30

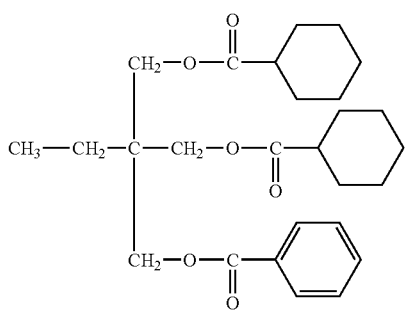

31

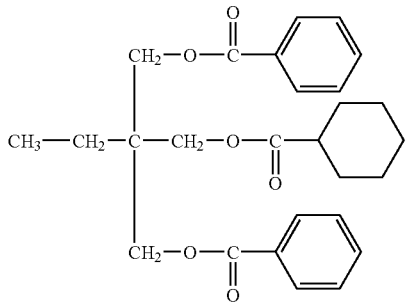

32

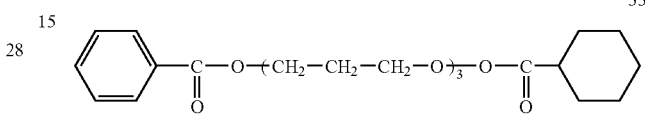

33

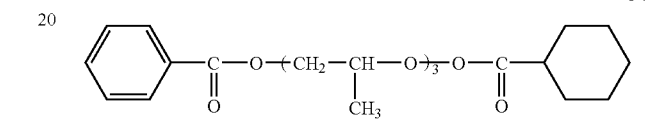

34

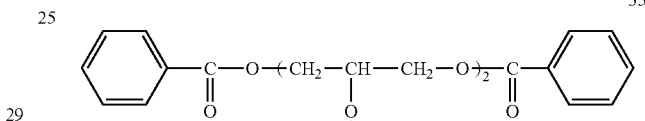

35

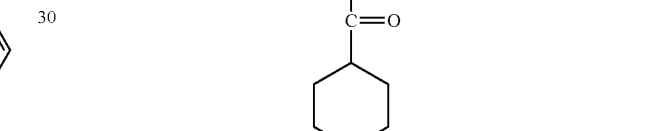

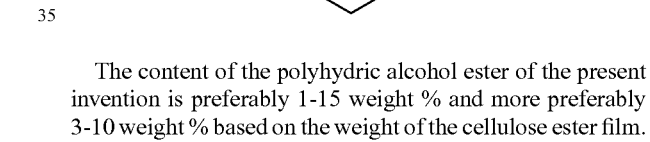

The content of the polyhydric alcohol ester of the present invention is preferably 1-15 weight % and more preferably 3-10 weight % based on the weight of the cellulose ester film.

(Polyester Plasticizer)

A polyester plasticizer having an aromatic ring or a cycloalkyl ring in the molecule thereof is preferably employed, however, the present invention is not limited thereto. For example, aromatic terminal polyester plasticizers represented by following Formula (2) are preferable though the polyester plasticizer is not specifically limited.

$$B\text{-}(G\text{-}A)_n\text{-}G\text{-}B \qquad \text{Formula (2)}$$

In the above formula, B is a benzene monocarboxylic acid residue, G is an alkylene glycol residue having 2-12 carbon atoms, an aryl glycol residue having 6-12 carbon atoms or an oxyalkylene glycol residue having 4-12 carbon atoms, A is an alkylenecarboxylic acid residue having 4-12 carbon atoms or an aryldicarboxylic acid residue having 6-12 carbon atoms, and n is an integer of 1 or more. The polyester type plasticizer is constituted by the benzene monocarboxylic acid residue represented by B, the alkylene glycol residue, the aryl glycol residue or the oxyalkylene glycol residue represented by G, and an alkylenecarboxylic acid residue or an aryldicarboxylic acid residue represented by A; the plasticizer can be obtained by a reaction similar to that for obtaining usual polyester plasticizer.

As the benzene monocarboxylic acid component of the polyester type plasticizer employed in the present invention, for example, benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid and acetoxybenzoic acid are applicable. They can be employed solely or in combination.

Examples of the alkylene glycol with 2-12 carbon atoms as the component of the polyester type plasticizer include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol. These glycols are employed solely or in mixture of two or more kinds thereof. An alkylene glycol with 2-12 carbon atoms is particularly preferable since compatibility with cellulose ester is excellent.

Examples of the oxyalkylene glycol component with 4-12 carbon atoms forming the aromatic terminal type ester structure include diethylene glycol, triethylene glycol, tetraethylene glycol, dipropylene glycol and tripropylene glycol. These glycols can be employed singly or in combination of two or more kinds.

Examples of the alkylenedicarboxylic acid component with 4-12 carbon atoms forming the aromatic terminal type ester structure include succinic acid, maleic acid, fumaric acid, glutaric acid, adipic acid, azelaic acid, sebacic acid and dodecanedicarboxylic acid. These acids can be employed solely or in a combination of two or more kinds. The examples of the arylenedicarboxylic acid component having 6 to 12 carbon atoms include phthalic acid, tetraphtalic acid, 1,5-naphthalenedicarboxylic acid and 1,4-naphthalenedicarboxylic acid.

The suitable number average molecular weight of the polyester type plasticizer to be employed in the present invention is preferably 300-1500, and more preferably 400-1000. The acid value and the hydroxyl group value are at most 0.5 mg KOH/g and at most 25 mg KOH/g, respectively, and preferably at most 0.3 mg KOH/g and 15 mg KOH/g, respectively.

Synthesized examples of the aromatic terminal type ester plasticizer are described below.

<Sample No. 1 (Sample of Aromatic Terminal Type Ester)>

In a reaction vessel, 410 parts of phthalic acid, 610 parts of benzoic acid, 737 parts of dipropylene glycol, 365 parts of adipic acid and 0.40 parts of tetraisopropyl titanate as a catalyst were charged at once and stirred in nitrogen gas stream, and heated at a temperature of 130-250° C. until the acid value becomes at most 2 while formed water was continuously removed and excessive monohydric alcohol was refluxed by a reflux condenser. After that, distillate was removed under a reduced pressure of not more than 400 Pa at a temperature of 200-230° C., and then the content of the vessel was filtered to obtain an aromatic terminal type ester plasticizer having the following properties.

Viscosity (mPa·s at 25° C.): 43400
Acid value: 0.2

<Sample No. 2 (Sample of Aromatic Terminal Type Ester)>

An aromatic terminal type ester having the following properties was obtained similarly to Sample 1, except that 410 parts of phthalic acid, 610 parts of benzoic acid, 341 parts of ethylene glycol and 0.35 parts of tetraisopropyl titanate as a catalyst were employed.

Viscosity (mPa·s at 25° C.): 31000
Acid value: 0.1

Sample No. 3 (Sample of Aromatic Terminal Type Ester)

An aromatic terminal type ester having the following properties was obtained similarly to Sample 1, except that 410 parts of phthalic acid, 610 parts of benzoic acid, 410 parts of 1,2-propylene diol and 0.35 parts of tetraisopropyl titanate as a catalyst were employed.

Viscosity (mPa·s at 25° C.): 38000
Acid value: 0.05

Sample No. 4 (Sample of Aromatic Terminal Type Ester)

An aromatic terminal type ester having the following properties was obtained similarly to Sample 1, except that 410 parts of phthalic acid, 610 parts of benzoic acid, 418 parts of 1,3-propylene diol and 0.35 parts of tetraisopropyl titanate as a catalyst were employed.

Viscosity (mPa·s at 25° C.): 37000
Acid value: 0.05

Specific compounds of the aromatic terminal ester type plasticizer are listed below, but the present invention is not limited thereto.

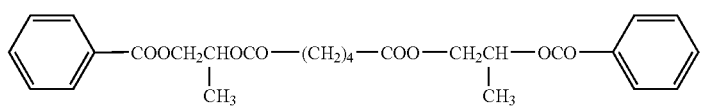

(1)

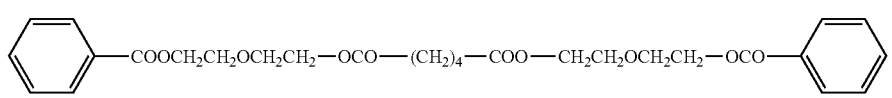

(2)

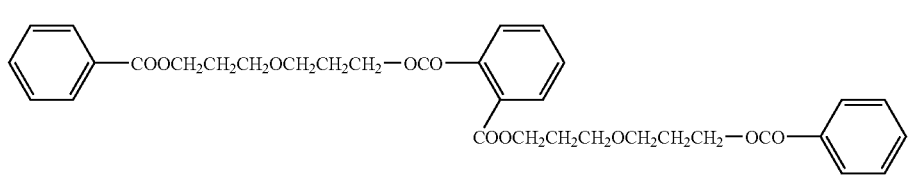

(3)

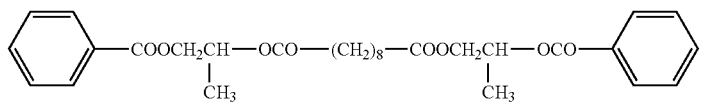

(4)

-continued

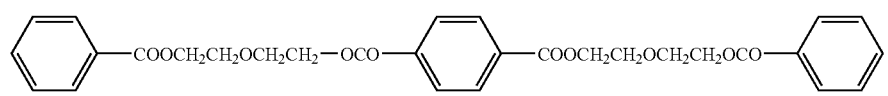
(5)

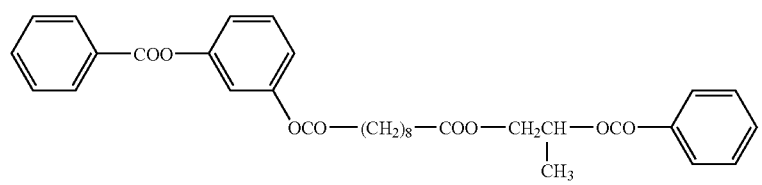
(6)

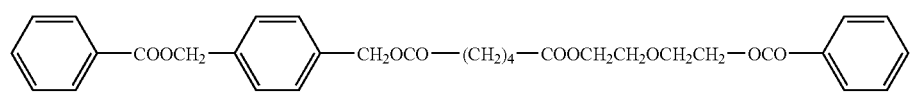
(7)

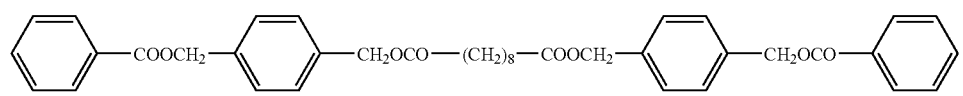
(8)

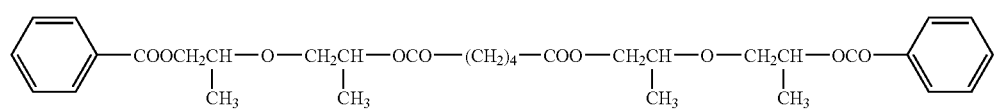
(9)

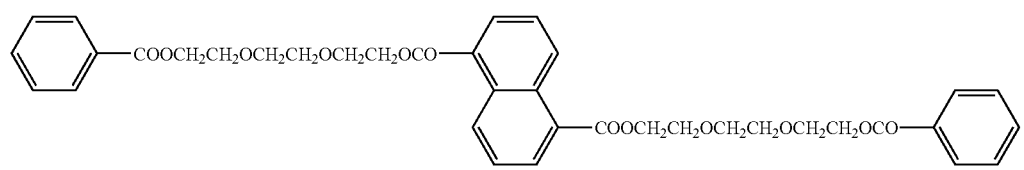
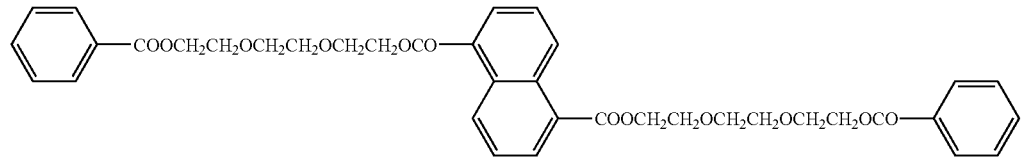
(10)

The polycarboxylic acid plasticizer usable in the present invention includes an ester of alcohol and a polycarboxylic acid having a valence of 2 or more, but preferably having a valence of 2-20. The valence of an aliphatic polycarboxylic acid is preferably 2-20, and the valence of an aromatic polycarboxylic acid and an alicyclic polycarboxylic acid each are preferably 3-20.

The polycarboxylic acid used for the present invention is expressed by Formula (3).

  Formula (3)

(wherein, $R_5$ represents an organic group having a valence of (m+n), m is a positive integer of two or more, and n is an integer of zero or more, COOH group represents a carboxyl group and OH group represents alcoholic or phenol hydroxyl group)

The following can be cited mentioned as an example of desirable polycarboxylic acid, however, the present invention is not limited thereto.

Examples of a polycarboxylic acid include: an aromatic polycarboxylic acid having a valence of 3 or more and its derivative, for example, trimellitic acid, trimesic acid, and pyromellitic acid; aliphatic polycarboxylic acid, for example, succinic acid, adipic acid, azelaic acid, sebacic acid, oxalic acid, fumaric acid, maleic acid and tetrahydrophthalic acid; and oxypolycarboxylic acid, for example, tartaric acid, tartronic acid, malic acid, and citric acid. Specifically, it is desirable to use oxypolycarboxylic acid with respect to the enhancement of retention properties.

There is no restriction in particular for an alcohol used for the polycarboxylic acid ester of the present invention, and well-known alcohol and phenol can be used. For example, aliphatic saturated alcohol or aliphatic unsaturated alcohol with normal chain or side chain having carbon atom number of 1 to 32 can be used preferably. The number of carbon atoms is more preferably from 1 to 20 and still more preferably from 1 to 10. Moreover, alicyclic alcohol and its derivative such as cyclopentanol and cyclohexanol, and aromatic alcohol and its derivative such as benzyl alcohol and cinnamyl alcohol can be used preferably.

When using oxypolycarboxylic acid as polycarboxylic acid, the alcoholic or phenol hydroxyl group of the oxypolycarboxylic acid may be esterified by using monocarboxylic acid. Although the following can be mentioned as an example of preferable monocarboxylic acid, the present invention is not limited to these.

For aliphatic monocarboxylic acids, normal or branched fatty acids having 1 to 32 carbon atoms are preferably used. The number of carbon atoms is more preferably from 1 to 20 and still more preferably from 1 to 10.

Examples of preferable aliphatic monocarboxylic acids include saturated fatty acids such as: acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which alkyl groups are introduced, biphenylcarboxylic acid, naphthalenecarboxylic and tetralincarboxylic acid having 2 or more benzene rings, and derivatives thereof. Specifically, acetic acid, propionic acid and benzoic acid are preferred.

The molecular weight of the monocarboxylic acid ester is not limited, however, the molecular weight is preferably from 300 to 1000 and more preferably from 350 to 750. A higher molecular weight is preferable with respect to the improvement in retention properties, while a lower molecular weight is preferable with respect to reducing moisture permeability, or to mutual solubility with cellulose ester.

The alcohol used for the polycarboxylic acid ester used for the present invention may be one kind, or a mixture of two or more kinds.

The acid value of a polycarboxylic acid ester compound used for the present invention is preferably 1 mgKOH/g or less, and more preferably 0.2 mgKOH/g or less.

Although the examples of an especially preferable polycarboxylic acid ester compound are shown below, the present invention is not limited to these. For example, listed are: triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyltartrate, diacetyldibutyl tartarate, tributyl trimellitate, tetrabutyl pyromellitate These plasticizers may be used alone or in combination of two or more. When the content of the plasticizer is 1 weight % or less based on the weight of the cellulose derivative, the effect to reduce the moisture permeability is small, while, when it is 20 weight % or more, the plasticizer tends to bleed out to degrade the film property. Accordingly, the content of the plasticizer is preferably 1-20 weight %, more preferably 6-16 weight % and specifically preferably 8-13 weight %.

A UV (ultra violet ray) absorbent is preferably used in the retardation film of the present invention.

As a UV absorbent, preferable is a UV absorbent having high absorbability of UV rays of which wavelength is 370 nm or less, and having small absorbability of visible rays of which wavelength is 400 nm or more.

Examples of a UV absorbent preferably used in the present invention include: oxybenzophenone, benzotriazol, a salicylic acid ester, benzophenone, cyanoacrylate and a nickel complex salt, however, the present invention is not limited thereto.

Examples of a benzotriazole UV absorbent used in the present invention are given below, however, the present invention is not limited thereto.

UV-1: 2-(2'-hydroxy-5'-methylphenyl)benzotriazole

UV-2: 2-(2'-hydroxy-3',5'-di-tert-butylphenyl)benzotriazole

UV-3: 2-(2'-hydroxy-3'-tert-butyl-5'-methylphenyl)benzotriazole

UV-4: 2-(2'-hydroxy-3',5'-di-tert-butylphenyl)-5-chloro benzotriazole

UV-5: 2-(2'-hydroxy-3'-(3",4",5",6"-tetrahydro phthalimidomethyl)-5'-methylphenyl)benzotriazole UV-6: 2,2-methylenebis (4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (TINUVIN109, Ciba Specialty Chemicals Inc.)

As a benzotriazole UV absorbent, the compounds shown below are preferably used, however, the present invention is not limited thereto.

UV-10: 2,4-dihydroxy benzophenone

UV-11: 2,2'-dihydroxy-4-methoxybenzophenone

UV-12: 2-hydroxy-4-methoxy-5-sulfobenzophenone

UV-13: Bis (2-methoxy-4-hydroxy-5-benzoylphenyl methane)

In addition, a disk-shaped compound mentioned later may be used preferably as a ultraviolet absorber.

As a UV absorbent preferably used in the present invention, preferable are a benzotriazole UV absorbent and a benzophenone UV absorbent, since these compounds have high transparency and are excellent in the effect to prevent deterioration of a polarizing plate and a liquid crystal element, and specifically a benzotriazole UV absorbent which causes less unnecessary coloring is preferable.

A UV absorbent disclosed in JP-A 2001-187825, which exhibits a partition coefficient of 9.2 or more, improves a surface quality of a long roll film as well as providing an excellent coating property. Specifically preferable is a UV absorbent exhibiting a partition coefficient of 10.1 or more.

Also preferably used are: polymer UV absorbents (also referred to as UV absorbing polymers) disclosed in Formulas (1) and (2) of JP-A 6-148430, disclosed in Formulas (3), (6) and (7) of JP-A 2002-47357, and UV absorbing copolymers disclosed in paragraphs [0027]-[0056] of JP-A 2002-169020. As a commercially available polymer UV absorbent, for example, PUVA-30M (produced by OTSUKA Chemical Co., Ltd.) is cited.

An antioxidant may be used in the retardation film of the present invention. When a liquid crystal display is stored at high-temperature and humidity, the polarizing plate protective film may deteriorate. The antioxidant is preferably incorporated in the foregoing polarizing plate protective film, since an antioxidant has a function which delays or prevents a retardation film from degrading by halogen in residual solvents in the polarizing plate protective film, or by phosphoric acid of a phosphoric acid plasticizer.

As antioxidants, hindered phenol compounds are also preferably employed. Examples of the compounds include 2,6-di-t-butyl-p-cresol, pentaerythityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)-propionate, 2,4-bis(n-octyl)-6-(4-hydroxy-3,5-di-t-butylanilino)-1,3,5-triazine, 2,2-thio-diethylene-bis[3-(3,5-t-butyl-4-hydroxyphenyl)propionate, octadecyl-3-(3,5-di-t-butyl-4-hydroxyphenyl)propionate, N,N'-hexamethylene-bis (3,5-di-t-butyl-4-hydroxy-4-hydroxy-hydrocinnamide), 1,3,5-trimethyl-2,4,6-tris(3,5-di-t-butyl-4-hydroxybenzyl) benzene and tris(3,5-di-t-butyl-4-hydroxybenzyl)-isocyanurate. Specifically, 2,6-di-t-butyl-p-cresol, pentaerythityl-tetrakis[3-(3,5-di-t-butyl-4-hydroxyphenyl) propionate] and triethylene glycol-bis[3-(3-t-butyl-5-methyl-4-hydroxyphenyl)-propionate] are preferred. A hydrazine metal inactivation agent such as N,N'-bis[3-(3,5-di-t-butyl-4-hydroxyphenyl)propionyl]hydrazine and a phosphor processing stabilizing agent such as tris(2,4-di-t-butylphenyl)phosphite may be used in combination.

The adding amount of these compounds is preferably 1 ppm to 1.0%, and more preferably from 10 ppm to 1,000 ppm, by weight based on the weight of the cellulose ester.

Particles are preferably useded in the retardation film of the present invention, in order to provide lubrication.

The average particle diameter of the primary particles is preferably not more than 20 nm, more preferably 5-16 nm, and still more preferably 5-12 nm. The particles are preferably incorporated in the retardation film with forming secondary particles with the particle diameter of 0.1-5 μm. The particle diameter is more preferably 0.1-2 μm and still more preferably 0.2-0.6 μm. By incorporating such particles, asperity with the height of 0.1-1.0 μm is formed on the surface of the film, whereby preferable lubrication is provided on the surface of the film.

In order to measure the average diameter of the primary particles utilized in the present invention, the particles were observed employing a transmission electron microscope (at a magnification of 500,000-2,000,000 times) to determine the primary average particle diameter as an average value via observation of 100 particles.

The apparent specific gravity of particles is preferably at least 70 g/liter, more preferably 90-200 g/liter and specifically preferably 100-200 g/liter. The larger is the apparent specific gravity, dispersion having the higher concentration can be prepared, which is preferable because of improved haze and less aggregation, and is specifically preferable during preparation of a dope having a high solid content.

Silicon dioxide particles having a primary particle diameter of not more than 20 nm and an apparent specific gravity of 70 g/liter can be prepared, for example, by combustion of a mixture of gaseous silicon tetrachloride and hydrogen in air at 1000-1200° C. Such silicon dioxide particles are commercially available, for example, as AEROSIL 200V or AEROSIL 972V (bothe produced by Nippon Aerosil Co., Ltd.).

The above-described apparent specific gravity is determined by sampling a predetermined volume of silicon dioxide particles in a messcylinder to measure the weight and is calculated according to the following equation.

Apparent specific gravity (g/liter)=weight of silicon dioxide (g)/volume of silicon dioxide (liter)

A preparation method of a dispersion of particles utilized in the present invention includes, such as the following three types.

<Preparation Method A>

Dispersion is performed by use of a homogenizer after a solvent and particles have been stirring mixed. This is designated as particle dispersion. The particle dispersion is added into a dope solution to be mixed.

<Preparation Method B>

Dispersion is performed by using a homogenizer after an organic solvent and particles have been mixed while stirring. This is designated as a particle dispersion. Separately, a small amount of cellulose atriacetate is added into an organic solvent and is dissolved while stirring. The aforesaid particle dispersion is added therein and the resulting solution is mixed. This is designated as a particle additive solution, and the particle additive solution is sufficiently mixed with a dope employing an in-line mixer.

<Preparation Method C>

A small amount of cellulose triacetate is added into an organic solvent and is dissolved while stirring. Particles are added therein and dispersed by using a homogenizer. This is designated as a particle additive solution. The particle additive solution is sufficiently mixed with a dope employing an in-line mixer.

Preparation method A is superior in dispersibility of silicon dioxide particles and preparation method C is superior in that silicon dioxide particles are hardly re-aggregated. Among them, the above-described preparation method B is a preferable method which is superior in both of dispersibility of silicon dioxide particles and re-aggregation resistance of silicon dioxide particles.

<Dispersion Method>

The concentration of silicon dioxide at the time of dispersing silicon dioxide particles by being mixed with a solvent is preferably 5-30% by weight, more preferably 10-25% by weight and most preferably 15-20% by weight. When the solid content of dispersion is higher, the increasing ratio of liquid turbidity tends to be lower while the amount of added dispersion is increased, whereby haiz and amount of aggregate are reduced.

Organic solvents utilized in the dispersion include preferably lower alcohols such as methanol, ethanol, propyl alcohol, isopropyl alcohol and buthanol. Organic solvents other than lower alcohols are not specifically limited, but preferably utilized are organic solvents which are employed in the film forming process of cellulose ester.

The addition amount of silicon dioxide particles in the cellulose ester is preferably 0.01-5.0 parts by weight, more preferably 0.05-1.0 parts by weight and most preferably 0.1-0.5 part by weight in 100 parts by weight of cellulose ester. The larger addition amount results in a superior dynamic friction factor of a cellulose ester film is, while the smaller addition amount results in lower haze and a smaller amount of aggregation.

As a homogenizer, an ordinary homogenizer can be utilized. Homogenizers can be roughly classified into a media homogenizer and a media-less homogenizer. For dispersion of silicon dioxide particles, a media-less homogenizer is preferred due to a lower haze. A media homogenizer includes such as a ball mill, a sand mill and a dyno mill. A media-less homogenizer includes an ultrasonic type, a centrifugal type and a high pressure type, however, a high pressure homogenizer is preferable in the present invention. A high pressure homogenizer is an apparatus to make a special condition such as a high share or high pressure state by passing a composition, comprising particles and a solvent having been mixed, through a fine tube at a high speed. In the case of processing by a high pressure homogenizer, it is preferable, for example, to set the maximum pressure condition in a fine tube having a diameter of 1-2000 μm of at least 9.8 MPa and more preferably of at least 19.6 MPa. Further, at that time, preferable are those in which the maximum speed of at least 100 m/sec and the heat transmission rate of at least 420 kJ/hour.

High pressure homogenizers such as described above include a high pressure homogenizer (product name: Microfluidizer) manufactured by Microfluidics Corporation or Nanomizer manufactured by Nanomizer Corp., in addition to Manton-Gaulin type high pressure homogenizers such as a homogenizer manufactured by Izumi Food Machinery Co., Ltd. and UHN-01 manufactured by Sanwa Machine Co., Inc.

In order to obtain a high lubricant and low haze film, preferable is to cast a dope so that the dope containing particles is directly in contact with the support for casting.

After a dope is cast, peeled from the support, dried and wound in a roll, a function layer, for example, a hard coat layer or an antireflection layer, is provided on the formed film. Before the film is further treated or shipped, the film is usually packaged in order to protect the film from stain or attachment of dust due to static electricity. The material for package is not specifically limited, as far as the above object is achieved, however, preferable is a film which does not prevent evaporation of a residual solvent. Specifically, preferably used are, for example, polyethylene, polyester, polypropylene, nylon, polystyrene, paper and various non-woven clothes. A fiber mesh cloth is more preferably employed.

In the retardation film of the present invention, retardation is controlled by incorporating a retardation control agent.

(Rod-shaped Compound)

The optical film or the optical compensating film according to the present invention preferably contains a rod-shaped compound which has the maximum absorption wavelength ($\lambda_{max}$) in UV absorption spectrum at a wavelength of not longer than 250 nm.

The rod-shaped compound preferably has one or more, and preferably two or more, aromatic rings from the viewpoint of the retardation controlling function. The rod-shaped compound preferably has a linear molecular structure. The linear molecular structure means that the molecular structure of the rod-shaped compound is linear in the thermodynamically most stable structure state. The thermodynamically most stable structure can be determined by crystal structure analyzing or molecular orbital calculation. The molecular structure, by which the heat of formation is made minimum, can be determined on the calculation by, for example, a software for molecular orbital calculation WinMOPAC2000, manufactured by Fujitsu Co., Ltd. The linear molecular structure means that the angle of the molecular structure is not less than 140° in the thermodynamically most stable structure calculated as the above. The rod-shaped compound is preferably one displaying a liquid crystal property. The rod-shaped compound more preferably displays a crystal liquid property by heating (thermotropic liquid crystal property). The phase of the liquid crystal is preferably a nematic phase or a smectic phase.

As the rod-shaped compound, trans-1,4-cyclohexane-dicarboxylic acid esters represented by the following Formula (4) are preferable.

$$Ar^1\text{-}L^1\text{-}Ar^2 \qquad \text{Formula (4)}$$

In Formula (4), $Ar^1$ and $Ar^2$ are each independently an aromatic group. The aromatic group includes an aryl group (an aromatic hydrocarbon group), a substituted aryl group, an aromatic heterocyclic group and a substituted heterocyclic group. The aryl group and the substituted alkyl group are more preferable than the aromatic heterocyclic group and the substituted aromatic heterocyclic group. The heterocycle of the aromatic heterocyclic group is usually unsaturated. The aromatic heterocyclic group is preferably a 5-, 6- or 7-member ring, and more preferably a 5- or 6-member ring. The heterocyclic ring usually has the largest number of double bond. The hetero atom is preferably a nitrogen atom, an oxygen atom or a sulfur atom and the nitrogen atom or the oxygen atom is more preferable. Examples of the aromatic heterocyclic ring include a furan ring, a thiophene ring, a pyrrole ring, an oxazole ring, in isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furan ring, a thiophene ring, a pyrrole ring, an oxazole ring, a thiazole ring, a thiazole ring, an imidazole ring, a triazole ring, a pyridine ring, a pyrimidine ring and pyrazine ring are preferable and the benzene ring is particularly preferable.

Examples of the substituent of the substituted aryl group and the substituted aromatic heterocyclic group include a halogen atom such as a fluorine chlorine atom, a chlorine atom, a bromine atom and an iodine atom, a hydroxyl group, a carboxyl group, a cyano group, an amino group, an alkylamino group such as a methylamino group, an ethylamino group, a utylamino group and a dimethylamino group, a nitro group, a sulfo group, a carbamoyl group, an alkylcarbamoyl group such as an N-methylcarbaamoyl group and an N,N-dimethylcarbamoyl group, a sulfamoyl group, an alkylsulfamoyl group such as an N-methylsulfamoyl group, an N-ethylsulfamoyl group and an N,N-dimethylsulfamoyl group, a ureido group, an alkylureido group such as an N-methylureido group, an N,N-dimethylureido group and N,N,N-trimethylureido group, an alkyl group such as a methyl group, an ethyl group, a propyl group, a butyl group, a pentyl group, a heptyl group, an octyl group, an isopropyl group, an s-butyl group, a t-amyl group, a cyclohexyl group and a cyclopentyl group, an alkenyl group such as a vinyl group, an allyl group and a hexenyl group, an alkynyl group such as an ethynyl group and a butynyl group, an acyl group such as a formyl group, an acetyl group, a butylyl group, a hexanoyl group and a lauryl group, an acyloxy group such as an acetoxy group, a butylyloxy group, a hexanoyloxy group and lauryloxy group, an alkoxy group such as a methoxy group, an ethoxy group, a propoxy group, a butoxy group, a pentyloxy group, a heptyloxy group and an octyloxy group, an aryloxy group such as a phenoxy group, an alkoxycarbonyl group such as a methoxycarbonyl group, an ethoxycarbonyl group, a propoxycarbonyl group, a butoxycarbonyl group, a pentyloxycarbonyl group and a heptyloxycarbonyl group, an aryloxycarbonyl group such as a phenoxycarbonyl group, a an alkoxycarbonylamino group such as a butoxycarbonylamino group and a hexyloxycarbonylamino group, an alkylthio group such as a methylthio group, an ethylthio group, a propylthio group, butylthio group, a pentylthio group, a heptylthio group and an octylthio group, an arylthio group such as a thiophenyl group, an alkylsulfonyl group such as a methylsulfonyl group, an ethylsulfonyl group, a propylsulfonyl group, a butylsulfonyl group, a pentylsulfonyl group, a heptylsulfonyl group and an octylsulfonyl group, an amido group such as an acetoamido group, a butylamido group, a hexylamido group and an octylamido group, and a non-aromatic heterocyclic group such as a morpholyl group and a pyradinyl group.

As the substituent of the substituted aryl group and the substituted aromatic heterocyclic group, a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group are preferable. The alkyl moiety of the alkylamino group, the alkoxycarbonyl group, the alkoxy group and the alkylthio group, and the alkyl group each may further have a substituent. Examples of the substituent of the alkyl moiety or the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. The halogen atom, the hydroxyl group, an amino group, an alkylamino group, an acyl group, an acyloxy group, an acylamino group, an alkoxycarbonyl group and an alkoxy group are preferable as the substituent of the alkyl moiety or the alkyl group.

In Formula (4), $L^1$ is a di-valent bonding group selected from the group consisting of an alkylene group, an alkenylene group, an alkynylene group, a di-valent saturated heterocyclic group, an —O— atom, a —CO— group and a combination of them. The alkylene group may have a cyclic structure. As the cyclic alkylene group, a cyclohexylene group is preferable, and 1,4-cyclohexylene group is more preferable. As the chain-shaped alkylene group, a straight-chain alkylene group is more preferable than a branched-chain alkylene group. The number of carbon atoms of the alkylene group is preferably 1-20, more preferably 1-15, further preferably 1-10, further more preferably 1-8, and most preferably 1-6.

The alkenylene group and the alkynylene group each having a cyclic structure are more preferable than those having a chain structure, and a straight-chain structure is more preferably to a branched-chain structure. The number of carbon atom of the alkenylene group and the alkynylene group is preferably 2-10, more preferably 2-8, further preferably 2-6, and further more preferably 2-4, and most preferably 2, namely a vinylene or an ethynylene group. The di-valent saturated heterocyclic group is preferably from a 3- to 9-member heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1-3-dioxane ring, a 1,4-dioxane ring, a terahydrothiophene ring, a 1,3-thiazolidine ring, a 1,3-oxazolidine ring, a 1,3-dioxoran ring, a 1,3-dithiosilane ring and a 1,3,2-dioxoboran ring. Particularly preferable di-valent saturated heterocyclic group is a piperazine-1,4-diylene group, a 1,3-dioxane-2,5-diylene group and a 1,3,2-dioxobororane-2,5-diylene group.

Examples of divalent bonding group composed of a combination of groups are listed as follows.
L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-divalent saturated heterocyclic group-CO—O—
L-8: —CO—O— divalent saturated heterocyclic group —O—CO—

In the structure of Formula (4), the angle formed by $Ar^1$ and $Ar^2$ through $L^1$ is preferably not less than 140°. Compounds represented by Formula (5) are further preferable as the rod-shaped compound.

$$Ar^1\text{-}L^2\text{-}X\text{-}L^3\text{-}Ar^2 \quad \text{Formula (5)}$$

In Formula (5), $Ar^1$ and $Ar^2$ are each independently an aromatic group. The definition and the example are the same as $Ar^1$ 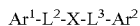 in Formula (4).

In Formula (5), $L^2$ and $L^3$ are each independently a di-valent bonding group selected from the group consisting of an alkylene group, an —O— atom, a —CO— group and a combination of them. The alkylene group having a chain structured is preferably to that having a cyclic structure, and a straight-chain structure is more preferably to a branched-chain structure. The number of carbon atoms in the alkylene group is preferably 1-10, more preferably from 1 to 8, further preferably from 1 to 6, further more preferably 1-4, and most preferably 1 or 2, namely a methylene group or an ethylene group. $L^2$ and $L^3$ are particularly preferably an —O—CO— group or a-CO—O— group.

In Formula (5), X is 1,4-cyclohexylene group, a vinylene group or a ethynylene group. Concrete examples of the compound represented by Formula (4) are listed below.

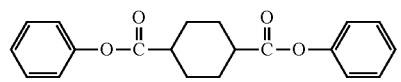

(1)

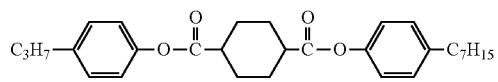

(2)

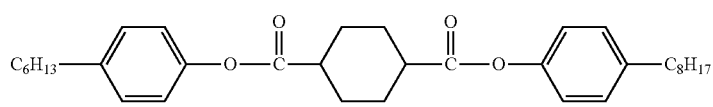

(3)

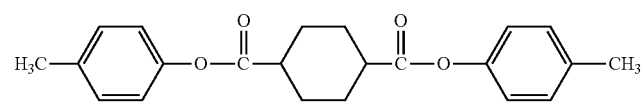

(4)

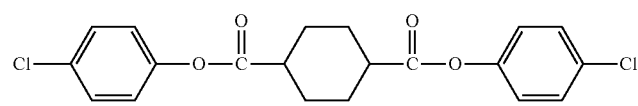

(5)

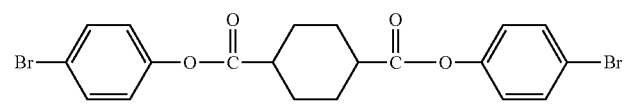

(6)

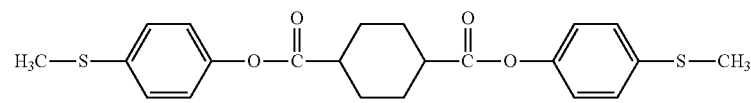

(7)

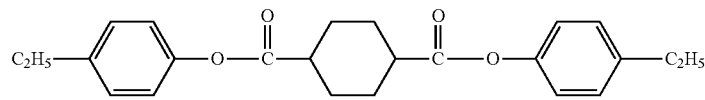

(8)

(9)
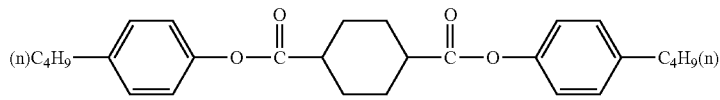
(10)
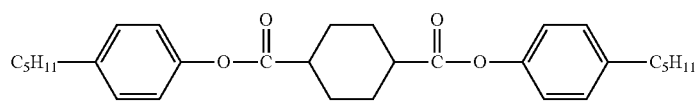
(11)
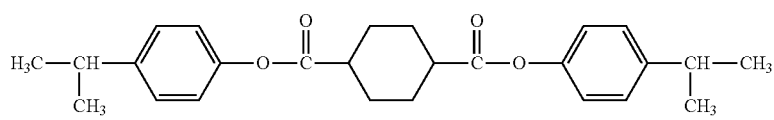
(12)
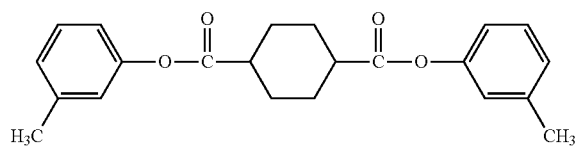
(13)
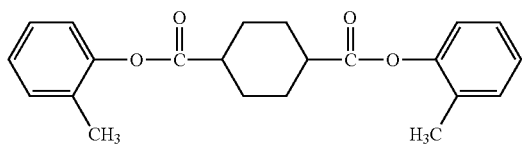
(14)
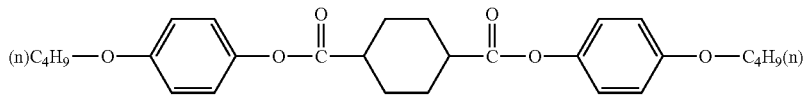
(15)
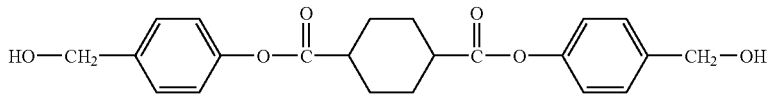
(16)
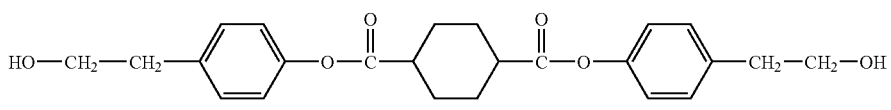
(17)
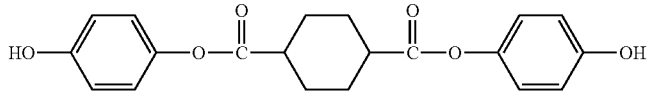
(18)
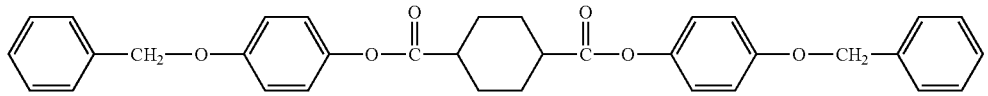
(19)
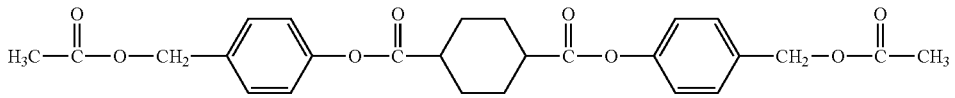
(20)
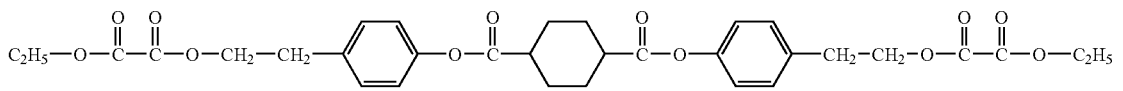
(21)
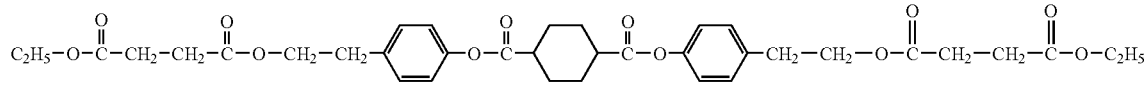

-continued
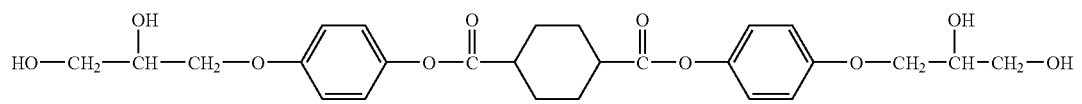
(22)
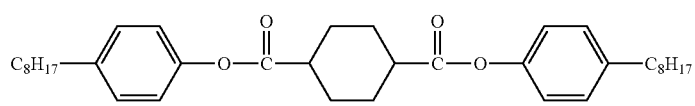
(23)
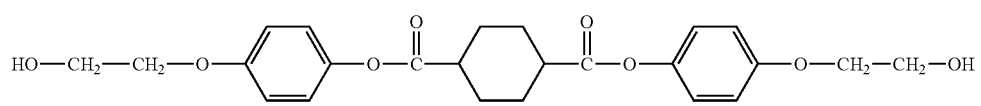
(24)
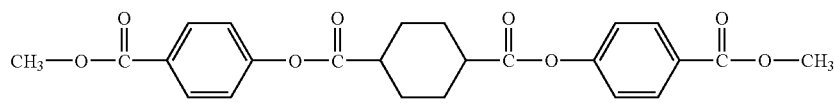
(25)
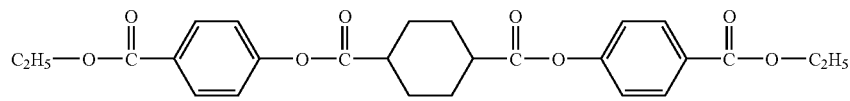
(26)
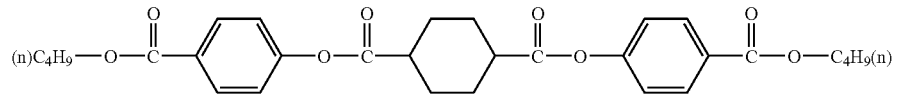
(27)
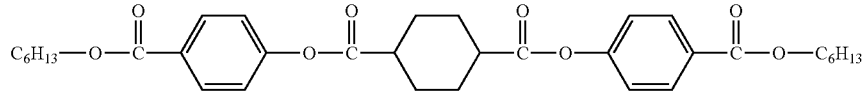
(28)
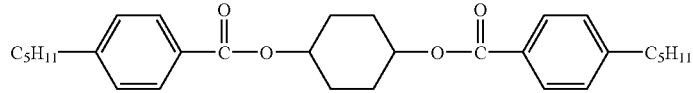
(29)
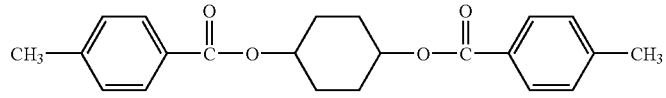
(30)
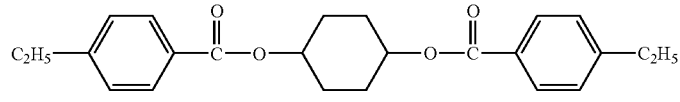
(31)
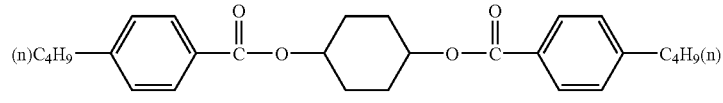
(32)
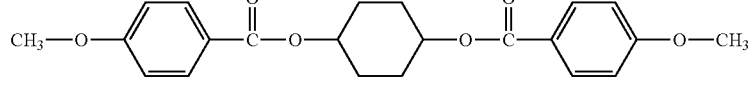
(33)
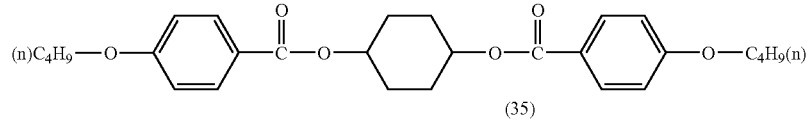
(34)
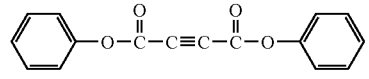
(35)
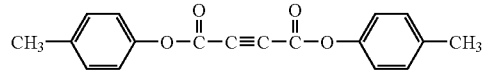
(36)

-continued
(37)
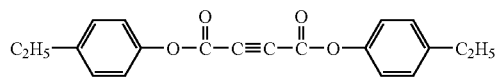
(38)
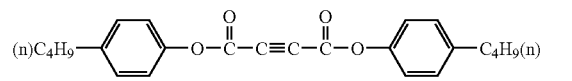
(39)
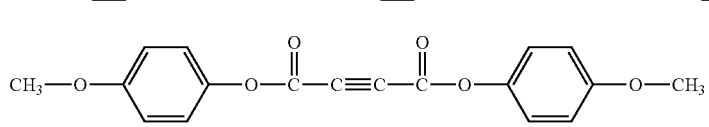
(40)
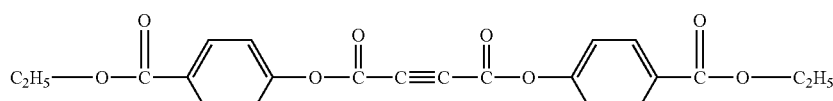
(41)
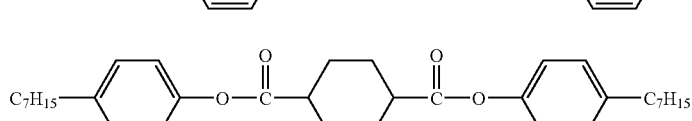
(42)
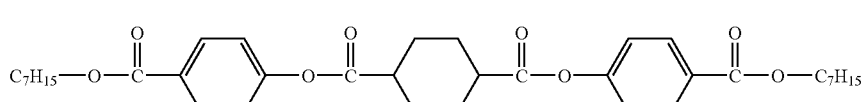
(43)
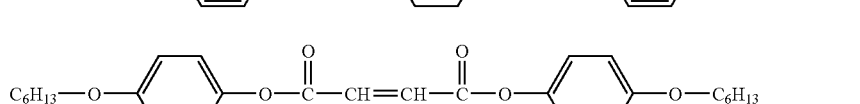
(44)
(45)
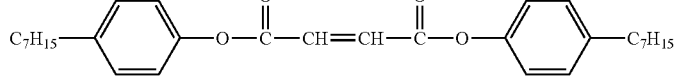
(46)
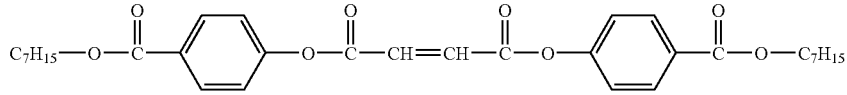
(47)
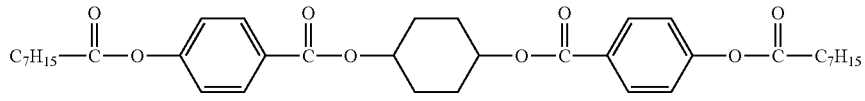
(48)
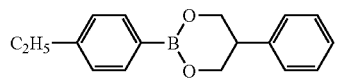
(49)
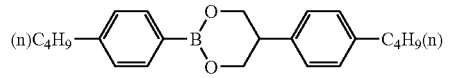
(50)
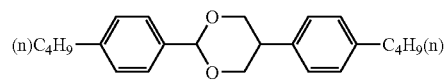
(51)
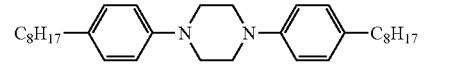
(52)
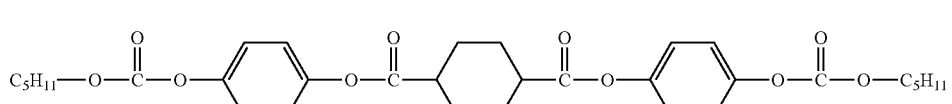
(53)
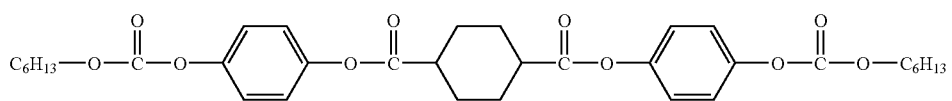

Exemplified compounds (1)-(34), (41), (42), (46), (47), (52) and (53) each has two asymmetric carbon atoms at 1- and 4-positions of the cyclohexane ring. However, Exemplified compounds (1), (4)-(34), (41), (42), (46), (47), (52) and (53) have no optical isomerism (optical activity) since they have symmetrical meso form molecular structure, and there are only geometric isomers thereof. Exemplified compound 1 in trans-form (1-trans) and that in cis-form (1-cis) are shown below.

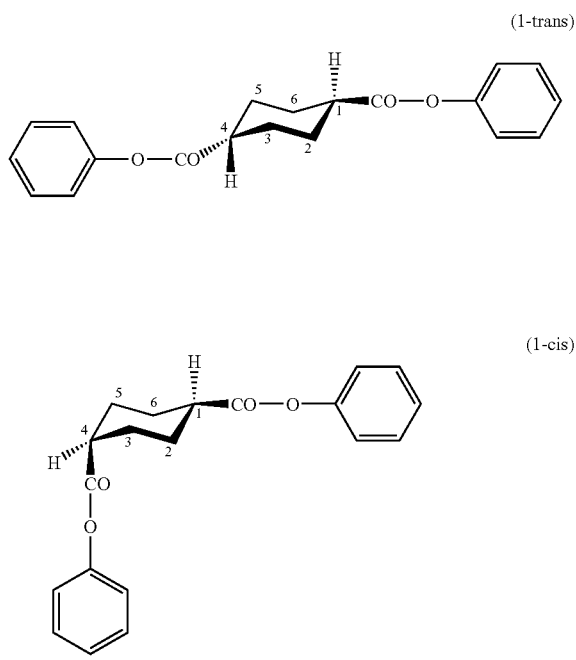

As above-mentioned, the rod-shaped compound preferably has a linear molecular structure. Therefore, the trans form is preferably to the cis-form. Exemplified compounds (2) and (3) have optical isomers additionally to the geometric isomers (four isomers in total). Regarding the geometric isomers, the trans-form is more preferable than the cis-form. There is no difference between the optical isomers and D-, L- and racemic-body are all employable. In Exemplified compounds (43)-(45), cis-form and trans-form are formed at the vinylene bond. The trans-form is preferable than the cis-form by the above-described reason.

Two kinds of the rod-shaped compounds each having the maximum absorption at a wavelength shorter than 250 nm may be employed in combination. "Mol. Cryst. Liq. Cryst." vol. 53, p. 229, 1979, ibid. vol. 89, p. 93, 1982, ibid. vol. 145, p. 111, 1987, and ibid. vol. 170, p. 43, 1989, "J. Am. Chem. Soc." Vol. 113, p. 1349, 1991, ibid. vol. 118, p. 5346, 1996, and ibid. vol. 92, p. 1582, 1970, "J. Org. Chem." Vol. 40, p. 420, 1975, and "Tetrahedron" vol. 48, No. 16, p. 3437, 1992 can be cited as relating documents.

Compounds disclosed in paragraphs [0020]-[0116] of JP-A 2005-179683 are preferably used in the retardation film of the present invention. Specific compounds are shown below:

(Phenyl Benzoate Ester Compound) The following describes the details of the compound expressed by Formula (6) used in the present invention:

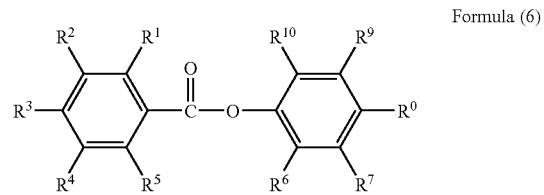

Formula (6)

(In the formula, $R^0$, $R^1$, $R^2$, $R^3$, $R^4$, $R^5$, $R^6$, $R^7$, $R^9$ and $R^{10}$ independently represent a hydrogen atom or substituent. At least one of the $R^1$, $R^2$, $R^3$, $R^4$ and $R^5$ denotes an electron-donating group.)

In Formula (6), $R^0$, $R^1$, $R^2$, $R^3$, $R^4$, $R^5$, $R^6$, $R^7$, $R^9$ and $R^{10}$ independently represent a hydrogen atom or a substituent. A substituent T (to be described later) can be applied to the substituent.

At least one of the $R^1$, $R^2$, $R^3$, $R^4$ and $R^5$ expresses an electron-donating group. At least one of the $R^1$, $R^3$ and $^5$ preferably represents an electron-donating group, and $R^3$ is more preferably an electron-donating group.

The electron-donating group indicates the group wherein the σp value of Hammet does not exceed 0. Preferably used is the electron-donating group described in Chem. Rev., 91, 165 (1991) wherein the σp value of Hammet does not exceed 0. More preferably used is the group wherein the σp value is in the range from −0.85 through 0. For example, an alkyl group, alkoxy group, amino group and hydroxyl group can be mentioned.

The electron-donating group preferably used in the present invention is exemplified by an alkyl group and alkoxy group. The more preferably used one is exemplified by an alkoxy group (containing preferably 1 through 12 carbon atoms, more preferably 1 through 8 carbon atoms, still more preferably 1 through 6 carbon atoms, and particularly preferably 1 through 4 carbon atoms).

$R^1$ preferably represents a hydrogen atom or electron-donating group; more preferably an alkyl group, alkoxy group, amino group and hydroxyl group; still more preferably an alkyl group having 1 through 4 carbon atoms and an alkoxy group or hydroxyl group having 1 through 12 carbon atoms; particularly preferably an alkoxy group (containing preferably 1 through 12 carbon atoms, more preferably 1 through 8 carbon atoms, still more preferably 1 through 6 carbon atoms, particularly preferably 1 through 4 carbon atoms); and most preferably a methoxy group.

$R^2$ preferably represents a hydrogen atom, alkyl group, alkoxy group, amino group and hydroxyl group, more preferably a hydrogen atom, alkyl group and alkoxy group, and still more preferably hydrogen atom, alkyl group (containing preferably 1 through 4 carbon atoms, and more preferably a methyl group), and alkoxy group (containing preferably 1 through 12 carbon atoms, more preferably 1 through 8 carbon atoms, still more preferably 1 through 6 carbon atoms, and particularly 1 through 4 carbon atoms). The hydrogen atom, methyl group and methoxy group are used with particular preference. The hydrogen atom is most preferably utilized.

$R^3$ preferably represents a hydrogen atom or electron-donating group, more preferably a hydrogen atom, alkyl group, alkoxy group, amino group and hydroxyl group, still more preferably an alkyl group and alkoxy group, and particularly an alkoxy group (containing preferably 1 through 12 carbon atoms, more preferably 1 through 8 carbon atoms, still more preferably 1 through 6 carbon atoms, and particularly preferably 1 through 4 carbon atoms). The most preferred groups are an n-propoxy group, ethoxy group and methoxy group.

$R^4$ preferably represents a hydrogen atom or electron-donating group; more preferably hydrogen atom, alkyl group, alkoxy group, amino group and hydroxyl group; still more preferably a hydrogen atom, alkyl group having 1 through 4 carbon atoms, and alkoxy group having 1 through 12 carbon atoms (containing preferably 1 through 12 carbon atoms, more preferably 1 through 8 carbon atoms, still more preferably 1 through 6 carbon atoms, and particularly 1 through 4 carbon atoms); particularly hydrogen atom, alkyl group having 1 through 4 carbon atoms and alkoxy group having 1 through 4 carbon atoms; and most preferably a hydrogen atom, methyl group and methoxy group.

$R^5$ preferably represents a hydrogen atom, alkyl group, alkoxy group, amino group and hydroxyl group; more preferably a hydrogen atom, alkyl group and alkoxy group; still more preferably hydrogen atom, alkyl group (containing preferably 1 through 4 carbon atoms, and more preferably methyl group) and alkoxy group (containing preferably 1 through 12 carbon atoms, more preferably 1 through 8 carbon atoms, still more preferably 1 through 6 carbon atoms, and preferably 1 through 4 carbon atoms); particularly hydrogen atom, methyl group and methoxy group; and most preferably a hydrogen atom.

$R^6$, $R^7$, $R^9$ and $R^{10}$ preferably represent a hydrogen atom, an alkyl group containing 1 through 12 carbon atoms, an alkoxy group containing 1 through 12 carbon atoms, and a halogen atom; more preferably, hydrogen atom and halogen atom; and still more preferably hydrogen atom.

$R^0$ denotes a hydrogen atom or substituent. $R^0$ preferably represents a hydrogen atom, alkyl group containing 1 through 4 carbon atoms, alkynyl group containing 2 through 6 carbon atoms, aryl group containing 6 through 12 carbon atoms, alkoxy group containing 1 through 12 carbon atoms, aryloxy group containing 6 through 12 carbon atoms, alkoxy carbonyl group containing 2 through 12 carbon atoms, acyl amino group containing 2 through 12 carbon atoms, cyano group, carbonyl group or halogen atom.

In Formula (6), the following Formula (7) is more preferably employed.

The following describes the details of the compounds given in Formula (7):

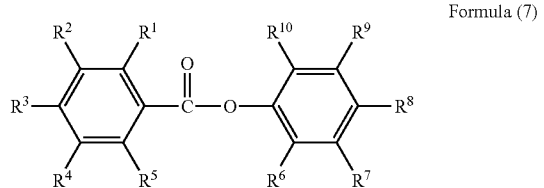

Formula (7)

In the formula, $R^1$, $R^2$, $R^3$, $R^4$, $R^5$, $R^6$, $R^7$, $R^9$ and $R^{10}$ independently represent a hydrogen atom or substituent. At least one of the $R^1$, $R^2$, $R^3$, $R^4$ and $R^5$ denotes an electron-donating group. $R^8$ indicates a hydrogen atom, an alkyl group containing 1 through 4 carbon atoms, alkynyl group containing 2 through 6 carbon atoms, aryl group containing 6 through 12 carbon atoms, alkoxy group containing 1 through 12 carbon atoms, aryloxy group containing 6 through 12 carbon atoms, alkoxy carbonyl group containing 2 through 12 carbon atoms, acyl amino group containing 2 through 12 carbon atoms, cyano group, carbonyl group or halogen atom.

$R^8$ indicates a hydrogen atom, an alkyl group containing 1 through 4 carbon atoms, alkynyl group containing 2 through 12 carbon atoms, aryl group containing 6 through 12 carbon atoms, alkoxy group containing 1 through 12 carbon atoms, aryloxy group containing 6 through 12 carbon atoms, alkoxy carbonyl group containing 2 through 12 carbon atoms, acyl amino group containing 2 through 12 carbon atoms, cyano group, carbonyl group or halogen atom. If possible, a substituent may be contained. The substituent T to be described later can be used as a substituent. Further replacement by a substituent is also permitted.

$R^8$ preferably represents an alkyl group containing 1 through 4 carbon atoms, alkynyl group containing 2 through 12 of carbon atoms, aryl group containing 6 through 12 of carbon atoms, alkoxy group containing 1 through 12 of carbon atoms, alkoxy carbonyl group containing 2 through 12 of carbon atoms, acyl amino group containing 2 through 12 of carbon atoms and cyano group; more preferably an alkynyl group containing 2 through 12 carbon atoms, aryl group containing 6 through 12 carbon atoms, alkoxy carbonyl group containing 2 through 12 carbon atoms, acyl amino group containing 2 through 12 carbon atoms, and cyano group; still more preferably an alkynyl group containing 2 through 7, aryl group containing 6 through 12 carbon atoms, alkoxy carbonyl group containing 2 through 6 carbon atoms, acyl amino group containing 2 through 7 carbon atoms, and cyano group; particularly a phenyl ethynyl group, phenyl group, p-cyanophenyl group, p-methoxyphenyl group, benzoylamino group, n-propoxy carbonyl group, ethoxy carbonyl group, methoxy carbonyl group, and cyano group.

In Formula (7), the following Formula (7-A) is more preferred:

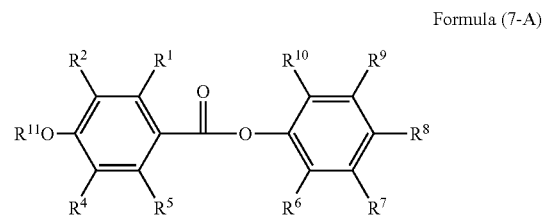

Formula (7-A)

In the formula, $R^1$, $R^2$, $R^4$, $R^5$, $R^6$, $R^7$, $R^9$ and $R^{10}$ independently represent a hydrogen atom or substituent. $R^8$ represents a hydrogen atom, alkyl group containing 1 through 4 carbon atoms, alkynyl group containing 2 through 12 carbon atoms, aryl group containing 6 through 12 carbon atoms, alkoxy group containing 1 through 12 carbon atoms, aryloxy group containing 6 through 12 carbon atoms, alkoxy carbonyl group containing 2 through 12 carbon atoms, acyl amino group containing 2 through 12 carbon atoms, cyano group, carbonyl group or halogen atom. $R^{11}$ denotes an alkyl group containing 1 through 12 carbon atoms.

In Formula (7-A), $R^1$, $R^2$, $R^1$, $R^5$, $R^6$, $R^7$, $R^8$, $R^9$ and $R^{10}$ each are synonymous with those in the Formula (7). Their preferred ranges are also the same.

In Formula (7-A), $R^{11}$ denotes an alkyl group containing 1 through 12 carbon atoms. The alkyl group represented by $R^{11}$ can be either a straight chain or branched chain group. Further, it may contain a substituent. $R^{11}$ is preferably an alkyl group containing 1 through 12 carbon atoms, more preferably alkyl group containing 1 through 8 carbon atoms, still more preferably alkyl group containing 1 through 6 carbon atoms, particularly alkyl group containing 1 through 4 carbon atoms (exemplified by a methyl group, ethyl group, n-propyl group, iso-propyl group, n-butyl group, iso-butyl group and tert-butyl group).

In Formula (7), the following Formula (7-B) is more preferred:

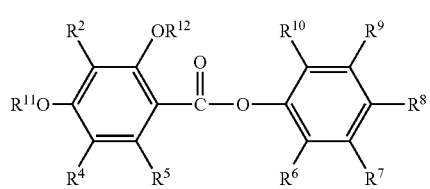

Formula (7-B)

In the formula, $R^2$, $R^4$, $R^5$, $R^6$, $R^7$, $R^9$ and $R^{10}$ independently represent a hydrogen atom or substituent. $R^8$ denotes a hydrogen atom, alkyl group containing 1 through 4 carbon atoms, alkynyl group containing 2 through 12 carbon atoms, aryl group containing 6 through 12 carbon atoms, alkoxy group containing 1 through 12 carbon atoms, aryloxy group containing 6 through 12 carbon atoms, alkoxy carbonyl group containing 2 through 12 carbon atoms, acyl amino group containing 2 through 12 carbon atoms, cyano group, carbonyl group or halogen atom. $R^{11}$ indicates an alkyl group containing 1 through 12 carbon atoms. $R^{12}$ shows a hydrogen atom or alkyl group containing 1 through 4 carbon atoms.

In Formula (7-B), $R^2$, $R^4$, $R^5$, $R^6$, $R^7$, $R^7$, $R^8$, $R^{10}$ and $R^{11}$ are synonymous with those in the Formula (13-A). Their preferred ranges are also the same.

In Formula (7-B), $R^{12}$ shows a hydrogen atom or alkyl group containing 1 through 4 carbon atoms, preferably hydrogen atom or alkyl group containing 1 through 3 carbon atoms, more preferably a hydrogen atom, methyl group and ethyl group, still more preferably a hydrogen atom or methyl group, particularly methyl group.

In Formula (7-B), the following Formula (8) or (7-C) is more preferred.

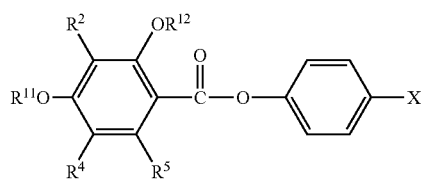

Formula (8)

In the formula, $R^2$, $R^4$, $R^5$, $R^{11}$ and $R^{12}$ are synonymous with those in Formula (7-B). Their preferred ranges are also the same. X denotes an alkynyl group containing 2 through 7 carbon atoms, aryl group containing 6 through 12 carbon atoms, alkoxy carbonyl group containing 2 through 6 carbon atoms, acyl amino group containing 2 through 7 carbon atoms or cyano group.

In Formula (8), X denotes an alkynyl group containing 2 through 7 carbon atoms, aryl group containing 6 through 12 carbon atoms, alkoxy carbonyl group containing 2 through 6 carbon atoms, acyl amino group containing 2 through 7 carbon atoms and cyano group; preferably a phenylethyl group, phenyl group, p-cyanophenyl group, p-methoxyphenyl group, benzoylamino group, alkoxy carbonyl group containing 2 through 4 carbon atoms and cyano group; more preferably a phenyl group, p-cyano phenyl group, p-methoxy phenyl group, alkoxy carbonyl group containing 2 through 4 carbon atoms or cyano group.

The following describes Formula (7-C).

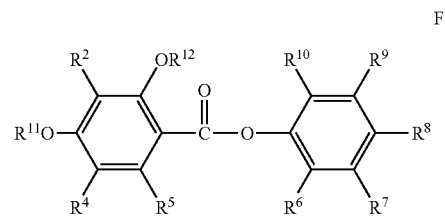

Formula (7-C)

In the formula, $R^2$, $R^4$ and $R^5$ are synonymous with those in Formula (7-B). Their preferred ranges are also the same. However, one of them pertains to a group represented by —$OR^{13}$ (wherein $R^{13}$ denotes an alkyl group containing 1 through 4 carbon atoms). $R^6$, $R^7$, $R^8$, $R^9$, $R^{10}$, $R^{11}$ and $R^{12}$ are synonymous with those in Formula (7-B). Their preferred ranges are also the same.

In Formula (7-C), $R^2$, $R^4$ and $R^5$ are synonymous with those in Formula (7-B). Their preferred ranges are also the same. However, one of them is a group represented by —$OR^{13}$ (wherein $R^{13}$ denotes an alkyl group containing 1 through 4 carbon atoms), preferably a group wherein $R^4$ and $R^5$ are represented by —$OR^{13}$, more preferably a group wherein $R^4$ is represented by —$OR^{13}$.

$R^{13}$ represents an alkyl group containing 1 through 4 carbon atoms, preferably an alkyl group containing 1 through 3 carbon atoms, more preferably an ethyl group and methyl group, still more preferably a methyl group.

In Formula (7-C), the following Formula (7-D) is more preferred.

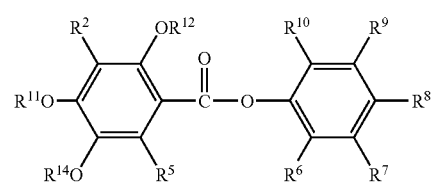

Formula (7-D)

In the formula, $R^2$, $R^5$, $R^6$, $R^7$, $R^8$, $R^9$, $R^{10}$, $R^{11}$ and $R^{12}$ are synonymous with those in the Formula (7-C). Their preferred ranges are also the same. $R^{14}$ represents an alkyl group containing 1 through 4 carbon atoms.

$R^{14}$ is an alkyl group containing 1 through 4 carbon atoms, preferably an alkyl group containing 1 through 3 carbon atoms, more preferably ethyl group and methyl group, still more preferably a methyl group.

In Formula (7-D), the following Formula (7-E) is more preferred:

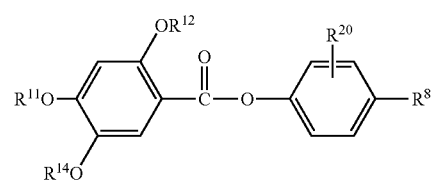

Formula (7-E)

In the formula, $R^8$, $R^{11}$, $R^{12}$ and $R^{14}$ are synonymous with those in Formula (7-D). Their preferred ranges are also the same. $R^{20}$ indicates a hydrogen atom or substituent.

$R^{20}$ represents a hydrogen atom or substituent. The substituent T to be described later can be used as a substituent. The $R^{20}$ can be replaced at any position of the benzene ring directly connected thereto, but $R^{20}$ does not occur in the plural. $R^{20}$ preferably represents a substituent wherein the number of the constituent atoms except for hydrogen from the number of all atoms of the hydrogen atom or substituent does not exceed 4. More preferably it represents a substituent wherein the number of the constituent atoms except for hydrogen from the number of all atoms of the hydrogen atom or substituent does not exceed 3. Still more preferably it represents a substituent wherein the number of the constituent atoms except for hydrogen from the number of all atoms of the hydrogen atom or substituent does not exceed 2. It is particularly preferred that it should represent a hydrogen atom, methyl group, methoxy group, halogen atom, formyl group and cyano group. Of these, a hydrogen atom is used in particular preference.

The following describes the aforementioned substituent T:

The aforementioned substituent T is exemplified by:

an alkyl group (preferably containing 1 through 20 carbon atoms, more preferably containing 1 through 12 carbon atoms, particularly containing 1 through 8 carbon atoms, wherein methyl, ethyl, iso-propyl, tert-butyl, n-octyl, n-desyl, n-hexadesyl, cyclopropyl, cyclopentyl and cyclohexyl can be mentioned as specific examples);

an alkenyl group (preferably containing 2 through 20 carbon atoms, more preferably containing 2 through 12 carbon atoms, particularly containing 2 through 8 carbon atoms, wherein vinyl, alyl, 2-butenyl and 3-pentenyl can be mentioned as specific examples);

an alkynyl group (preferably containing 2 through 20 carbon atoms, more preferably containing 2 through 12 carbon atoms, particularly containing 2 through 8 carbon atoms, wherein propargyl and 3-pentynyl can be mentioned as specific examples);

an aryl group (preferably containing 6 through 30 carbon atoms, more preferably containing 6 through 20 carbon atoms, particularly containing 6 through 12 carbon atoms, wherein phenyl, p-methylphenyl and naphthyl can be mentioned as specific examples);

a substituted or unsubstituted amino group (preferably containing 0 through 20 carbon atoms, more preferably containing 0 through 10 carbon atoms, particularly containing 0 through 6 carbon atoms, wherein amino, methylamino, dimethyl amino, diethyl amino and dibenzylamino can be mentioned as specific examples);

an alkoxy group (preferably containing 1 through 20 carbon atoms, more preferably containing 1 through 12 carbon atoms, particularly containing 1 through 8 carbon atoms, wherein methoxy, ethoxy and butoxy can be mentioned as specific examples);

an aryloxy group (preferably containing 6 through 20 carbon atoms, more preferably containing 6 through 16 carbon atoms, particularly containing 6 through 12 carbon atoms, wherein phenyloxy and 2-naphthyloxy can be mentioned as specific examples);

an acyl group (preferably containing 1 through 20 carbon atoms, more preferably containing 1 through 16 carbon atoms, particularly containing 1 through 12 carbon atoms, wherein acetyl, benzoyl, formyl and pivaloyl can be mentioned as specific examples);

an alkoxy carbonyl group (preferably containing 2 through 20 carbon atoms, more preferably containing 2 through 16 carbon atoms, particularly containing 2 through 12 carbon atoms, wherein methoxy carbonyl and ethoxy carbonyl can be mentioned as specific examples);

an aryloxy carbonyl group (preferably containing 7 through 20 carbon atoms, more preferably containing 7 through 16 carbon atoms, particularly containing 7 through 10 carbon atoms, wherein phenyloxy carbonyl can be mentioned as specific examples);

an acyloxy group (preferably containing 2 through 20 carbon atoms, more preferably containing 2 through 16 carbon atoms, particularly containing 2 through 10 carbon atoms, wherein acetoxy and benzoyloxy can be mentioned as specific examples);

an acyl amino group (preferably containing 2 through 20 carbon atoms, more preferably containing 2 through 16 carbon atoms, particularly containing 2 through 10 carbon atoms wherein acetylamino and benzoylamino can be mentioned as specific examples);

an alkoxy carbonyl amino group (preferably containing 2 through 20 carbon atoms, more preferably containing 2 through 16 carbon atoms, particularly containing 2 through 12 carbon atoms wherein methoxy carbonyl amino can be mentioned as specific examples);

an aryloxy carbonyl amino group (preferably containing 7 through 20 carbon atoms, more preferably containing 7 through 16 carbon atoms, particularly containing 7 through 12 carbon atoms wherein phenyloxy carbonyl amino can be mentioned as specific examples);

a sulfonyl amino group (preferably containing 1 through 20 carbon atoms, more preferably containing 1 through 16 carbon atoms, particularly containing 1 through 12 carbon atoms wherein methane sulfonylamino and benzenesulfonyl amino can be mentioned as specific examples);

a sulfamoyl group (preferably containing 0 through 20 carbon atoms, more preferably containing 0 through 16 carbon atoms, particularly containing 0 through 12 carbon atoms wherein sulfamoyl, methylsulfamoyl, dimethyl sulfamoyl and phenyl sulfamoyl can be mentioned as specific examples);

a carbamoyl group (preferably containing 1 through 20 carbon atoms, more preferably containing 1 through 16 carbon atoms, particularly containing 1 through 12 carbon atoms wherein carbamoyl, methylcarbamoyl, diethylcarbamoyl and phenyl carbamoyl can be mentioned as specific examples);

an alkylthio group (preferably containing 1 through 20 carbon atoms, more preferably containing 1 through 16 carbon atoms, particularly containing 1 through 12 carbon atoms wherein methylthio and ethylthio can be mentioned as specific examples);

an arylthio group (preferably containing 6 through 20 carbon atoms, more preferably containing 6 through 16 carbon atoms, particularly containing 6 through 12 carbon atoms wherein phenylthio can be mentioned as specific examples);

a sulfonyl group (preferably containing 1 through 20 carbon atoms, more preferably containing 1 through 16 carbon atoms, particularly containing 1 through 12 carbon atoms wherein mesyl and tosyl can be mentioned as specific examples);

a sulfynyl group (preferably containing 1 through 20 carbon atoms, more preferably containing 1 through 16 carbon atoms, particularly containing 1 through 12 carbon atoms wherein methane sulfynyl and benzenesulfynyl can be mentioned as specific examples);

an ureido group (preferably containing 1 through 20 carbon atoms, more preferably containing 1 through 16 carbon atoms, particularly containing 1 through 12 carbon atoms wherein ureido, methylureido and phenyl ureido can be mentioned as specific examples);

a phosphoramide group (preferably containing 1 through 20 carbon atoms, more preferably containing 1 through 16 carbon atoms, particularly containing 1 through 12 carbon atoms wherein diethyl phosphoramide, phenyl phosphoramide can be mentioned as specific examples);

a hydroxy group;

a mercapto group;

a halogen atom (fluorine atom, chlorine atom, bromine atom and iodine atom can be mentioned as specific examples);

a cyano group;

a sulfo group;

a carboxyl group;

a nitro group;

a hydroxamic acid group;

a sulfino group;

a hydrazino group;

an imino group;

a heterocyclic group (preferably containing 1 through 30 carbon atoms, more preferably containing 1 through 12 carbon atoms wherein the hetero atom is exemplified by a nitrogen atom, oxygen atom and sulfur atom, specifically by imidazolyl, pyridyl, quinolyl, furyl, piperidyl, morpholino, benzooxazolyl, benzimidazol and benzthiazolyl can be mentioned as specific examples); and a silyl group (preferably containing 3 through 40 carbon atoms, more preferably containing 3 through 30 carbon atoms, particularly containing 3 through 24 carbon atoms wherein trimethylsilyl and triphenylsilyl can be mentioned as specific examples).

Their substituents can be further replaced.

Two or more substituents, if any, can be the same or different from each other. Further, they may form a ring through mutual bondage wherever possible.

The following describes the specific examples of the compounds represented by Formula (6) without the present invention being restricted thereto.

A-14
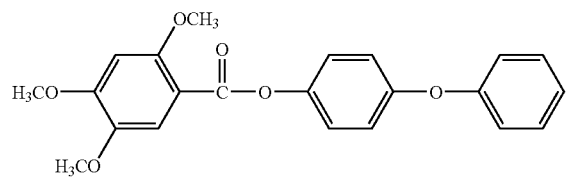
A-15
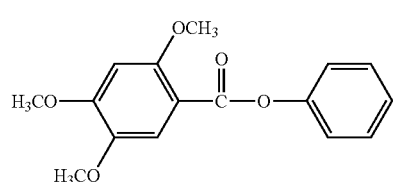
A-16
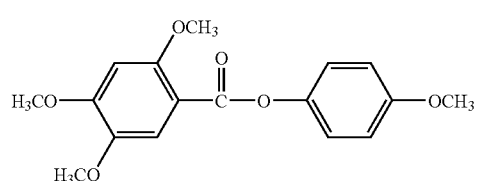
A-17
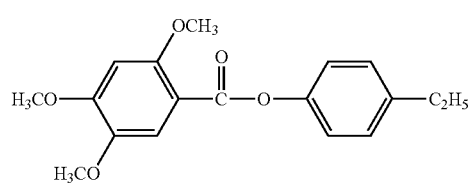
A-18
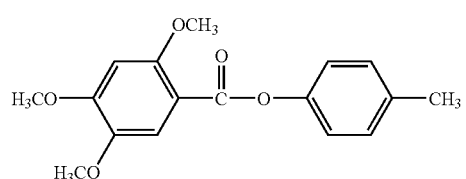
A-19
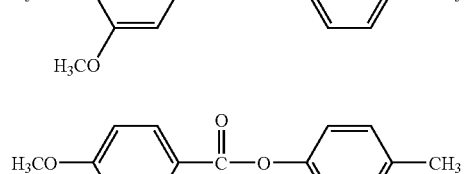
A-20
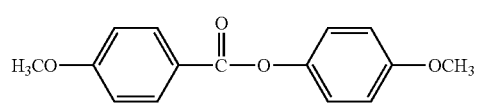
A-21
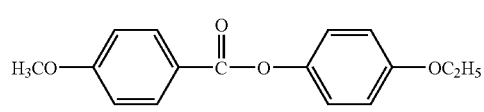
A-22
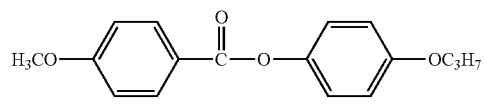
A-23
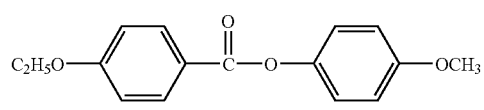
A-24
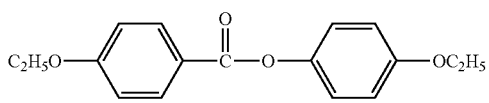
A-25
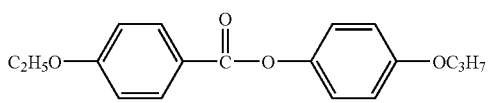
A-26
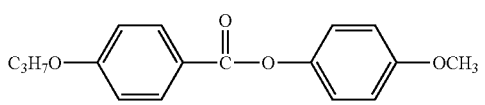
A-27
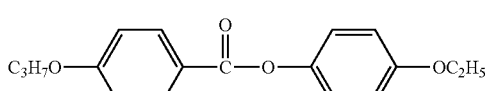
A-28
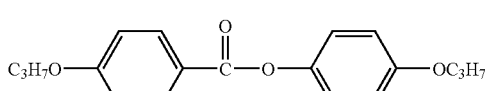
A-29
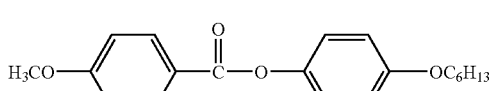
A-30
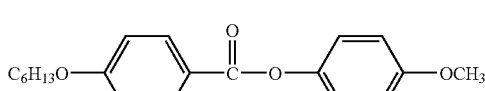
A-31
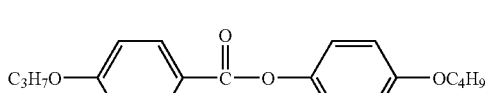
A-32
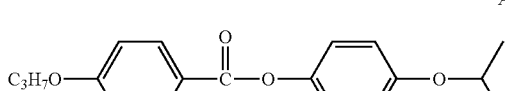
A-33
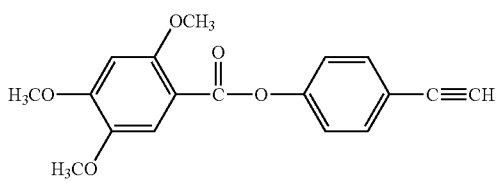
A-34
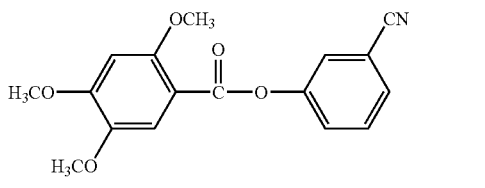

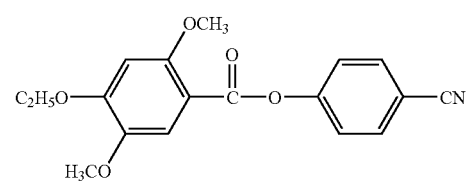 A-35
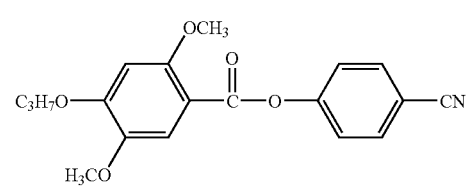 A-36
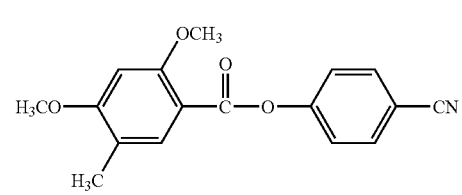 A-37
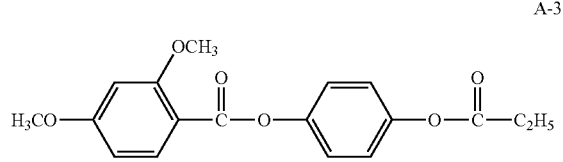 A-38
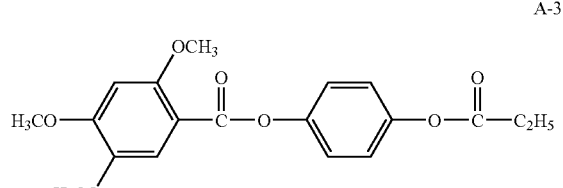 A-39
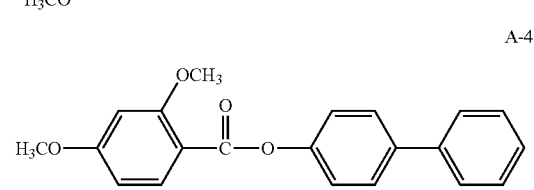 A-40
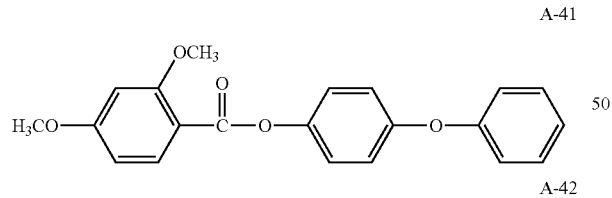 A-41
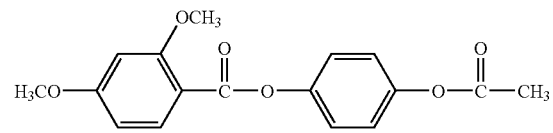 A-42
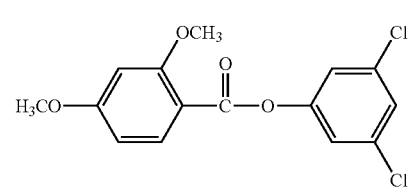 A-43
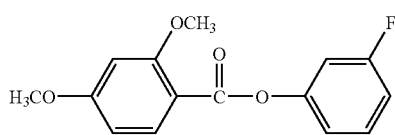 A-45
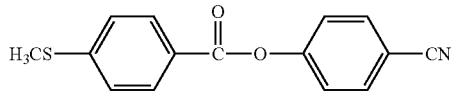 A-46
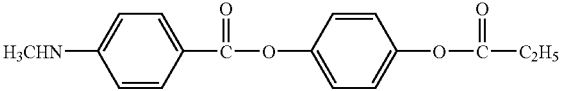 A-47
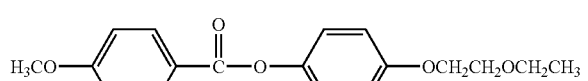 A-48
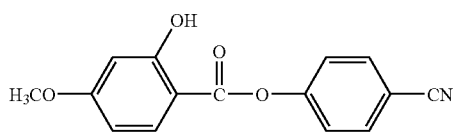 A-49
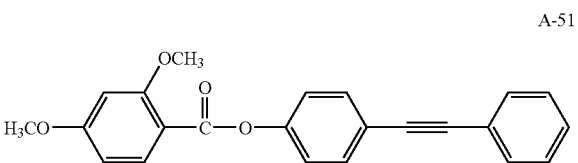 A-50
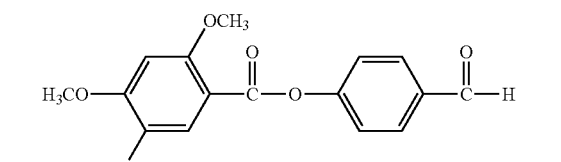 A-51
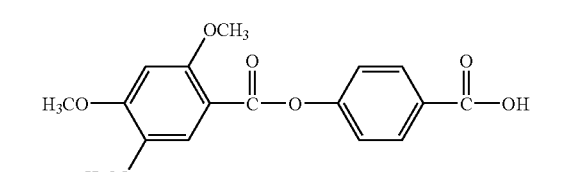 A-52
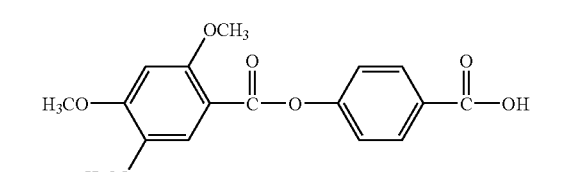 A-53
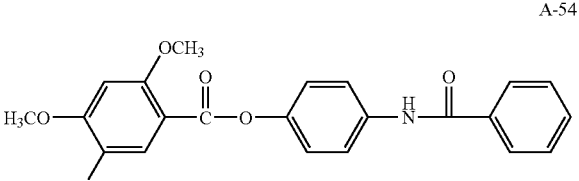 A-54

A-55
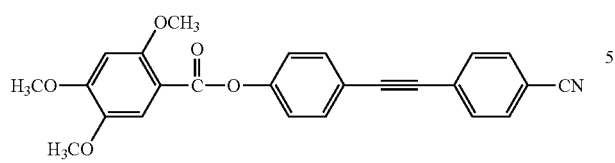

A-56
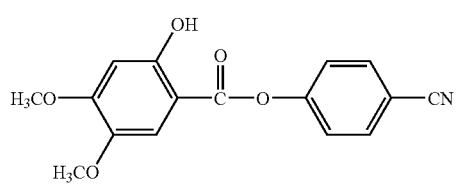

A-57
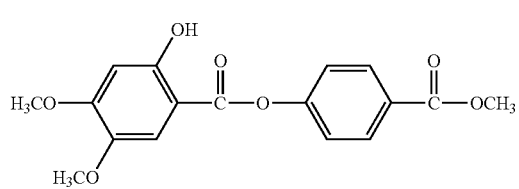

A-58
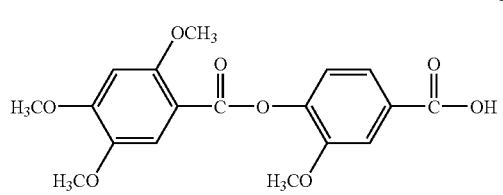

A-59
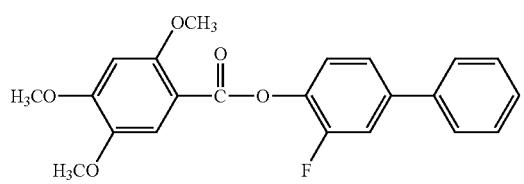

A-60
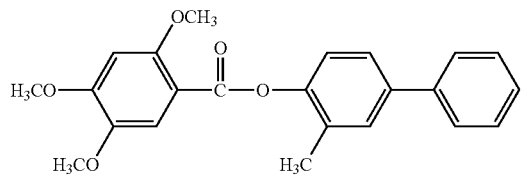

A-61
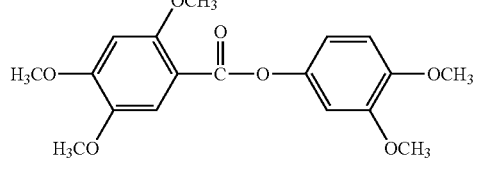

A-62
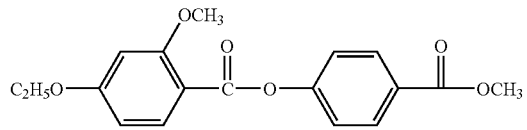

A-63
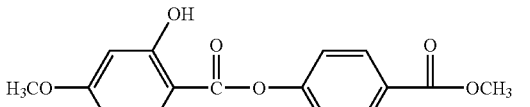

A-64
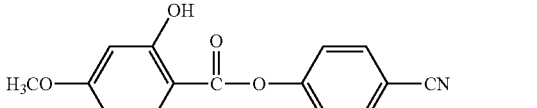

A-65
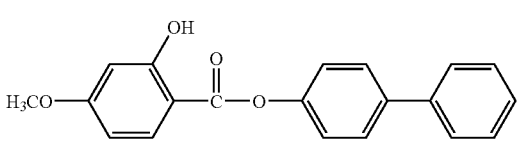

The compound expressed by Formula (6) can be synthesized by the general ether linkage reaction between a substituted benzoic acid and phenol derivative, wherein any form of reaction can be used if only the reaction forms an ester linkage. For example, it is possible to use the method for condensation with phenol subsequent to functional conversion of the substituted benzoic acid into an acid halide. Further, it is also possible to use the method for dehydration and condensation of the substituted benzoic acid and phenol derivative utilizing a condensing agent or catalyst.

When the manufacturing process is taken into account, it is preferred to use the method for condensation with phenol subsequent to functional conversion of the substituted benzoic acid into an acid halide.

A hydrocarbon solvent (preferably toluene and xylene), ether based solvent (preferably dimethyl ether, tetrahydrofuran, dioxane), ketone based solvent, ester based solvent, acetonitryl, dimethylformamide, and dimethyl acetoamide can be used as a reaction solvent. These solvents can be used independently or as a mixture. The reaction solvent is preferably exemplified by toluene, acetonitryl, dimethylformamide and dimethyl acetoamide.

The reaction temperature is preferably 0° C. through 150° C., more preferably 0° C. through 100° C., still more preferably 0° C. through 90° C., and particularly 20° C. through 90° C.

It is preferred in this reaction that a salt group should not be utilized. When the salt group is used, either an organic or inorganic salt group can be employed. However, the organic salt group is preferably used, and is exemplified by pyridine and tertiary alkylamine (preferably triethylamine and ethyl diisopropylamine).

The following describes a specific method of synthesizing the compound, without the present invention being restricted thereto:

Example of Synthesis 1

Synthesis of Illustrated Compound A-1

After heating 24.6 g (0.116 mol) of 3,4,5-trimethoxybenzoic acid, 100 ml of toluene and 1 ml of N—N-dimethylformamide to 60° C., 15.2 g (0.127 mol) of thionyl chloride was slowly added dropwise, and this mixture was heated at 60° C. for two hours. Then 15.1 g (0.127 mol) of 4-cyanophenol dissolved previously into 50 ml of acetonitryl was slowly added dropwise into this solution. After that, the solution was heated and stirred at 60° C. for 3 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 100 ml of acetonitryl was added to the solid having been obtained, thereby recrystalizing the mixture. The acetonitryl solution was cooled down to the room temperature, and the crystal having been precipitated was recovered by filtration, whereby 11.0 g (yield 11%) of the target compound was obtained as a white crystal. In this case, the compound was identified by 1H-NMR (400 MHz) and mass spectrum.

1H-NMR (CDCl3) δ3.50 (br, 9H), 7.37 (d, 2H), 7.45 (s, 2H), 7.77 (s, 2H), Mass spectrum: m/z 314 (M+H)$^+$, The compound having been obtained has a melting point of 172° C. through 173° C.

Example of Synthesis 2

Synthesis of Illustrated Compound A-2

After heating 106.1 g (0.5 mol) of 2,4,5-trimethoxybenzoic acid, 340 ml of toluene and 1 ml of dimethylformamide to 60° C., 65.4 g (0.55 mol) of thionyl chloride was slowly added dropwise, and this mixture was heated for 2 hours at 65° C. through 70° C. Then 71.5 g (0.6 mol) of 4-cyanophenol previously dissolved into 150 ml of acetonitryl was slowly added dropwise into this solution. After that, the solution was heated and stirred at 80° C. through 85° C. for 2 hours, and the reaction solution was cooled down to the room temperature. Then ethyl acetate (1 L) and water were used to perform liquid separation, and sodium sulfate was used to remove water from the organic phase having been obtained. Approximately 500 ml of solvent was distilled off under reduced pressure, and 1 L of methanol was added to the solid having been obtained, thereby recrystalizing the mixture. The crystal having been precipitated was recovered by filtration, whereby 125.4 g (yield 80%) of the target compound was obtained as a white crystal. In this case, the compound was identified by 1H-NMR (400 MHz) and mass spectrum.

1H-NMR (CDCl3) δ3.91 (s, 3H), 3.93 (s, 3H), 3.98 (s, 3H), 6.59 (s, 1H), 7.35 (d, 2H), 7.58 (s, 1H), 7.74 (d, 2H), Mass spectrum: m/z 314 (M+H)$^+$, The compound having been obtained has a melting point of 116° C.

Example of Synthesis 3

Synthesis of Illustrated Compound A-3

After heating 10.1 g (47.5 mM) of 2,3,4-trimethoxybenzoic acid, 40 ml of toluene and 0.5 ml of dimethylformamide to 80° C., 6.22 g (52.3 mM) of thionyl chloride was slowly added dropwise, and this mixture was heated and stirred for 2 hours at 80° C. Then 6.2 g (52.3 mM) of 4-cyanophenol previously dissolved into 20 ml of acetonitryl was slowly added dropwise into this solution. After that, the solution was heated and stirred at 80° C. through 85° C. for 2 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 50 ml of methanol was added, thereby recrystalizing the mixture. The crystal having been precipitated was recovered by filtration, whereby 11.9 g (yield 80%) of the target compound was obtained as a white crystal. In this case, the compound was identified by 1H-NMR (400 MHz) and mass spectrum.

1H-NMR (CDCl3): δ3.50 (br, 9H), 7.37 (d, 2H), 7.45 (s, 2H), 7.77 (s, 2H), Mass spectrum: m/z 314 (M+H)$^+$, The compound having been obtained has a melting point of 102° C. through 103° C.

Example of Synthesis 4

Synthesis of Illustrated Compound A-4

After heating 25.0 g (118 mM) of 2,4,6-trimethoxybenzoic acid, 100 ml of toluene and 1 ml of dimethylformamide to 60° C., 15.4 g (129 mM) of thionyl chloride was slowly added dropwise, and this mixture was heated and stirred for 2 hours at 60° C. Then 15.4 g (129 mM) of 4-cyanophenol previously dissolved into 50 ml of acetonitryl was slowly added dropwise into this solution. After that, the solution was heated and stirred at 80° C. through 85° C. for 4.5 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 500 mL of methanol and 100 ml of acetonitryl were added, thereby recrystalizing the mixture. The crystal having been precipitated was recovered by filtration, whereby 10.0 g (yield 27%) of the target compound was obtained as a white crystal. In this case, the compound was identified by mass spectrum.

Mass spectrum: m/z 314 (M+H)$^+$,

The compound having been obtained has a melting point of 172° C. through 173° C.

Example of Synthesis 5

Synthesis of Illustrated Compound A-5

After heating 15.0 g (82.3 mM) of 2,3-dimethoxybenzoic acid, 60 ml of toluene and 0.5 ml of dimethylformamide to 60° C., thionyl chloride 10.7 (90.5 mM) was slowly added dropwise, and this mixture was heated and stirred for 2 hours at 60° C. Then 10.8 g (90.5 mM) of 4-cyanophenol previously dissolved into 30 ml of acetonitryl was slowly added dropwise into this solution. After that, the solution was heated and stirred at 70° C. through 80° C. for 7 hours, and the reaction solution was cooled down to the room temperature. Then 90 ml of isopropyl alcohol was added, and the crystal having been precipitated was recovered by filtration, whereby 12.3 g (yield 53%) of the target compound was obtained as a white crystal. In this case, the compound was identified by mass spectrum.

Mass spectrum: m/z 284 (M+H)$^+$,

The compound having been obtained has a melting point of 104° C.

Example of Synthesis 6

Synthesis of Illustrated Compound A-6

The compound A-6 was synthesized according to the same procedure as that in the Example of synthesis 5, except that 2,3-dimethoxybenzoic acid of the Example of synthesis 5 was replaced by 2,4-dimethoxybenzoic acid. The compound was identified by mass spectrum.

Mass spectrum: m/z 284 (M+H)+,

The compound having been obtained has a melting point of 134° C. through 136° C.

Example of Synthesis 7

Synthesis of Illustrated Compound A-7

After heating 25.0 g (137 mM) of 2,5-dimethoxybenzoic acid, 100 ml of toluene and 1.0 ml of dimethylformamide to 60° C., 18.0 (151 mM) of thionyl chloride was slowly added dropwise, and this mixture was heated and stirred for 2 hours at 60° C. Then 18.0 g (151 mM) of 4-cyanophenol previously dissolved in 50 ml of acetonitryl was slowly added dropwise into this solution. After that, the solution was heated and stirred at 70° C. through 80° C. for 7.5 hours, and the reaction solution was cooled down to the room temperature. Then ethyl acetate and saturated saline solution were used to perform liquid separation, and sodium sulfate was used to remove water from the organic phase having been obtained. The solvent was distilled off under reduced pressure, and silica gel column chromatography (hexane-ethyl acetate (9/1, V/V)) was used for purification, whereby 18.8 g (yield 48%) of the target compound was obtained as a white crystal. In this case, the compound was identified by mass spectrum.

Mass spectrum: m/z 284 (M+H)+,

The compound having been obtained has a melting point of 79° C. through 80° C.

Example of Synthesis 8

Synthesis of Illustrated Compound A-8

The compound A-8 was synthesized according to the same procedure as that in the Example of synthesis 5, except that 2,3-dimethoxybenzoic acid of the Example of synthesis 5 was replaced by 2,6-dimethoxybenzoic acid. The compound was identified by mass spectrum.

Mass spectrum: m/z 284 (M+H)+,

The compound having been obtained has a melting point of 130° C. through 131° C.

Example of Synthesis 9

Synthesis of Illustrated Compound A-11

The compound A-11 was synthesized according to the same procedure as that in the Example of synthesis 2, except that 71.5 g of 4-cyanophenol of the Example of synthesis 2 was replaced by 76.9 g of 4-chlorophenol. The compound was identified by 1H-NMR (400 MHz) and mass spectrum.

1H-NMR (CDCl3) δ3.90 (s, 3H), 3.94 (s, 3H), 3.99 (s, 3H), 6.58 (s, 1H), 7.15 (d, 2H), 7.37 (d, 2H), 7.56 (s, 1H), Mass spectrum: m/z 323 (M+H)+, The compound having been obtained has a melting point of 127° C. through 129° C.

Example of Synthesis 10

Synthesis of Illustrated Compound A-12

After heating 45.0 g (212 mM) of 2,4,5-trimethoxybenzoic acid, 180 ml of toluene and 1.8 ml of dimethylformamide to 60° C., 27.8 g (233 mM) of thionyl chloride was slowly added dropwise, and this mixture was heated and stirred for 2.5 hours at 60° C. Then 35.4 g (233 mM) of methyl 4-hydroxybenzoate previously dissolved in 27 ml of dimethylformamide was slowly added dropwise into this solution. After that, the solution was heated and stirred at 80° C. for 3 hours, and the reaction solution was cooled down to the room temperature. Then 270 ml of methanol was added, and the crystal having been precipitated was recovered by filtration, whereby 64.5 g (yield 88%) of the target compound was obtained as a white crystal. In this case, the compound was identified by 1H-NMR (400 MHz) and mass spectrum.

1H-NMR (CDCl3) δ3.95 (m, 9H), 3.99 (s, 3H), 6.57 (s, 1H), 7.28 (d, 2H), 7.57 (s, 1H) 8.11 (d, 2H), Mass spectrum: m/z 347 (M+H)+, The compound having been obtained has a melting point of 121° C. through 123° C.

Example of Synthesis 11

Synthesis of Illustrated Compound A-13

After heating 20.0 g (94.3 mM) of 2,4,5-trimethoxybenzoic acid, 100 ml of toluene and 1 ml of dimethylformamide to 60° C., 12.3 g (104 mM) of thionyl chloride was slowly added dropwise, and this mixture was heated and stirred for 3.5 hours at 60° C. Then 17.7 g (104 mM) of 4-phenyl phenol previously dissolved in 150 ml of toluene was slowly added dropwise into this solution. After that, the solution was heated and stirred at 80° C. for 3 hours, and the reaction solution was cooled down to the room temperature. Then 250 ml of methanol was added, and the crystal having been precipitated was recovered by filtration, whereby 21.2 g (yield 62%) of the target compound was obtained as a white crystal. In this case, the compound was identified by 1H-NMR (400 MHz) and mass spectrum.

1H-NMR (CDCl3) δ3.93 (s, 3H), 3.96 (s, 3H), 3.99 (s, 3H), 6.59 (s, 1H), 7.26-7.75 (m, 10H), Mass spectrum: m/z 365 (M+H)+, The compound having been obtained has a melting point of 131° C. through 132° C.

Example of Synthesis 12

Synthesis of Illustrated Compound A-14

After heating 12.9 g (61 mM) of 2,4,5-trimethoxybenzoic acid, 50 ml of toluene and 0.6 ml of dimethylformamide to 60° C., 8.0 g (67 mM) of thionyl chloride was slowly added dropwise, and this mixture was heated and stirred for 3.5 hours at 60° C. Then 17.7 g (104 mM) of 4-phenoxyphenol previously dissolved in 25 ml of acetonitryl was slowly added dropwise into this solution. After that, the solution was heated and stirred at 80° C. for 3 hours, and the reaction solution was cooled down to the room temperature. Then 100 ml of methanol was added, and the crystal having been precipitated was recovered by filtration, whereby 21.6 g (yield 93%) of the target compound was obtained as a white crystal. In this case, the compound was identified by mass spectrum.

Mass spectrum: m/z 381 (M+H)+,

The compound having been obtained has a melting point of 91° C. through 92° C.

Example of Synthesis 13

Synthesis of Illustrated Compound A-15

The compound A-15 was synthesized according to the same procedure as that in the Example of synthesis 2, except that 71.5 g of 4-cyanophenol of the Example of synthesis 2 was replaced by 56.4 g of phenol. The compound was identified by 1H-NMR (400 MHz) and mass spectrum.

1H-NMR (CDCl3) δ3.91 (s, 3H), 3.93 (s, 3H), 3.99 (s, 3H), 6.58 (s, 1H), 7.19-7.27 (m, 3H), 7.42 (m, 2H), 7.58 (s, 1H)

Mass spectrum: m/z 289 (M+H)+,

The compound having been obtained has a melting point of 105° C. through 108° C.

Example of Synthesis 14

Synthesis of Illustrated Compound A-16

The compound A-16 was synthesized according to the same procedure as that in the Example of synthesis 2, except that 71.5 g of 4-cyanophenol of the Example of synthesis 2 was replaced by 74.4 g of 4-methoxy phenol. In this case, the compound was identified by 1H-NMR (400 MHz) and mass spectrum.

1H-NMR (CDCl3) δ3.84 (s, 3H), 3.92 (s, 3H), 3.93 (s, 3H), 3.99 (s, 3H), 6.58 (s, 1H), 6.92 (d, 2H), 7.12 (d, 2H), 7.42 (m, 2H), 7.58 (s, 1H), Mass spectrum: m/z 319 (M+H)+, The compound having been obtained has a melting point of 102° C. through 103° C.

Example of Synthesis 15

Synthesis of Illustrated Compound A-17

The compound A-17 was synthesized according to the same procedure as that in the Example of synthesis 2, except that 71.5 g of 4-cyanophenol of the Example of synthesis 2 was replaced by 73.3 g of 4-ethyl phenol. The compound was identified by 1H-NMR (400 MHz) and mass spectrum.

Mass spectrum: m/z 317 (M+H)+,

The compound having been obtained has a melting point of 70° C. through 71° C.

Example of Synthesis 16

Synthesis of Illustrated Compound A-24

After heating 27.3 g (164 mM) of 4-ethoxybenzoic acid, 108 ml of toluene and 1 ml of dimethylformamide to 60° C., 21.5 g (181 mM) of thionyl chloride was slowly added dropwise, and this mixture was heated and stirred for 2 hours at 60° C. Then 25.0 g (181 mM) of 4-ethoxy phenol previously dissolved into 50 ml of acetonitryl was slowly added dropwise into this solution. After that, the solution was heated and stirred at 80° C. for 4 hours, and the reaction solution was cooled down to the room temperature. Then 100 ml of methanol was added, and the crystal having been precipitated was recovered by filtration, whereby 30.6 g (yield 65%) of the target compound was obtained as a white crystal. In this case, the compound was identified by 1H-NMR (400 MHz) and mass spectrum.

1H-NMR (CDCl3) δ1.48-1.59 (m, 6H), 4.05 (q, 2H), 4.10 (q, 2H), 6.89-7.00 (m, 4H), 7.10 (d, 2H), 8.12 (d, 2H), Mass spectrum: m/z 287 (M+H)+, The compound having been obtained has a melting point of 113° C. through 114° C.

Example of Synthesis 17

Synthesis of Illustrated Compound A-25

After heating 24.7 g (149 mM) of 4-ethoxybenzoic acid, 100 ml of toluene and 1 ml of dimethylformamide to 60° C., 19.5 g (164 mM) of thionyl chloride was slowly added dropwise, and this mixture was heated and stirred for 2 hours at 60° C. Then 25.0 g (165 mM) 4-propoxy phenol previously dissolved into 50 ml of acetonitryl was slowly added dropwise into this solution. After that, the solution was heated and stirred at 80° C. for 4 hours, and the reaction solution was cooled down to the room temperature. Then 100 ml of methanol was added, and the crystal having been precipitated was recovered by filtration. 100 ml of acetonitryl was added to the solid having been obtained, thereby recrystalizing the mixture. The crystal having been obtained was recovered by filtration, whereby 33.9 g (yield 76%) of the target compound was obtained as a white crystal. In this case, the compound was identified by 1H-NMR (400 MHz) and mass spectrum.

1H-NMR (CDCl3) δ1.04 (t, 3H), 1.45 (t, 3H), 1.82 (q, 2H), 3.93 (q, 2H), 4.04 (q, 2H), 6.89-7.00 (m, 4H), 7.10 (d, 2H), 8.12 (d, 2H), mass spectrum: m/z 301 (M+H)+, The compound having been obtained has a melting point of 107° C.

Example of Synthesis 18

Synthesis of Illustrated Compound A-27

The compound A-27 was synthesized according to the same procedure as that in the Example of synthesis 16 (Synthesis of A-24), except that 27.3 g of 4-ethoxybenzoic acid of the Example of synthesis 1 was replaced by 29.5 g of 4-propoxybenzoic acid. In this case, the compound was identified by mass spectrum.

Mass spectrum: m/z 301 (M+H)+,

The compound having been obtained has a melting point of 88° C. through 89° C.

Example of Synthesis 19

Synthesis of Illustrated Compound A-28

The compound A-28 was synthesized according to the same procedure as that in the Example of synthesis 17 (Synthesis of A-25), except that 24.7 g of 4-ethoxybenzoic acid of the Example of synthesis 1 was replaced by 26.8 g of 4-propoxybenzoic acid. In this case, the compound was identified by mass spectrum.

Mass spectrum: m/z 315 (M+H)+,

The compound having been obtained has a melting point of 92° C.

Example of Synthesis 20

Synthesis of Illustrated Compound A-40

After heating 20.0 g (109 mM) of 2,4-dimethoxybenzoic acid, 80 ml of toluene and 0.8 ml of dimethylformamide to 60° C., 14.4 g (121 mM) of thionyl chloride was slowly added dropwise, and this mixture was heated and stirred for 3.5 hours at 60° C. Then 20.5 g (121 mM) of 4-phenyl phenol previously dissolved into 50 ml of dimethylformamide was slowly added dropwise into this solution. After that, the solution was heated and stirred at 80° C. for 6 hours, and the reaction solution was cooled down to the room temperature. Then 100 ml of methanol was added, and the crystal having been precipitated was recovered by filtration, whereby 31.7 g (yield 86%) of the target compound was obtained as a white crystal. In this case, the compound was identified by mass spectrum.

Mass spectrum: m/z 335 (M+H)+,

The compound having been obtained has a melting point of 161° C. through 162° C.

Example of Synthesis 21

Synthesis of Illustrated Compound A-42

After heating 30.0 g (165 mM) of 2,4-dimethoxybenzoic acid, 120 ml of toluene and 1.2 ml of dimethylformamide to 60° C., 21.6 g (181 mM) of thionyl chloride was slowly added dropwise, and this mixture was heated and stirred for 2 hours at 60° C. Then 27.6 g (181 mM) of methyl 4-hydroxybenzoate previously dissolved into 40 ml of dimethylformamide was slowly added dropwise into this solution. After that, the solution was heated and stirred at 80° C. for 6 hours, and the reaction solution was cooled down to the room temperature. Then 140 ml of methanol was added, and the crystal having been precipitated was recovered by filtration, whereby 24.4 g (yield 47%) of the target compound was obtained as a white crystal. In this case, the compound was identified by 1H-NMR (400 MHz) and mass spectrum.

Mass spectrum: m/z 317 (M+H)+,

The compound having been obtained has a melting point of 122° C. through 123° C.

Example of Synthesis 22

Synthesis of Illustrated Compound A-51

20.7 g (50 mM) of 2,4,5-trimethoxybenzoic acid 4-iodophenyl, 5.61 g (55 mM) of ethynyl benzene, 27.8 ml (200 mM) of triethylamine and 40 ml of tetrahydrofuran was stirred in an atmosphere of nitrogen at the room temperature, and 114 mg (0.6 mM) of cuprous chloride, 655 mg (2.5 mM) of triphenyl phosphine and 351 mg (0.5 mM) of bis(triphenyl phosphine) palladium dichloride were added to this mixture. The mixture was heated and stirred at 60° C. for 6 hours. After that, the reaction solution was cooled down to the room temperature, and 400 ml of water was added. The crystal having been obtained was filtered, and 160 ml of methanol 160 ml was added for recrystalization, whereby 17.2 g (yield 89%) of the target compound was obtained as a yellowish white crystal.

In this case, the compound was identified by 1H-NMR (400 MHz) and mass spectrum.

1H-NMR (CDCl3) δ3.92 (s, 3H), 3.95 (s, 3H) 4.00 (s, 3H) 6.58 (s, 1H), 7.22 (m, 2H), 7.32 (m, 3H), 7.53-7.62 (m, 5H), Mass spectrum: m/z 389 (M+H)+, The compound having been obtained has a melting point of 129° C. through 130° C.

Example of Synthesis 23

Synthesis of Illustrated Compound A-52

After heating 42.4 g (0.2 mol) of 2,4,5-trimethoxybenzoic acid, 26.8 g (0.22 mol) of 4-hydroxybenzaldehyde, 170 ml of toluene and 1.7 ml of N,N-dimethylformamide to 80° C., 26.0 g (0.22 mol) of thionyl chloride was slowly added dropwise. The mixture was heated at 80° C. for 6 hours, and the reaction solution was cooled down to the room temperature. After that, ethyl acetate, water and saturated saline solution were added for liquid separation. Water was removed from the organic phase having been obtained by sodium sulfate. After that, the solvent was distilled off under reduced pressure. 240 ml of isopropyl alcohol was added to the solid having been obtained, thereby recrystalizing the mixture. The solution was cooled down to the room temperature and the crystal having been obtained was recovered by filtration, whereby 40.8 g (yield 65%) of the target compound was obtained as a white crystal. In this case, the compound was identified by 1H-NMR (400 MHz) and mass spectrum.

1H-NMR (CDCl3) δ3.92 (s, 3H), 3.95 (s, 3H) 4.00 (s, 3H), 6.58 (s, 1H), 7.34 (d, 2H), 7.59 (s, 1H), 8.17 (d, 2H), Mass spectrum: m/z 317 (M+H)+, The compound having been obtained has a melting point of 103° C. through 105° C.

Example of Synthesis 24

Synthesis of Illustrated Compound A-53

After adding 3.93 g (25.2 mM) of sodium dihydrogen phosphate dissolved in 5 ml of water was added dropwise into 40 g (126 mM) of 2,4,5-trimethoxybenzoic acid 4-formyl phenyl and 400 ml of acetonitryl, 18.3 g of 35% hydrogen peroxide solution was added to the mixture dropwise for 20 minutes. This was followed by the step of adding 14.1 g (126 mM) of 80% sodium chlorite (by Wako Junyaku Co., Ltd.) dissolved in 43 ml of water for 20 minutes, and stirring the mixture for 4.5 hours at the room temperature. After that, 100 ml of water was added and the mixture was cooled down to 10° C. The crystal having been obtained was filtered out and was recrystalized by addition of 500 ml of methanol, whereby 25.4 g (yield 60%) of the target compound was obtained as a white crystal.

The compound was identified by 1H-NMR (400 MHz) and mass spectrum.

1H-NMR (CDCl3) δ3.92 (s, 3H), 3.95 (s, 3H) 4.00 (s, 3H), 6.59 (s, 1H), 7.40 (d, 2H), 7.57 (s, 1H), 7.96 (d, 2H), 10.0 (s, 1H), Mass spectrum: m/z 333 (M+H)+, The compound having been obtained has a melting point of 188° C. through 189° C.

Example of Synthesis 25

Synthesis of Illustrated Compound A-54

After heating 5.00 g (23.5 mM) of 2,4,5-trimethoxybenzoic acid, 5.52 g (23.5 mM) of benzoic acid (4-hydroxy) anilide, 50 ml of acetonitryl and 1.0 ml of N,N-dimethylformamide to 70° C., 3.4 g (28.5 mM) of thionyl chloride was slowly added, and the mixture was heated at 70° C. for 3 hours. The reaction solution was cooled down to the room temperature, and 50 ml of methanol was added thereafter. The crystal having been precipitated was recovered by filtration, whereby 8.1 g (yield 84%) of the target compound was obtained as a white crystal. In this case, the compound was identified by 1H-NMR (400 MHz) and mass spectrum.

1H-NMR (CDCl3) δ3.92 (s, 3H), 3.95 (s, 3H) 4.00 (s, 3H), 6.60 (s, 1H), 7.12-8.10 (m, 10H), Mass spectrum: m/z 408 (M+H)+, The compound having been obtained has a melting point of 189° C. through 190° C.

Example of Synthesis 26

Synthesis of Illustrated Compound A-56

After heating 8.50 g (42.8 mM) of 2-hydroxy-4,5-dimethoxybenzoic acid, 5.62 g (42.8 mM) of 4-cyanophenol, 45 ml of toluene and 0.5 ml of N,N-dimethylformamide to 70° C., 5.6 g (47.1 mM) of thionyl chloride was slowly added dropwise, and this mixture was heated and stirred for 3 hours at 80° C. The reaction solution was cooled down to the room temperature. Then 50 ml of methanol was added, and the crystal having been precipitated was recovered by filtration, whereby 5.8 g (yield 45%) of the target compound was obtained as a white crystal. In this case, the compound was identified by 1H-NMR (400 MHz).

1H-NMR (CDCl3) δ3.92 (s, 3H), 3.97 (s, 3H), 6.67 (s, 1H), 7.38 (m, 3H), 7.77 (d, 2H), 10.28 (s, 1H), Mass spectrum: m/z 333 (M+H)+, The compound having been obtained has a melting point of 145° C. through 146° C.

Example of Synthesis 27

Synthesis of Illustrated Compound A-57

After heating 8.50 g (42.8 mM) of 2-hydroxy-4,5-dimethoxybenzoic acid, 7.17 g (42.8 mM) of methyl 4-hydroxybenzoate, 45 ml of toluene and 0.5 ml of N,N-dimethylformamide to 70° C., 6.1 g (51.2 mM) of thionyl chloride was slowly added dropwise, and this mixture was heated and stirred for 3 hours at 80° C. Then the reaction solution was cooled down to the room temperature. Thus, 50 ml of methanol was added, and the crystal having been precipitated was recovered by filtration, whereby 6.9 g (yield 49%) of the target compound was obtained as a white crystal. In this case, the compound was identified by 1H-NMR (400 MHz).

1H-NMR (CDCl3) δ3.92 (s, 3H), 3.97 (s, 6H), 6.55 (s, 1H), 7.31 (d, 2H), 7.41 (s, 1H), 8.16 (d, 2H), 10.41 (s, 1H),

Mass spectrum: m/z 333 (M+H)+,

The compound having been obtained has a melting point of 128° C.

Example of Synthesis 28

Synthesis of Illustrated Compound A-58

The compound A-58 was synthesized according to the same procedure as that in the Example of synthesis 2, except that dicyanophenol of the Example of synthesis 2 was replaced by vanillic acid. The compound having been obtained has a melting point of 201° C. through 203° C.

Example of Synthesis 29

Synthesis of Illustrated Compound A-62

The compound A-62 was synthesized according to the same procedure as that in the Example of synthesis 10, except that 2,4,5-trimethoxybenzoic acid of the Example of synthesis 10 was replaced by 4-ethoxy-2-methoxybenzoic acid. The compound having been obtained has a melting point of 88° C. through 89° C.

Example of Synthesis 30

Synthesis of Illustrated Compound A-63

The compound A-63 was synthesized according to the same procedure as that in the Example of synthesis 10, except that 2,4,5-trimethoxybenzoic acid of the Example of synthesis 10 was replaced by 4-hydroxy-2-methoxybenzoic acid. The compound having been obtained has a melting point of 108° C. through 113° C.

Example of Synthesis 31

Synthesis of Illustrated Compound A-65

The compound A-65 was synthesized according to the same procedure as that in the Example of synthesis 2, except that 2,4-dimethoxybenzoic acid of the Example of synthesis 2 was replaced by 4-hydroxy-2-methoxybenzoic acid. The compound having been obtained has a melting point of 142° C. through 144° C.

0.1 through 20 percent by mass of at least one of the compounds expressed by Formulae (6), (7), (7-A) through (7-E) and (8) is preferably added to cellulose, wherein the amount of the aforementioned compound is more preferably 0.5 through 16 percent by mass, still more preferably 1 through 12 percent by mass, particularly 2 through 8 percent by mass, most preferably 3 through 7 percent by mass.

As a retardation control agent, a compound having a 1,3, 5-triazine ring is preferably used.

Among compounds having a 1,3,5-triazine ring, compounds represented by the following Formula (9) are preferable.

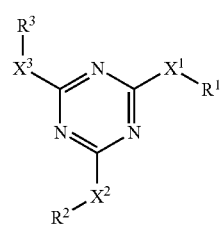

Formula (9)

In Formula (9), $X^1$ is a single bond, an —$NR_4$— group, an —O— atom or an —S— atom; $X^2$ is a single bond, an —$NR_5$— group, an —O— atom or an —S— atom; $X^3$ is a single bond, an —$NR_6$— group, an —O— atom or an —S— atom; $R^1$, $R^2$ and $R^3$ are each an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula (9) is particularly preferably a melamine compound.

In the melamine compound of Formula (9), it is preferable that the $X^1$, $X^2$ and $X^3$ are each the —$NR_4$—, —$NR_5$— and —$HR_6$—, respectively, or the $X^1$, $X^2$ and $X^3$ are each a single bond and the $R^1$, $R^2$ and $R^3$ are each a heterocyclic group having a free valency at the nitrogen atom thereof. The —$X^1$—$R^1$, —$X^2$—$R^2$ and —$X^3$—$R^3$ are preferably the same substituting group. The $R^1$, $R^2$ and $R^3$ are particularly preferably an aryl group. The $R_4$, $R_5$ and $R_6$ are each particularly preferably a hydrogen atom.

The above alkyl group is more preferably a chain alkyl group than a cyclic alkyl group. A straight-chain alkyl group is more preferably than a branched-chain alkyl group.

The number of carbon atom of the alkyl group is preferably 1-30, more preferably 1-20, further preferably 1-10, further more preferably 1-8, and most preferably 1-6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group. The alkenyl group is more preferably a chain alkenyl group than a cyclic alkenyl group. A straight-chain alkenyl group is preferably to a branched-chain alkenyl group. The number of carbon atom of the alkenyl group is preferably 2-30, more preferably 2-20, further preferably 2-10, further more preferably 2-8, and most preferably 2-6. The alkyl group may have a substituent.

Concrete examples of the substituent include a halogen atom, an alkoxy group such as a methoxy group, an ethoxy group and an epoxyethyloxy group, and an acyloxy group such as an acryloyloxy group and a methacryloyloxy group.

The aryl group is preferably a phenyl group or a naphthyl group, and the phenyl group is particularly preferable. The aryl group may have a substituent.

Concrete examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamido group, alkyl-substituted carbamoyl group, amido group, alkylthio group and acyl group is the same as the foregoing alkyl group.

The above alkenyl group is the same as the forgoing alkenyl group.

The alkenyl moiety of the alkenyloxy group, acyloxy group, alkenyloxycarbonyl group, alkenyl-substituted sulfamoyl group, sulfonamido group, alkenyl-substituted carbamoyl group, amido group, alkenylthio group and acyl group is the same as the foregoing alkenyl group.

Concrete examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The aryl moiety of the aryloxy group, acyloxy group, aryloxycarbonyl group, aryl-substituted sulfamoyl group, sulfonamido group, arylsubstituted carbamoyl group, amido group, arylthio group and acyl group is the same as the foregoing aryl group.

The heterocyclic group is preferably has aromaticity, when the $X^1$, $X^2$ and $X^3$ are an —NR— group, an —O— atom or an —S— group.

The heterocycle in the heterocyclic group having aromaticity is usually an unsaturated heterocycle, preferably a heterocycle having highest number of double bond. The heterocycle is preferably a 5-, 6- or 7-member ring, more preferably the 5- or 6-member ring and most preferably the 6-member ring.

The heteroatom in the heterocycle is preferably a nitrogen atom, a sulfur atom or an oxygen atom, and the nitrogen atom is particularly preferable.

As the heterocycle having aromaticity, a pyridine ring such as a 2-pyridyl group and a 4-pyridyl group is particularly preferable. The heterocyclic group may have a substituent. Examples of the substituent are the same as the substituent of the foregoing aryl moiety.

When $X^1$, $X^2$ and $X^3$ are each the single bond, the heterocyclic group preferably has a free valency at the nitrogen atom. The heterocyclic group having the free valency at the nitrogen atom is preferably 5-, 6- or 7-member ring, more preferably the 5- or 6-member ring, and most preferably the 5-member ring. The heterocyclic group may have plural nitrogen atoms.

The heterocyclic group may have a hetero-atom other than the nitrogen atom such as an oxygen atom and a sulfur atom. The heterocyclic group may have a substituent. Concrete examples of the heterocyclic group are the same as those of the aryl moiety.

Examples of the heterocyclic group having the free valency at the nitrogen atom are listed below.

(Hc-1)

(Hc-2)

(Hc-3)

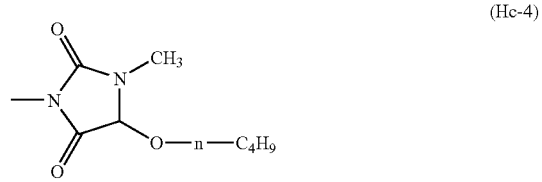
(Hc-4)

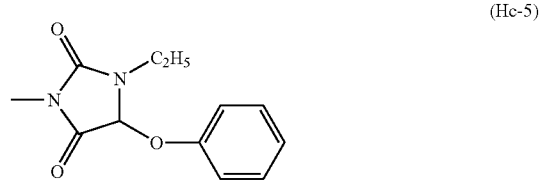
(Hc-5)

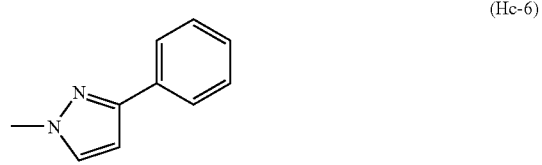
(Hc-6)

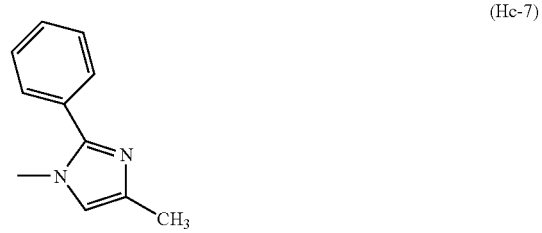
(Hc-7)

-continued

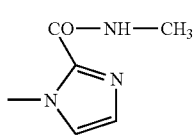 (Hc-8)

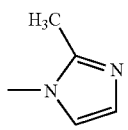 (Hc-9)

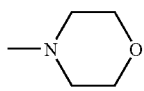 (Hc-10)

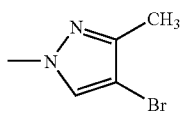 (Hc-11)

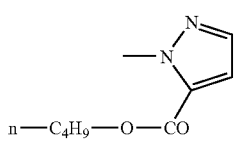 (Hc-12)

The molecular weight of the compound having a 1.3.5-triazine ring is preferably 300-2,000. The boiling point of these compounds is preferably not less than 260° C. The boiling point can be measured by a measuring apparatus available on the market such as TG/DTA100, manufactured by Seiko Instruments Inc.

Concrete examples of the compound having the 1,3,5-triazine ring are shown below.

In the following, plural R each represent the same group.

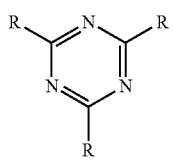 (1)~(12)

(1) Butyl
(2) 2-mthoxy-2-ethoxyethyl
(3) Undecenyl
(4) Phenyl
(5) 4-ethoxycarbonylphenyl
(6) 4-butozyphenyl
(7) p-biphenylyl
(8) 4-pyridyl
(9) 2-naphthyl
(10) 2-methylphenyl
(11) 3,4-dimethoxyphenyl
(12) 2-furyl

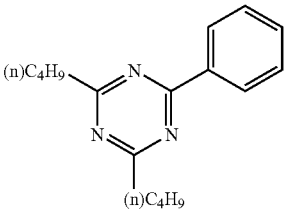 (13)

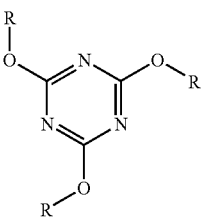 (14)~(79)

(14) phenyl
(15) 3-ethoxycarbonylphenyl
(16) 3-butoxyphenyl
(17) m-biphenyryl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenol
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenyryl
(36) 4-phenylthiophenyl
(37) 4-chlorophenyl
(38) 4-benzoylphenyl
(39) 4-actoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diactoxyphenyl
(58) 3,4-dibenzoyloxyphenyl
(59) 3,4-diphenoxycarbonylphenyl
(60) 3,4-dimethoxyphenyl

(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylpenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

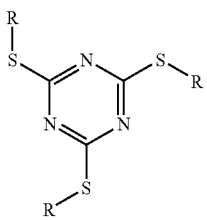

(80)~(145)

(80) phenyl
(81) 3-ethoxycarbonylphenyl
(82) 3-butoxyphenyl
(83) m-biphenyryl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenol
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenyryl
(102) 4-phenylthiophenyl
(103) 4-chlorophenyl
(104) 4-benzoylphenyl
(105) 4-actoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diactoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylpenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

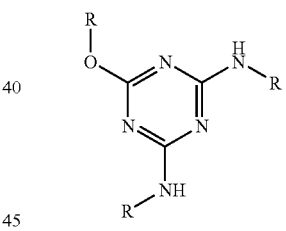

(146)~(164)

(146) phenyl
(147) 4-ethoxycarbonylphenyl
(148) 4-butoxyphenyl
(149) p-biphenyryl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenol
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl (165)~(183)

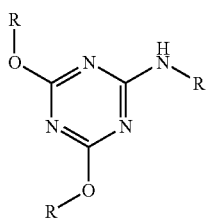

(165) phenyl
(166) 4-ethoxycarbonylphenyl
(167) 4-butoxyphenyl
(168) p-biphenyryl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenol
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl (184)~(202)

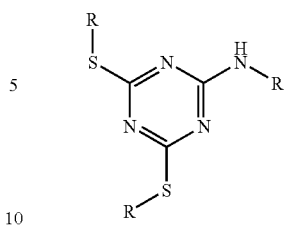

(184) phenyl
(185) 4-ethoxycarbonylphenyl
(186) 4-butoxyphenyl
(187) p-biphenyryl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenol
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl (203)~(221)

(203) phenyl
(204) 4-ethoxycarbonylphenyl
(205) 4-butoxyphenyl
(206) p-biphenyryl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenol
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl (222)~(419)

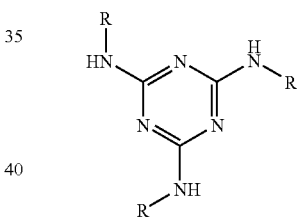

(222) phenyl
(223) 4-butylphenyl
(224) 4-2-methoxy-2-ethoxyethyl)phenyl
(225) 4-(5-nenenyl)phenyl
(226) p-biphenyryl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-aceoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl (246) 3-(5-nonenyl)phenyl
(247) m-biphenyryl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-actoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenyryl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-aceoxyphenyl
(276) 2-benzoyloxyphenyl
(277) 4-phenoxycarbonylphenyl
(278) 2-methoxyphenyl
(279) 2-anilinophenyl
(280) 2-isobutyrylaminophenyl
(281) 2-phenoxycarbonyl aminophenyl
(282) 2-(3-ethylureido)phenyl
(283) 2-(3,3-dimethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl (352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydoxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl
(382) 2,4,6-triphenoxyphenyl
(383) 2,4,6-trihydoxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsufamoyl-2-naphtyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsufamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

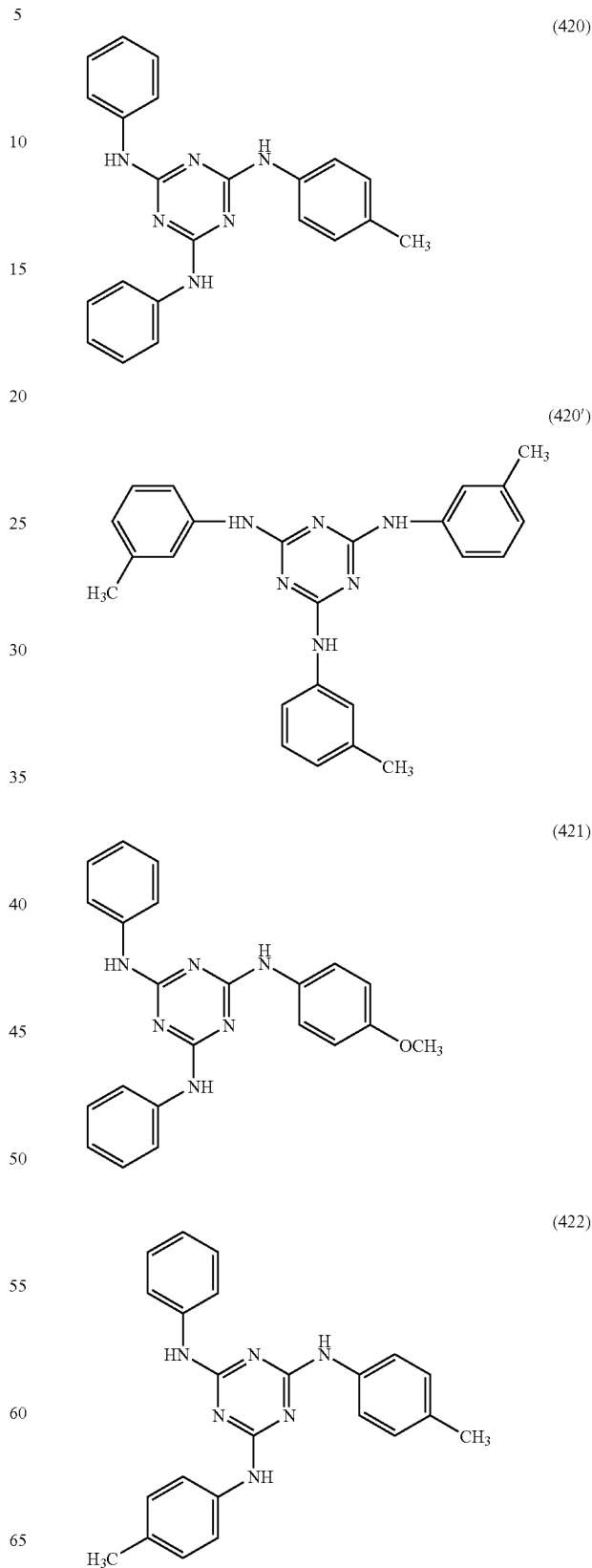

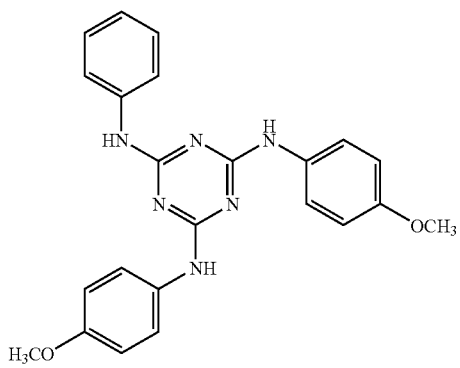
(423)
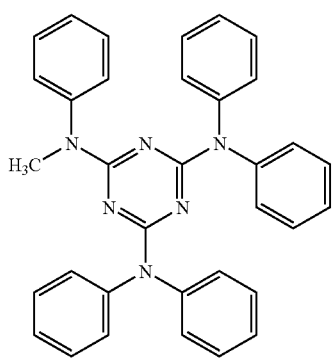
(424)~(426)
(424) methyl
(425) phenyl
(426) butyl
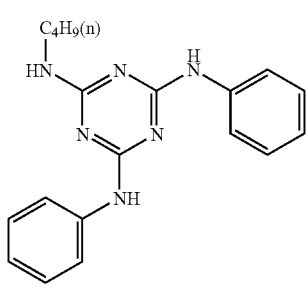
(427)
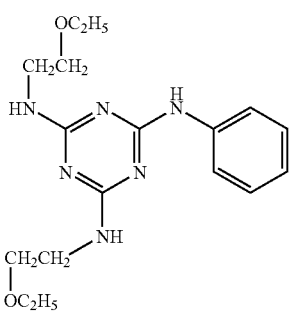
(428)
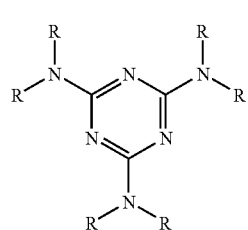
(429)
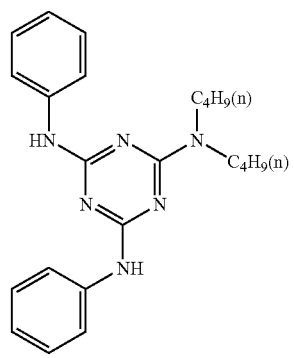
(439)~(437)
(430) methyl
(431) ethyl
(432) butyl
(433) octyl
(434) dodecyl
(435) 2-butoxy-2-ethoxyethyl
(436) benzyl
(437) 4-methoxybenzyl
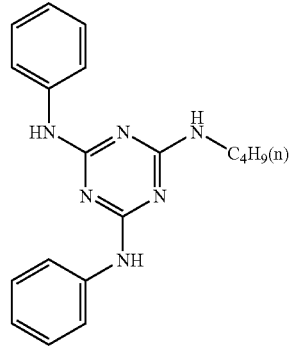
(438)
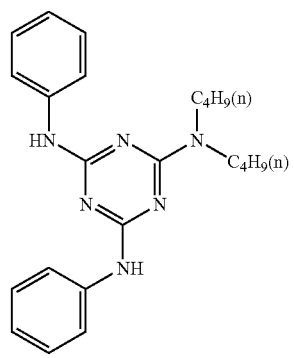
(439)

(440)

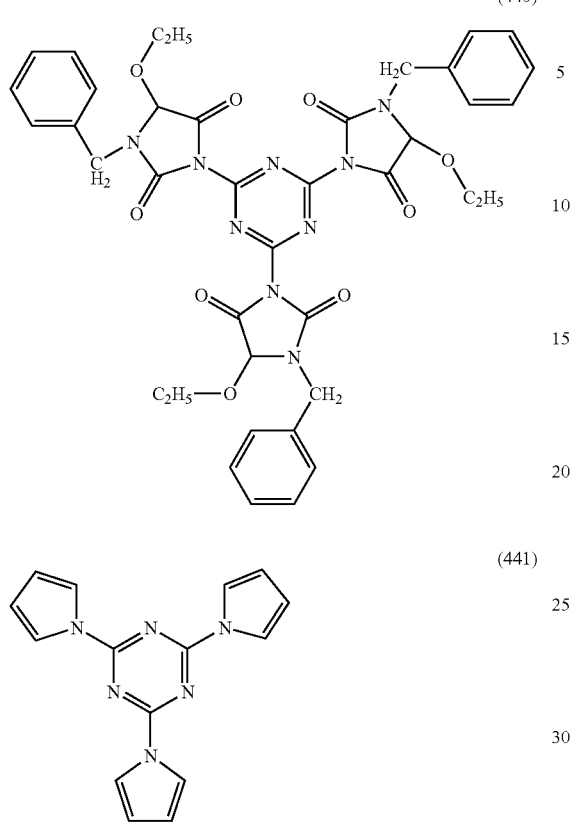

(441)

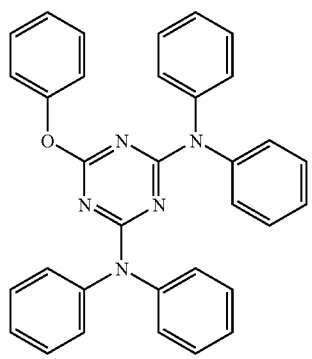

(442)

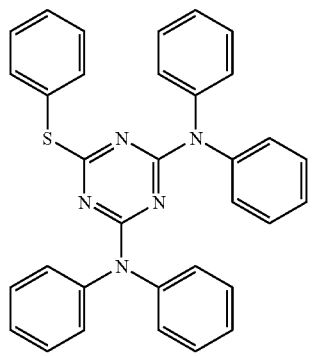

(443)

(444)

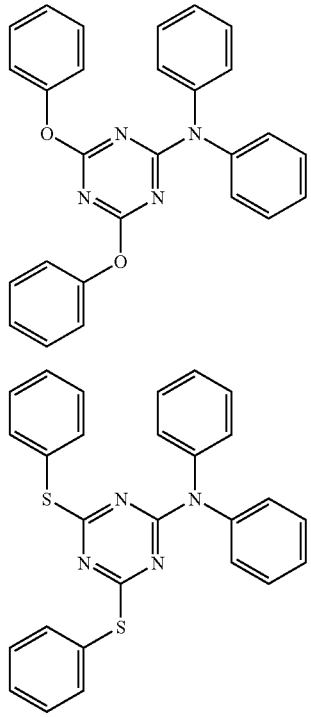

(445)

In the present invention, employed as a compound having a 1,3,5-triazine ring may be melamine polymers. It is preferable that the above melamine polymers are sunthesized employing a polymerization reaction of the melamine compounds represented by Formula (13) below with carbonyl compounds.

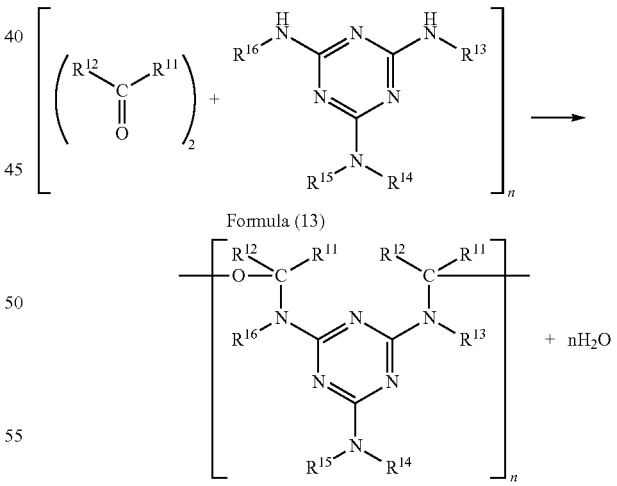

Formula (13)

In the above synthesis reaction scheme, $R^1$, $R^{12}$, $R^{13}$, $R^{14}$, $R^{15}$, and $R^{16}$ each represent a hydrogen atom, an alkyl group, an alkenyl group, an aryl group or a heterocyclyl group.

The above alkyl group, alkenyl group, aryl group, and heterocyclyl group, as well as those substituents are as defined for each group and also the substituents described in above Formula (4).

The polymerization reaction of melamine compounds with carbonyl compounds is performed employing the same synthesis method as for common melamine resins (for example, a melamine-formaldehyde resin). Further, employed may be commercially available melamine polymers (being melamine resins).

The molecular weight of melamine polymers is preferably 2,000-400,000. Specific examples of repeating units of melamine polymers are shown below.

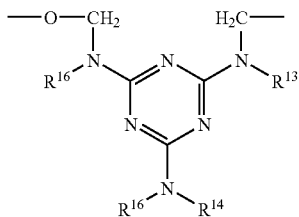

(MP-1)~(MP-50)

MP-1: $R^{13}$, $R^{14}$, $R^{15}$, $R^{16}$: $CH_2OH$
MP-2: $R^{13}$, $R^{14}$, $R^{15}$, $R^{16}$: $CH_2OCH_3$
MP-3: $R^{13}$, $R^{14}$, $R^{15}$, $R^{16}$: $CH_2O$-i-$C_4H_9$
MP-4: $R^{13}$, $R^{14}$, $R^{15}$, $R^{16}$: $CH_2O$-n-$C_4H_9$
MP-5: $R^{13}$, $R^{14}$, $R^{15}$, $R^{16}$: $CH_2NHCOCH=CH_2$
MP-6: $R^{13}$, $R^{14}$, $R^{15}$, $R^{16}$: $CH_2NHCO$ $(CH_2)_7CH=CH(CH_2)_7CH_3$
MP-7: $R^{13}$, $R^{14}$, $R^{15}$: $CH_2OH$; $R^{16}$ $CH_2OCH_3$
MP-8: $R^{13}$, $R^{14}$, $R^{16}$: $CH_2OH$; $R^{15}$: $CH_2OCH_3$,
MP-9: $R^{13}$, $R^{14}$: $CH_2OH$; $R^{15}$, $R^{16}$: $CH_2OCH_3$
MP-10: $R^{13}$, $R^{16}$: $CH_2OH$; $R^{14}$, $R^{15}$: $CH_2OCH_3$
MP-11: $R^{13}$: $CH_2OH$; $R^{14}$ $R^{15}$, $R^{16}$: $CH_2OCH_3$
MP-12: $R^{13}$, $R^{14}$, $R^{16}$: $CH_2OCH_3$; $R^{15}$: $CH_2OH$
MP-13: $R^{13}$, $R^{16}$: $CH_2OCH_3$; $R^{14}$, $R^{15}$: $CH_2OH$
MP-14: $R^{13}$, $R^{14}$, $R^{15}$: $CH_2OH$; $R^{16}$: $CH_2O$-i-$C_4H_9$
MP-15: $R^{13}$, $R^{14}$, $R^{16}$: $CH_2OCH_3$; $R^{15}$: $CH_2O$-i-$C_4H_9$
MP-16: $R^{13}$, $R^{14}$: $CH_2OH$; $R^{15}$, $R^{16}$: $CH_2O$-i-$C_4H_9$
MP-17: $R^{13}$, $R^{16}$: $CH_2OH$; $R^{14}$, $R^{15}$: $CH_2O$-i-$C_4H_9$
MP-18: $R^{13}$: $CH_2OH$; $R^{14}$ $R^{15}$, $R^{16}$: $CH_2O$-i-$C_4H_9$
MP-19: $R^{13}$, $R^{14}$, $R^{16}$: $CH_2O$-i-$C_4H_9$; $R^{15}$: $CH_2OH$
MP-20: $R^{13}$, $R^{16}$: $CH_2O$-i-$C_4H_9$; $R^{14}$, $R^{15}$: $CH_2OH$
MP-21: $R^{13}$, $R^{14}$, $R^{15}$: $CH_2OH$; $R^{16}$: $CH_2O$-n-$C_4H_9$
MP-22: $R^{13}$, $R^{14}$, $R^{16}$: $CH_2OH$; $R^{15}$: $CH_2O$-n-$C_4H_9$
MP-23: $R^{13}$, $R^{14}$: $CH_2OH$; $R^{15}$, $R^{16}$: $CH_2O$-n-$C_4H_9$
MP-24: $R^{13}$, $R^{16}$: $CH_2OH$; $R^{14}$, $R^{15}$: $CH_2O$-n-$C_4R_9$
MP-25: $R^{13}$: $CH_2OH$; $R^{14}$ $R^{15}$, $R^{16}$: $CH_2O$-n-$C_4H_9$
MP-26: $R^{13}$, $R^{14}$, $R^{16}$: $CH_2O$-n-$C_4H_9$; $R^{15}$: $CH_2OH$
MP-27: $R^{13}$, $R^{16}$: $CH_2$-n-$C_4H_9$; $R^{14}$, $R^{15}$: $CH_2OH$
MP-28: $R^{13}$, $R^{14}$: $CH_2OH$; $R^{15}$: $CH_2OCH_3$; $R^{16}$: $CH_2O$-n-$C_4H_9$
MP-29: $R^{13}$, $R^{14}$: $CH_2OH$; $R^{15}$: $CH_2$-n-$C_4H_9$; $R^{16}$: $CH_2OCH_3$
MP-30: $R^{13}$, $R^{16}$: $CH_2OH$; $R^{14}$: $CH_2OCH_3$; $R^{15}$: $CH_2O$-n-$C_4H_9$
MP-31: $R^{13}$: $CH_2OH$; $R^{14}$, $R^{15}$: $CH_2OCH_3$; $R^{16}$: $CH_2O$-n-$C_4H_9$
MP-32: $R^{13}$: $CH_2OH$; $R^{14}$, $R^{16}$: $CH_2OCH_3$; $R^{15}$: $CH_2O$-n-$C_4H_9$
MP-33: $R^{13}$: $CH_2OH$; $R^{14}$: $CH_2OCH_3$; $R^{15}$, $R^{16}$: $CH_2O$-n-$C_4H_9$
MP-34: $R^{13}$: $CH_2OH$; $R^{14}$, $R^{15}$: $CH_2O$-n-$C_4H_9$; $R^{16}$ $CH_2OCH_3$
MP-35: $R^{13}$, $R^{14}$: $CH_2OCH_3$; $R^{15}$: $CH_2OH$; $R^{16}$: $CH_2O$-n-$C_4H_9$
MP-36: $R^{13}$, $R^{16}$: $CH_2OCH_3$; $R^{14}$: $CH_2OH$; $R^{15}$: $CH_2O$-n-$C_4H_9$
MP-37: $R^{13}$: $CH_2OCH_3$; $R^{14}$, $R^{15}$: $CH_2OH$; $R^{16}$: $CH_2O$-n-$C_4H_9$
MP-38: $R^{13}$, $R^{16}$: $CH_2O$-n-$C_4H_9$; $R^{14}$: $CH_2OCH_3$; $R^{15}$: $CH_2OH$
MP-39: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-41: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-42: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-44: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH3$; $R^{15}$: $CH_2NHCO=CH_2$; $R_{16}$: $CH_2NHCO(CH_2)_7CH=CH(CH_2)_7CH_3$
MP-47: $R^{13}$: $CH_2OH$; $R^{14}$: $CH_2NHCO(CH_2)_7CH=CH(CH_2)_7CH_3$; $R^{15}$ $CH_2NHCOCH=CH_2$:; $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-50: $R^{13}$: $CH_2NHCO(CH_2)_7CH=CH(CH_2)_7CH_3$; $R^{14}$: $CH_2OCH_3$; $R^{15}$ $CH_2OH$; $R^{16}$: $CH_2NHCOCH=CH_2$ (MP-51)~(MP-100)

MP-51: $R^{13}$, $R^{14}$, $R^{15}$, $R^{16}$: $CH_2OH$
MP-52: $R^{13}$, $R^{14}$, $R^{15}$, $R^{16}$: $CH_2OCH_3$
MP-53: $R^{13}$, $R^{14}$, $R^{15}$, $R^{16}$: $CH_2O$-i-$C_4H_9$
MP-54: $R^{13}$, $R^{14}$, $R^{15}$, $R^{16}$: $CH_2O$-n-$C_4H_9$
MP-55: $R^{13}$, $R^{14}$, $R^{15}$, $R^{16}$: $CH_2NCOCH=CH_2$
MP-56: $R^{13}$, $R^{14}$, $R^{15}$, $R^{16}$: $CH_2NHCO(CH_2)_7CH=CH(CH_2)_7CH_3$
MP-57: $R^{13}$, $R^{14}$, $R^{15}$: $CH_2OH$; $R^{16}$ $CH_2OCH_3$
MP-58: $R^{13}$, $R^{14}$, $R^{16}$: $CH_2OH$; $R^{15}$: $CH_2OCH_3$,
MP-59: $R^{13}$, $R^{14}$: $CH_2OH$; $R^{15}$, $R^{16}$: $CH_2OCH_3$
MP-60: $R^{13}$, $R^{16}$: $CH_2OH$; $R^{14}$, $R^{15}$: $CH_2OCH_3$
MP-61: $R^{13}$: $CH_2OH$; $R^{14}$ $R^{15}$, $R^{16}$: $CH_2OCH_3$
MP-62: $R^{13}$, $R^{14}$, $R^{16}$: $CH_2OCH_3$; $R^{15}$: $CH_2OH$
MP-63: $R^{13}$, $R^{16}$: $CH_2OCH_3$; $R^{14}$, $R^{15}$: $CH_2OH$
MP-64: $R^{13}$, $R^{14}$, $R^{15}$: $CH_2OH$; $R^{16}$: $CH_2O$-i-$C_4H_9$
MP-65: $R^{13}$, $R^{14}$, $R^{16}$: $CH_2OCH_3$; $R^{15}$: $CH_2O$-i-$C_4H_9$
MP-66: $R^{13}$, $R^{14}$: $CH_2OH$; $R^{15}$, $R^{16}$: $CH_2O$-i-$C_4H_9$
MP-67: $R^{13}$, $R^{16}$: $CH_2OH$; $R^{14}$, $R^{15}$: $CH_2O$-i-$C_4H_9$

MP-68: $R^{13}$: $CH_2OH$; $R^{14}$ $R^{15}$, $R^{16}$: $CH_2O$-i-$C_4H_9$
MP-69: $R^{13}$, $R^{14}$, $R^{16}$: $CH_2O$-i-$C_4H_9$; $R^{15}$: $CH_2OH$
MP-70: $R^{13}$, $R^{16}$: $CH_2O$-i-$C_4H_9$; $R^{14}$, $R^{15}$: $CH_2OH$
MP-71: $R^{13}$, $R^{14}$, $R^{15}$: $CH_2OH$; $R^{16}$; $CH_2O$-n-$C_4H_9$
MP-72: $R^{13}$, $R^{14}$, $R^{16}$: $CH_2OH$; $R^{15}$: $CH_2O$-n-$C_4H_9$
MP-73: $R^{13}$, $R^{14}$: $CH_2OH$; $R^{15}$, $R^{16}$: $CH_2O$-n-$C_4H_9$
MP-74: $R^{13}$, $R^{16}$: $CH_2OH$; $R^{14}$, $R^{15}$: $CH_2O$-n-$C_4H_9$
MP-75: $R^{13}$: $CH_2OH$; $R^{14}$ $R^{15}$, $R^{16}$: $CH_2O$-n-$C_4H_9$
MP-76: $R^{13}$, $R^{14}$ $R^{16}$: $CH_2O$-n-$C_4H_9$; $R^{15}$: $CH_2OH$
MP-77: $R^{13}$, $R^{16}$: $CH_2O$-n-$C_4H_9$; $R^{14}$, $R^{15}$: $CH_2OH$
MP-78: $R^{13}$, $R^{14}$: $CH_2OH$; $R^{15}$: $CH_2OCH_3$; $R^{16}$: $CH_2O$-n-$C_4H_9$
MP-79: $R^{13}$, $R^{14}$: $CH_2OH$; $R^{15}$: $CH_2$-n-$C_4H_9$; $R^{16}$: $CH_2OCH_3$
MP-80: $R^{13}$, $R^{16}$: $CH_2OH$; $R^{15}$: $CH_2OCH_3$; $R^{15}$: $CH_2O$-n-$C_4H_9$
MP-81: $R^{13}$: $CH_2OH$; $R^{14}$, $R^{15}$: $CH_2OCH_3$; $R^{16}$: $CH_2O$-n-$C_4H_9$
MP-82: $R^{13}$: $CH_2OH$; $R^{14}$, $R^{16}$: $CH_2OCH_3$; $R^{15}$: $CH_2O$-n-$C_4H_9$
MP-83: $R^{13}$: $CH_2OH$; $R^{14}$: $CH_2OCH_3$; $R^{15}$, $R^{16}$: $CH_2O$-n-$C_4H_9$
MP-84: $R^{13}$: $CH_2OH$; $R^{14}$, $R^{15}$: $CH_2O$-n-$C_4H_9$; $R^{16}$: $CH_2OCH_3$
MP-85: $R^{13}$, $R^{14}$: $CH_2OCH_3$; $R^{15}$: $CH_2OH$; $R^{16}$: $CH_2O$-n-$C_4H_9$
MP-86: $R^{13}$, $R^{16}$: $CH_2OCH_3$; $R^{14}$: $CH_2OH$; $R^{15}$: $CH_2O$-n-$C_4H_9$
MP-87: $R^{13}$: $CH_2OCH_3$; $R^{14}$, $R^{15}$: $CH_2OH$; $R^{16}$: $CH_2O$-n-$C_4H_9$
MP-88: $R^{13}$, $R^{16}$: $CH_2O$-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-90: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-91: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-93: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-94: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-96: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-97: $R^{13}$: $CH_2OH$; $R^{14}$: $CH_2NHCO(CH_2)_7CH=CH(CH_2)_7CH_3$; $R^{15}$ $CH_2NHCOCH=CH_2$:; $R^{16}$: $CH_2OCH_3$
MP-98: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-100: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

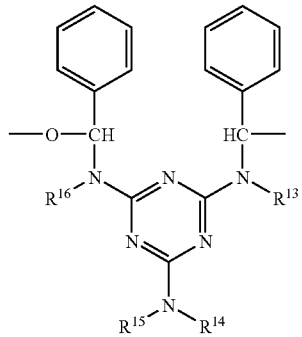

(MP-101)~(MP-150)

MP-101: $R^{13}$, $R^{14}$, $R^{15}$, $R^{16}$: $CH_2OH$
MP-102: $R^{13}$, $R^{14}$, $R^{15}$, $R^{16}$: $CH_2OCH_3$
MP-103: $R^{13}$, $R^{14}$, $R^{15}$, $R^{16}$: $CH_2O$-i-$C_4H_9$
MP-104: $R^{13}$, $R^{14}$, $R^{15}$, $R^{16}$: $CH_2O$-n-$C_4H_9$
MP-105: $R^{13}$, $R^{14}$, $R^{15}$, $R^{16}$: $CH_2NHCOCH=CH_2$
MP-106: $R^{13}$, $R^{14}$, $R^{15}$, $R^{16}$: $CH_2NHCO(CH_2)_7CH=CH(CH_2)_7CH_3$
MP-107: $R^{13}$, $R^{14}$, $R^{15}$: $CH_2OH$; $R^{16}$: $CH_2OCH_3$
MP-108: $R^{13}$, $R^{14}$, $R^{16}$: $CH_2OH$; $R^{15}$: $CH_2OCH_3$,
MP-109: $R^{13}$, $R^{14}$: $CH_2OH$; $R^{15}$, $R^{16}$: $CH_2OCH_3$
MP-110: $R^{13}$, $R^{16}$: $CH_2OH$; $R^{14}$, $R^{15}$: $CH_2OCH_3$
MP-111: $R^{13}$: $CH_2OH$; $R^{14}$ $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $R^{15}$: $CH_2OH$; $R^{16}$: $CH_2O$-i-$C_4H_9$
MP-115: $R^{13}$, $R^{14}$, $R^{16}$: $CH_2OH$; $R^{15}$: $CH_2O$-i-$C_4H_9$
MP-116: $R^{13}$, $R^{14}$: $CH_2OH$; $R^{15}$, $R^{16}$: $CH_2O$-i-$C_4H_9$
MP-117: $R^{13}$, $R^{16}$: $CH_2OH$; $R^{14}$, $R^{15}$: $CH_2O$-i-$C_4H_9$
MP-118: $R^{13}$: $CH_2OH$; $R^{14}$ $R^{15}$, $R^{16}$: $CH_2O$-i-$C_4H_9$
MP-119: $R^{13}$, $R^{14}$, $R^{16}$: $CH_2O$-i-$C_4H_9$; $R^{15}$: $CH_2OH$
MP-120: $R^{13}$, $R^{16}$: $CH_2O$-i-$C_4H_9$; $R^{14}$, $R^{15}$: $CH_2OH$
MP-121: $R^{13}$, $R^{14}$, $R^{15}$: $CH_2OH$; $R^{16}$: $CH_2O$-n-$C_4H_9$
MP-122: $R^{13}$, $R^{14}$, $R^{16}$: $CH_2OH$; $R^{15}$: $CH_2O$-n-$C_4H_9$
MP-123: $R^{13}$, $R^{14}$: $CH_2OH$; $R^{15}$, $R^{16}$: $CH_2O$-n-$C_4H_9$
MP-124: $R^{13}$, $R^{16}$: $CH_2OH$; $R^{14}$, $R^{15}$: $CH_2O$-n-$C_4H_9$
MP-125: $R^{13}$: $CH_2OH$; $R^{14}$ $R^{15}$, $R^{16}$: $CH_2O$-n-$C_4H_9$
MP-126: $R^{13}$, $R^{14}$, $R^{16}$: $CH_2O$-n-$C_4H_9$; $R^{15}$: $CH_2OH$
MP-127: $R^{13}$, $R^{16}$: $CH_2O$-n-$C_4H_9$; $R^{14}$, $R^{15}$: $CH_2OH$
MP-128: $R^{13}$, $R^{14}$: $CH_2OH$; $R^{15}$: $CH_2OCH_3$; $R^{16}$: $CH_2O$-n-$C_4H_9$
MP-129: $R^{13}$, $R^{14}$: $CH_2OH$; $R^{15}$: $CH_2$-n-$C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2O$-n-$C_4H_9$
MP-131: $R^{13}$: $CH_2OH$; $R^{14}$, $R^{15}$: $CH_2OCH_3$; $R^{16}$: $CH_2O$-n-$C_4H_9$
MP-132: $R^{13}$: $CH_2OH$; $R^{14}$, $R^{16}$: $CH_2OCH_3$; $R^{15}$: $CH_2O$-n-$C_4H_9$
MP-133: $R^{13}$: $CH_2OH$; $R^{14}$: $CH_2OCH_3$; $R^{15}$, $R^{16}$: $CH_2O$-n-$C_4H_9$
MP-134: $R^{13}$: $CH_2OH$; $R^{14}$, $R^{15}$: $CH_2O$-n-$C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2O$-n-$C_4H_9$
MP-136: $R^{13}$, $R^{16}$: $CH_2OCH_3$; $R^{14}$: $CH_2OH$; $R^{15}$: $CH_2O$-n-$C_4H_9$
MP-137: $R^{13}$: $CH_2OCH_3$; $R^{14}$, $R^{15}$: $CH_2OH$; $R^{16}$: $CH_2O$-n-$C_4H_9$
MP-138: $R^{13}$, $R^{16}$: $CH_2O$-n-$C_4H_9$; $R^{14}$: $CH_2OCH_3$; $R^{15}$: $CH_2OH$

MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-147: $R^{13}$: $CH_2OH$; $R^{14}$: $CH_2NHCO(CH_2)_7CH=CH(CH_2)_7CH_3$; $R^{15}$ $CH_2NHCOCH=CH_2$;; $R^{16}$: $CH_2OCH_3$
MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

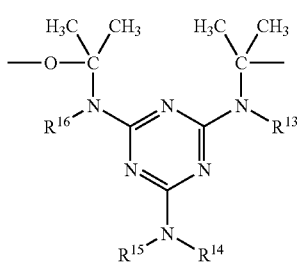

(MP-151)~(MP-200)

MP-151: $R^{13}$, $R^{14}$, $R^{15}$, $R^{16}$: $CH_2OH$
MP-152: $R^{13}$, $R^{14}$, $R^{15}$, $R^{16}$: $CH_2OCH_3$
MP-153: $R^{13}$, $R^{14}$, $R^{15}$, $R^{16}$: $CH_2O$-i-$C_4H_9$
MP-154: $R^{13}$, $R^{14}$, $R^{15}$, $R^{16}$: $CH_2O$-n-$C_4H_9$
MP-155: $R^{13}$, $R^{14}$, $R^{15}$, $R^{16}$: $CH_2NHCOCH=CH_2$
MP-156: $R^{13}$, $R^{14}$, $R^{15}$, $R^{16}$: $CH_2NHCO(CH_2)_7CH=CH(CH_2)_7CH_3$
MP-157: $R^{13}$, $R^{14}$, $R^{15}$: $CH_2OH$; $R^{16}$: $CH_2OCH_3$
MP-158: $R^{13}$, $R^{14}$, $R^{16}$: $CH_2OH$; $R^{15}$: $CH_2OCH_3$,
MP-159: $R^{13}$, $R^{14}$: $CH_2OH$; $R^{15}$, $R^{16}$: $CH_2OCH_3$
MP-160: $R^{13}$, $R^{16}$: $CH_2OH$; $R^{14}$, $R^{15}$: $CH_2OCH_3$
MP-161: $R^{13}$: $CH_2OH$; $R^{14}$ $R^{15}$, $R^{16}$: $CH_2OCH_3$
MP-162: $R^{13}$, $R^{14}$, $R^{16}$: $CH_2OCH_3$; $R^{15}$: $CH_2OH$
MP-163: $R^{13}$, $R^{16}$: $CH_2OCH_3$; $R^{14}$, $R^{15}$: $CH_2OH$
MP-164: $R^{13}$, $R^{14}$, $R^{15}$: $CH_2OH$; $R^{16}$: $CH_2O$-i-$C_4H_9$
MP-165: $R^{13}$, $R^{14}$, $R^{16}$: $CH_2OH$; $R^{15}$: $CH_2O$-i-$C_4H_9$
MP-166: $R^{13}$, $R^{14}$: $CH_2OH$; $R^{15}$, $R^{16}$: $CH_2O$-i-$C_4H_9$
MP-167: $R^{13}$, $R^{16}$: $CH_2OH$; $R^{14}$, $R^{15}$: $CH_2O$-i-$C_4H_9$
MP-168: $R^{13}$: $CH_2OH$; $R^{14}$ $R^{15}$, $R^{16}$: $CH_2O$-i-$C_4H_9$
MP-169: $R^{13}$, $R^{14}$, $R^{16}$: $CH_2O$-i-$C_4R_9$; $R^{15}$: $CH_2OH$
MP-170: $R^{13}$, $R^{16}$: $CH_2O$-i-$C_4H_9$; $R^{14}$, $R^{15}$: $CH_2OH$
MP-171: $R^{13}$, $R^{14}$, $R^{15}$: $CH_2OH$; $R^{16}$: $CH_2O$-n-$C_4H_9$
MP-172: $R^{13}$, $R^{14}$, $R^{16}$: $CH_2OH$; $R^{15}$: $CH_2O$-n-$C_4H_9$
MP-173: $R^{13}$, $R^{14}$: $CH_2OH$; $R^{15}$, $R^{16}$: $CH_2O$-n-$C_4H_9$
MP-174: $R^{13}$, $R^{16}$: $CH_2OH$; $R^{14}$, $R^{15}$: $CH_2O$-n-$C_4H_9$
MP-175: $R^{13}$: $CH_2OH$; $R^{14}$ $R^{15}$, $R^{16}$: $CH_2O$-n-$C_4H_9$
MP-176: $R^{13}$, $R^{14}$, $R^{16}$: $CH_2O$-n-$C_4H_9$; $R^{15}$: $CH_2OH$
MP-177: $R^{13}$, $R^{16}$: $CH_2O$-n-$C_4H_9$; $R^{14}$, $R^{15}$: $CH_2OH$
MP-178: $R^{13}$, $R^{14}$: $CH_2OH$; $R^{15}$: $CH_2OCH_3$; $R^{16}$: $CH_2O$-n-$C_4H_9$
MP-179: $R^{13}$, $R^{14}$: $CH_2OH$; $R^{15}$: $CH_2$-n-$C_4H_9$; $R^{16}$: $CH_2OCH_3$
MP-180: $R^{13}$, $R^{16}$: $CH_2OH$; $R^{14}$: $CH_2OCH_3$; $R^{15}$: $CH_2O$-n-$C_4H_9$
MP-181: $R^{13}$: $CH_2OH$; $R^{14}$, $R^{15}$: $CH_2OCH_3$; $R^{16}$: $CH_2O$-n-$C_4H_9$
MP-182: $R^{13}$: $CH_2OH$; $R^{14}$, $R^{16}$: $CH_2OCH_3$; $R^{15}$: $CH_2O$-n-$C_4H_9$
MP-183: $R^{13}$: $CH_2OH$; $R^{14}$: $CH_2OCH_3$; $R^{15}$, $R^{16}$: $CH_2O$-n-$C_4H_9$
MP-184: $R^{13}$: $CH_2OH$; $R^{14}$, $R^{15}$: $CH_2O$-n-$C_4H_9$; $R^{16}$: $CH_2OCH_3$
MP-185: $R^{13}$, $R^{14}$: $CH_2OCH_3$; $R^{15}$: $CH_2OH$; $R^{16}$: $CH_2O$-n-$C_4H_9$
MP-186: $R^{13}$, $R^{16}$: $CH_2OCH_3$; $R^{14}$: $CH_2OH$; $R^{15}$: $CH_2O$-n-$C_4H_9$
MP-187: $R^{13}$: $CH_2OCH_3$; $R^{14}$, $R^{15}$: $CH_2OH$; $R^{16}$: $CH_2O$-n-$C_4H_9$
MP-188: $R^{13}$, $R^{16}$: $CH_2O$-n-$C_4H_9$; $R^{14}$: $CH_2OCH_3$; $R^{15}$: $CH_2OH$
MP-189: $R^{13}$: $CH_2H$; $R^{14}$: $CH_2OCH_3$; $R^{15}$: $CH_2O$-n-$C_4H_9$; $R^{16}$: $CH_2NHCOCH=CH_2$
MP-190: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-191: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-193: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-194: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-196: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-197: $R^{13}$: $CH_2OH$; $R^{14}$: $CH_2NHCO(CH_2)_7CH=CH(CH_2)_7CH_3$; $R^{15}$ $CH_2NHCOCH=CH_2$;; $R^{16}$: $CH_2OCH_3$
MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, employed may be copolymers in which at least two types of the above repeating units are combined.

Further, simultaneously employed may be at least two types of compounds having a 1,3,5-triazine ring. Also simultaneously employed may be at least two types of disk shaped compounds (for example, compounds having a 1,3,5-triazine ring and compounds having a porphyrin skeleton).

The amount of additives containing a rod-shaped compound or a disc shaped compound is preferably 0.2-30% by weight with respect to the optical compensating film, but is particularly preferably 1-20% by weight.

[Physical Properties of Retardation Film]

The center-line surface roughness (Ra) of the retardation film of the present invention is preferably 0.001-1 μm.

The in-plane retardation Ro of the retardation film of the present invention represented by the following equation measured at a wavelength of 589 nm is preferably 30-100 nm and more preferably 50-100 nm. The retardation in the thickness direction of the film Rt is preferably 70-300 nm and more preferably 100-250 nm. Specifically preferably, Rt/Ro is 2-5.

The Ro and Rt values, and an angle between the lateral direction of the retardation film and the slow axis direction can be determined with an automatic birefringent meter.

Ro and Rt, represented by the following equation, of the cellulose ester film were measured at a wavelength of 589 nm using an automatic birefringent meter KOBRA-21ADH (produced by Oji Scientific Instruments), under a condition of 23° C. and 55% RH.

$$Ro=(nx=ny)\times d$$

$$Rt=((nx+ny)/2-nz)\times d$$

wherein nx represents an in-plane refractive index in the slow axis direction, ny represents an in-plane refractive index in the fast axis direction, nz represents a refractive index in the thickness direction of the film and d represents the thickness of the film (nm).

The thickness of the retardation film of the present invention is preferably 20-200 μm, more preferably 20-100 μm and specifically preferably 30-80 μm. Generally, a thicker retardation film is preferable with respect to obtaining a larger retardation value, however, in the present invention, a thinner polarizing plate can be obtained by providing a retardation function to a thin polarizing plate protective film, whereby the effect of film drying or the effect of long term storage can be minimized in the production of a polarizing plate.

The moisture permeability measured according to JIS Z0208 at 25° C. and 90% RH is preferably not more than 300 g/m²·24 h, more preferably 10-250 g/m²·24 h and still more preferably 10-180 g/m²·24 h. Specifically preferable is a retardation film of a thickness of 20-60 μm, having a moisture permeability of the above described range.

The long roll retardation film of the present invention specifically means the long roll film of the length of 100 m-5000 m, and presented as a roll form. The width of the retardation film of the present invention is preferably 1 m or more, more preferably 1.4 m or more and specifically preferably 1.4-4 m.

[Cycloolefin Polymer Film]

Cycloolefin polymer film preferably utilized in the present invention will now be explained.

Cycloolefin polymer utilized in the present invention is comprised of polymer resin containing an alicyclic structure.

Preferable cycloolefin polymer is resin in which cycloolefin is polymerized or copolymerized. Cycloolefin includes unsaturated hydrocarbon having a polycyclic structure and derivatives thereof such as norbornene, cyclopentadiene, tetracyclododecene, ethyl tetracyclododecene, ethylidene tetracyclododecene and tetracyclo[7.4.0.110,13.02,7]trideca-2,4, 6,11-tetraene; and unsaturated hydrocarbon having a monocyclic structure and derivatives thereof such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene. These cycloolefin may be provided with a polar group as a substituent. A polar group includes a hydroxyl group, a carboxyl group, an alkoxyl group, an epoxy group, a glycidyl group, an oxycarbonyl group, a carbonyl group, an amino group, an ester group and a carbonic acid anhydride group, and specifically preferable is an ester group, a carboxyl group or a carbonic acid anhydride group.

Preferable cycloolefin polymer may be those in which monomer other than cycloolefin being addition copolymerized. Monomer capable of addition copolymerization includes ethylene such as ethylene, propylene, 1-butene and 1-pentene; or dien such as α-olefin-1,4-hexadiene, 4-methyl-1,4-hexadiene, 5-methyl-1,4-hexadiene and 1,7-octadiene.

Cycloolefin is prepared by an addition polymerization reaction or a metathesis open ring polymerization reaction. Polymerization is preformed in the presence of a catalyst. A catalyst for addition polymerization includes, for example, a catalyst comprising a vanadium compound and an organoaluminum compound. A catalyst for open ring polymerization includes a polymerization catalyst comprising a halogenide, nitrate or an acetylacetone compound of metal such as ruthenium, rhodium, palladium, osmium, iridium and platinum, and a reducing agent; or a polymerization catalyst comprising a halogenide or acetylacetone compound of metal such as titanium, vanadium, zirconium, tungsten and molybdenum, and an organoaluminum compound. Such as polymerization temperature and pressure are not specifically limited, however, polymerization is generally performed at a polymerization temperature of –50-100° C. and under a polymerization pressure of 0-490 N/cm².

Cycloolefin polymer utilized in the present invention is preferably those in which cycloolefin is polymerized or copolymerized followed by being subjected to a hydrogen addition reaction to convert unsaturated bonds in the molecule into saturated bonds. A hydrogen addition reaction is performed by blowing hydrogen in the presence of a hydrogenation catalyst well known in the art. A hydrogenation catalyst includes a homogeneous catalyst comprising a combination of a transition metal compound/an alkyl metal compound such as cobalt acetate/triethyl aluminium, neckel acetylacetonato/triisobutyl aluminum, titanocene dichloride/n-butyl lithium, zirconocene dichloride/sec-butyl lithium and tetrabutoxy titanate/dimethyl magnesium; an inhomogeneous catalyst such as nickel, palladium and platinum; and an inhomogeneous solid carrying catalyst comprising a metal catalyst held by a carrier such as nickel/silica, nickel/diatomaceous earth, nickel/alumina, palladium/carbon, palladium/silica, palladium/diatomaceous earth and palladium/alumina.

In addition, cycloolefin polymer also includes the following norbornene type polymer. Norbornene type polymer is preferably provided with a norbornene skeleton as a repeating unit, and specific examples thereof include those described in such as JP-A Nos. 62-252406, 62-252407, 2-133413, 63-145324, 63-264626 and 1-240517, Examined Japanese Patent Application Publication No. 57-8815, JP-A Nos. 5-39403, 5-43663, 5-43834, 5-70655, 5-279554, 6-200985, 7-62028, 8-176411 and 9-241484, however, is not limited thereto. Further, these may be utilized alone or in combination of at least two types.

In the present invention, among the above-described norbornene type polymer, preferable are those provided with a repeating unit represented by any one of following structural formulas (I)-(IV).

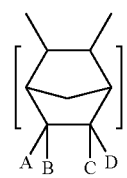

(I)

-continued (II)

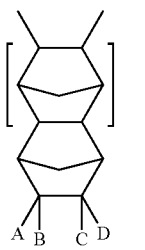

(III)

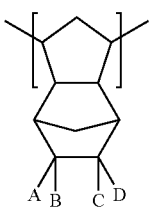

(IV)

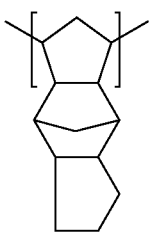

A, B, C and D, in above structural formula (I)-(IV), each independently represent a hydrogen atom or a monovalent organic group.

Further, among the aforesaid norbonene type polymer, also preferable is hydrogenated polymer prepared by hydrogenation of polymer, which is prepared by metathesis polymerization of at least one compound represented by following chemical structure (V) or (VI) and an unsaturated cyclic compound which is copolymeizabele with this.

(V)

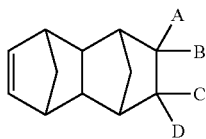

(VI)

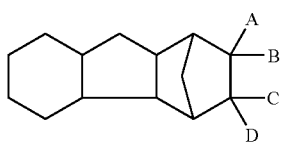

In the aforesaid chemical structures, A, B, C and D each independently represent a hydrogen atom or a monovalent organic group.

Herein, the above-described A, B, C and D are not specifically limited, however, are preferably a hydrogen atom, a halogen atom, a monovalent organic group or an organic group connected via a connecting group of at least divalent, and these may be identical to or different from each other. Further, A or B, and C or D may form a monocyclic ring or polycyclic ring structure. Herein, the above-described connecting group of at least divalent contains a hetero atom such as an oxygen atom, a sulfur atom and a nitrogen atom, and includes ether, ester, carbonyl, urethane, amide and thioether, however, is not limited thereto. Further, the above described organic group may be further substituted via the above-described connecting group.

Further, as other monomer copolymerizable with norbornene type monomer, utilized are α-olefin having a carbon number of 2-20 such as ethylene, propylene, 1-butene, 1-pentene, 1-hexene, 1-octene, 1-decene, 1-dodecene, 1-tetradecene, 1-hexadecene, 1-octadecene and 1-eicosene, and derivatives thereof; cycloolefin such as cyclobutene, cyclopentene, cyclohexene, cyclooctene and 3a,5,6,7a-tetrahydro-4,7-methano-1H-indene, and derivatives thereof; non-conjugated diene such as 1,4-hexadiene, 4-methyl-1,4-hexadiene, 5-methyl-1, 4-hexadiene and 1, 7-octadiene. Among them, α-olefin and ethylene are specifically preferable.

These other monomers copolymerizable with norbornene type monomer may be utilized each alone or in combination of at least two types. In the case of addition polymerization of norbornene type monomer and other monomer copolymerizable therewith, a ratio of a structural unit arising from norbornen type monomer and a structural unit arising from copolymerizable other monomer is suitably selected to be in a range of generally 30/70-99/1, preferably 50/50-97/3 and more preferably 70/30-95/5, based on a weight ratio.

When unsaturated bonds remaining in a polymer molecule chain are saturated by a hydrogenation reaction, the hydrogenation degree is preferably set to not less than 90%, preferably not less than 95% and specifically preferably not less than 99%, with respect to light stability and weather-proofing.

In addition, cycloolefin polymer utilized in the present invention includes such as thermoplastic saturated norbornene type resin described in paragraph Nos. [0014]-[0019] of JP-A 5-2108, thermoplastic norbornene type resin described in paragraph Nos. [0015]-[0031] of JP-A 2001-277430, thermoplastic norbornene type resin described in paragraph Nos. [0008]-[0045] of JP-A 2003-14901, norbornene type resin compositions described in paragraph Nos. [0014]-[0028] of JP-A 2003-139950, norbornene type resin described in paragraph Nos. [0029]-[0037] of JP-A 2003-161832, norbornene type resin described in paragraph Nos. [0027]-[0036] of JP-A 2003-195268, alicyclic structure containing polymer resin described in paragraph Nos. [0009]-[0023] of JP-A 2003-211588 and norbornen type polymer resin or vinyl alicyclic hydrocarbon polymer resin described in paragraph Nos. [0008]-[0024] of JP-A 2003-211588.

Specifically, such as Zeonex and Zeonoa, manufactured by Nippon Zeon Co., Ltd.; Arton manufactured by JSR Co., Ltd; Apel (such as APL 8008T, APL 6509T, APL 6013T, APL 5014DP and APL 6015T) manufactured by Mitsui Chemicals Co., Ltd. are preferably utilized.

A molecular weight of cycloolefin polymer utilized in the present invention is appropriately selected according to the application, however, it is preferred to achieve a highly balanced mechanical strength and a mold processing behavior of a molded product, when it is in a range of generally 5,000-500,000, preferably 8,000-200,000 and more preferably 10,000-100,000 based on a weight average molecular weight of converted polyisobutylene or polystyrene, measured by a gel permeation chromatography method.

Further, it is possible to effectively prevent polymer from such as decomposition and coloring at mold processing from, by blending a low volatile anti-oxidant at a ratio of 0.01-5 weight parts against 100 weight parts of cycloolefin polymer.

As an antioxidant, those having a vapor pressure at 20° C. of not more than $10^{-5}$ Pa and specifically not more than $10^{-8}$ Pa are preferred. An antioxidant having a vapor pressure of over $10^{-5}$ Pa will cause problems of foaming at extrusion molded and of evaporation of an antioxidant from the surface of a molded product when being exposed to high temperature.

An antioxidant utilizable in the present invention includes the following and these may be utilized alone or in combination of a few types.

Hindered phenol type: such as 2,6-di-t-butyl-4-methylphenol, 2,6-di-t-butylphenol, 4-hydroxymethyl-2,6-di-butylphenol, 2,6-di-t-butyl-α-methoxy-p-dimethyl-phenol, 2,4-di-t-aminophenol, t-butyl-m-cresol, 4-t-butylphenol, styrenized phenol, 3-t-butyl-4-hydroxyanisol, 2,4-dimethyl-6-t-butylphenol, octadecyl-3-(3,5-di-t-butyl-4-hydroxyphenyl)propionate, 3,5-di-t-butyl-hyroxybenzylphosphonate-diethylester, 4,4'-bidphenol, 4,4'-bis-(2,6-di-t-butylphenol), 2,2'-methylene-bis-(4-methyl-6-t-butylphenol), 2,2'-methylene-bis-(4-methyl-6-α-methylcyclohexylphenol), 4,4'-methylene-bis-(2,6-di-t-butylphenol), 1,1'-methylene-bis-(2,6-di-t-butylnaphthol), 4,4'-butylidene-bis-(2,6-di-t-butyl-methacresol), 2,2'-thio-bis-(4-methyl-6-t-butylphenol), di-o-cresol sulfide, 2,2'-thio-bis-(2-methyl-6-t-butylphenol), 4,4'-thio-bis(3-methyl-6-t-butylphenol), 4,4'-thio-bis-(2,3-di-t-sec-amylphenol), 1,1'-thio-bis-(2-naphthol), 3,5-di-t-butyl-4-hydroxybenzylether, 1,6-hexanediol-bis[3,(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], 2,2-thiobis(4-methyl-6-t-butylphenol), N,N'-hexamethylenebis(3,5-di-t-butyl-4-hydrocynamide), bis(3,5-di-t-butyl-4-hydroxybenzyl ethylphsphonate)calcium, 1,3,5-trimethyl-2,4,6-tris-(3,5-di-t-butyl-4-hydroxybenzyl)benzene, triethyleneglycol-bis[3,(3-t-butyl-5-mehyl-4-hydroxyphenyl)propionate], 1,3,5-trimethyl-2,4,6-tris(3,5-di-t-butyl-4-hydroxybenzyl)benzene, tris-(3,5-di-t-butyyl-4-hydrovybenzyl)-isocyanulate and pentaerythlityl-tetrakis[3-(3,5-di-t-butyl-4-hydroxyphenyl)propionate].

Aminophenols: such as normalbutyl-p-aminophenol, normalbutyloyl-p-aminophenol, normalpelargonoyl-p-aminophenol, normallauroyl-p-aminophenol, normalstearoyl-p-aminophenol, 2,6-di-t-butyl-α-dimethyl and amino-p-cresol.

Hydroquinone type: such as hydroquinone, 2,5-di-t-butyl-haydroquinone, 2,5-di-t-amylhydroquinone, hydroquinone methylether and hydroquinone monobenzylether.

Phosphite type triphosphite: such as tris(3,4-di-t-butylephenyl)phosphite, tris(nonylphenyl)phosphite, tetrakis(2,4-di-t-butylphenyl)-4,4'-biphenylenephosphite and 2-ethyl-hexyloctylphosphite.

Others: such as 2-mercaptobenzothiazole zinc salt, dicatecolborate-di-o-triguanidine salt, nickel-dimethyldithiocarbamate, nickel-pentamethylene dithiocarbamate, mercaptobenzimidazole and 2-mercaptobenzimidazole zinc salt.

Cycloolefin polymer film may be incorporated with an additive which can be generally blended in plastic film. Such an additive includes such as a thermal stabilizer, a light stabilizer, an ultraviolet absorbent, an antistatic agent, a sliding agent, a plastisizer and a filling agent, and the content can be selected in a range of not disturbing the object of the present invention.

A forming method of cycloolefin polymer film is not specifically limited, and either a heat fused molding method or a solution casting method can be utilized. A heat fused molding method can be classified, in further details, into such as an extrusion molding method, a press molding method, an inflation molding method, an ejection molding method, a blow molding method and a stretching molding method, however, among these methods, to prepare film being excellent in such as mechanical strength and surface precision, preferable are an extrusion molding method, an inflation molding method and a press molding method, and most preferable is an extrusion molding method. The molding condition is appropriately selected depending on an application purpose and a molding method, however, in the case of applying a heat fused molding method, cylinder temperature is appropriately set generally in a range of 150-400° C., preferably of 200-350° C. and more preferably of 230-330° C. There is a possibility of causing molding defects such as a shrink mark or distortion in film due to deteriorated fluidity when the resin temperature is excessively low, while voids or silver streaks or yellowing of film may be generated when the resin temperature is excessively high. Thickness of film is generally in a range of 5-300 μm, preferably of 10-200 μm and more preferably of 20-100 μm. Handling at accumulation becomes difficult when the thickness is excessively thin, while drying time after accumulation becomes long to deteriorate productivity when the thickness is excessively thick.

Cycloolefin polymer film is preferably has a wetting tension of the surface of preferably not less than 40 mN/m, more preferably not less than 50 mN/m and furthermore preferably not less than 55 mN/m. When the wetting tension of the surface is in the above-described range, adhesion strength between the film and polarizer film will be increased. To adjust the wetting tension of the surface, for example, it is possible to apply film with a corona discharge treatment, ozone blowing, ultraviolet ray irradiation, a flame treatment, a chemical treatment and other surface treatments well known in the art.

Thickness of a sheet before stretching is required to be approximately 50-500 μm; and thickness unevenness is preferably as small as possible and is within ±8%, preferably within ±6% and more preferably within ±4%, in the whole surface.

To form a retardation film of the present invention from cycloilefin polymer film described above, it is possible to prepare by a manufacturing method similar to the aforesaid cellulose ester, and at least by uniaxially stretching the film in a plurality of steps. Namely, the retardation film can be manufactured by the following processes via a tenter stretching method: (i) stretching the film in the lateral direction of a long roll film by enlarging the distances between the grippers holding both edges of the film, which is referred to as First Process; (ii) reducing the distances between the grippers holding the both edges, which is referred to as Second Process; and (iii) stretching the film again in the lateral direction by enlarging the distances of the grippers, which is referred to as Third Process.

The stretching ratio of the main stretching in Third Process is 1.1-10 times and preferably 1.3-8 times, and in this range, retardation is adjusted to be a desired value. The absolute value of retardation is not increased not to achieve the predetermined value when the stretching magnification is excessively small, while the sheet may be broken when it is excessively large.

Stretching is generally performed in a temperature range of from Tg of resin constituting the sheet to Tg+50° C. and preferably Tg–Tg+40° C. The sheet may be broken when the stretching temperature is excessively low, while molecular arrangement is insufficient not to prepare desired retardation film when it is excessively high.

Thus obtained film is comprised of molecules being oriented by stretching to be provided with a desired amount of retardation. In the present invention, retardation in the plane Ro at 589 nm is preferably 30-100 nm and more preferably 50-100 nm. Further, retardation in the thickness direction Rt is preferably 70-300 nm and specifically preferable is that the Rt/Ro value is 2-5.

Retardation can be controlled by: a retardation of a sheet before stretching, a stretching ratio, a stretching temperature and a thickness of the film oriented by stretching. When a sheet before stretching has a constant thickness, since there is a tendency that an absolute value of retardation is increased as the stretching ratio of film is large, stretching oriented film having a desired retardation can be obtained by adjusting the stretching ratio.

The smaller is scattering of retardation, the more preferable, and cycloolefin film of the present invention has a scattering of retardation at a wavelength of 589 nm as small as generally within ±50 nm, preferably within ±30 nm and more preferably within ±20 nm.

Scattering of in-plane retardation or retardation in the thickness direction, or unevenness in thickness can be minimized by the following methods: (i) using a sheet having a smaller retardation scattering or a smaller thickness variation before stretching; and (ii) making stress to be uniformly applied to the sheet when the sheet is stretched. For this purpose, the sheet is preferably stretched under a uniform temperature distribution, that is, in an environment of controlled temperature of within ±5° C., preferably within ±2° C. and specifically preferably within ±0.5° C.

(Polycarbonate Type Film)

There are various polycarbonate type resins utilized to prepare polycarbonate type film; aromatic polycarbonate is preferable with respect to chemical properties and physical properties and specifically preferable is bisphenol A type polycarbonate. Among them, furthermore preferable resin includes those utilizing a bisphenol derivative, in which such as a benzene ring, a cyclohexane ring or an aliphatic hydrocarbon group is introduced in bisphenol A, however, specifically preferable is polycarbonate, which is prepared by utilizing a derivative introduced with these groups asymmetrically against the central carbon, having a structure with reduced anisotropy in a unit molecule. For example, preferable is polycarbonate prepared by utilizing bisphenol A in which tow methyl groups of the central carbon are substituted by benzene rings, or bisphenol A in which one hydrogen of each benzene ring is substituted by a methyl group or a phenyl group, asymmetrically against the central carbon.

Specifically, preferable resin is those prepared from 4,4'-dihydroxydiphenylalkane or a halogen substitutent thereof by a phosgene method or an ester exchange method, and includes such as 4,4'-dihydroxydiphenylmethane, 4,4'-dihydroxydiphenylethane and 4,4'-dihydroxydiphenylbutane.

In the retardation film comprising polycarbonate resin utilized in the present invention, transparent resin such as polystyrene type resin, methylmethacrylate type resin or cellulose acetate type resin may be utilized in combination by mixing, or polycarbonate resin may be accumulated on at least one surface of cellulose acetate type film. Preparation method of polycarbonate type film utilizable in the present invention is not specifically limited, and any one of film by an extrusion method, film by a solvent casting method and film by a calendar method may be utilized. In the present invention, a polycarbonate film having desired in-plane retardation and retardation in the thickness direction, as well as exhibiting minimal strain can be obtained by employing a uniaxial stretching method or a biaxial stretching method, and employing the manufacturing method described above for the cellulose ester film containing the stretching processes of the present invention.

Polycarbonate type film utilized in the present invention preferably has a glass transition temperature (Tg) of not lower than 110° C. and a water absorbability (a value measured under a condition in water of 23° C. for 24 hours) of not more than 0.3%. More preferable is to utilize those having a Tg of not lower than 120° C. and a water absorbability of not more than 0.2%.

(Polarizing Plate)

A polarizing plate can be prepared by a general method. A retardation film of the present invention, the back side of which has been subjected to an alkali saponification treatment, is preferably pasted up on at least one surface of polarizer film prepared by being emersion stretched in an iodine solution, by use of a completely saponified type polyvinyl alcohol aqueous solution. On the other surface, said film may be utilized or another polarizing plate protective film may be utilized. Cellulose ester film available on the market (for example, Konicaminolta TAC KC8UX, KC4UX, KC5UX, KC8UCR3, KC8UCR4, KC8UY, KC4UY, KC12UR, KC8UCR-3, KC8UCR-4, KC8UCR-5, KC8UY-HA, KC8UX-RHA and KC8UX-RHA-N, manufactured by Konicaminolta Opto, Inc.; Fuji TAC TD80UF, T80UZ, T40UZ and antireflection film (Fuji Film CV Clearview UA), manufactured by Fuji Photo Film Co., Ltd.) are preferably utilized. Polarizing plate protective film utilized on the other surface is preferably optically isotropic polarizing plate protective film having a retardation in the plane Ro of 0-20 nm and Rt of −50-50 nm. For example, preferably utilized is polarizing plate protective film provided with a hard-coat layer or an antiglare layer described in such as JP-A Nos. 2003-114333, 2004-203009, 2004-354699 and 2004-354828. Further, said hard-coat layer or antiglare layer is preferably accumulated with such as an antireflection layer and an anti-stain layer.

In addition to these, also preferably utilized is polarizing plate protective film which combines optical compensation film having an optical anisotropic layer formed by orientating a liquid crystal compound such as discotic liquid crystal, bar-form liquid crystal and cholesteric liquid crystal. For example, an optical anisotropic layer can be formed by a method described in JP-A 2003-98348. Combination use with a polarizing plate of the present invention can provide a liquid crystal display having excellent flatness and a stable viewing angle enlargement effect.

Polalizer film as a primary constituent element of a polarizing plate is an element which passes light having a polarized wave plane in a predetermined direction, and typical polarizer film commonly known at present is polyvinyl alcohol type polarizer film, which is classified into polyvinyl alcohol type film being dyed with iodine and one being dyed with dichroic dye. Polarizer film is prepared by film formation from polyvinyl alcohol aqueous solution, and the obtained film is uniaxially stretched and dyed, or is uniaxially stretched after dying, preferably followed by being subjected to a durability treatment with a boron compound. One surface of optical film of the present invention is pasted up on the surface of said polarizer film to prepare a polarizing plate. Pasting up is preferably carried out by use of a water-based adhesive comprising completely saponified polyvinyl alcohol as a primary component.

Further, ethylene modified polyvinyl alcohol is also utilized as polarizer film. The thickness of polarizer film is preferably 5-30 μm and specifically preferably 10-25 μm.

(Display)

A liquid crystal display constituted of a polarizing plate employing retardation film of the present invention is utilized to exhibit a higher display quality compared to that constituted of an ordinary polarizing plate. In particular, the effects of the present invention are more effectively exhibited when a polarizing plate of the present invention is utilized in a multi-domain type liquid crystal display and more preferably in a multi-domain type liquid crystal display by means of a double-refractive mode.

To be multi-domain is suitable for improvement of symmetry of image display and various types have been reported (Okita, Yamauchi: Liquid Crystal, 6 (3), 303 (2002)). Said liquid crystal cell is also shown in "Yamada, Yamahara: Liquid Crystal, 7 (2), 184 (2003)", however, is not limited thereto.

A polarizing plate of the present invention can be effectively utilized in a VMA (Multi-domain Vertical Alignment) mode represented by a vertical alignment mode, in particular, a quarterly-divided MVA mode, a PVA (Patterned Vertical Alignment) mode, which has been made into multi-domain by electrode arrangement and well known in the art, and a CPA (Continuous Pinwheel Alignment) in which electrode arrangement and cheiral ability are fused together. Further, also in an application to an OCB (Optical Compensated Bend) mode, film having an optical biaxial property is proposed (T. Miyashita, T. Uchida: J. SID, 3 (1), 29 (1995)), and the effects of the present invention in the display quality can be also exhibited by use of a polarizing plate of the present invention. Provided that the effects of the present invention are exhibited by utilizing a polarizing plate of the present invention, there is no limitation with respect to a liquid crystal mode and arrangement of a polarizing plate. Among them, retardation film of the present invention is preferably utilized in a vertical alignment mode liquid crystal display and specifically preferably in a MVA (Multi-domain Vertical Alignment) mode liquid crystal display.

A display quality of a display cell is preferably symmetric with respect to right and left in observation of human being. Therefore, in the case of a display cell being a liquid crystal display cell, the domain can be multiplied essentially preferring symmetry of the observer side. To divide the domain, a method well known in the art can be applied and the method by means of a half dividing method and preferably a quarterly-dividing method, which can be determined in consideration of characteristics of a liquid crystal mode well known in the art.

A liquid crystal display has been applied for devices of color display and moving image display, and a display quality of the present invention enables a fatigueless and faithful moving image display due to improvement in contrast and durability of a polarizing plate.

In a liquid crystal display of the present invention, a polarizing plate employing retardation film of the present invention is arranged on one surface of a liquid crystal cell or on the both surfaces. At this time, utilizing retardation film of the present invention, which is contained in a polarizing plate, to be on the liquid cell side contributes improvement of a display quality.

EXAMPLES

The present invention will now be specifically described with reference to examples, however the present invention is not limited thereto.

Example 1

Measurement of Retardation Values Ro and Rt

By employing an Abbe's refractometer and a spectral light source, the average refractive index of a film sample was determined. Further, film thickness was determined employing a commercial micrometer.

By employing an automatic birefringence analyzer, KOBRA-21ADH (produced by Oji Scientific Instruments), retardation at 589 nm wavelength of the film which had been allowed to stand at 23° C. and 55% relative humidity for 24 hours was determined at the same ambient conditions. By inputting the above average refractive index and thickness into the following formula, in-plane retardation value Ro and thickness direction retardation value Rt were obtained. Further, the direction of the slow axis with respect to the lateral direction of the film was simultaneously determined.

$$Ro = (nx - ny) \times d$$

$$Rt = \{(nx + ny)/2 - nz\} \times d$$

wherein nx is the in-plane refractive index of a film in the delayed axis direction, ny is the in-plane refractive index of the film in the advanced axis direction, and nz is the refractive index of the film in the thickness direction, and d is the thickness (nm) of the film.

<<Preparation of Retardation Film>>
(Preparation of Retardation Films 101-107 of the Present Invention)

| <Minute Particle Dispersion) | |
|---|---|
| Minute particles (Aerosil R972V, produced by Nippon Aerosil Co. Ltd.) (at an average diameter of the primary particles of 16 nm and an apparent specific gravity of 90 g/liter) | 11 parts by weight |
| Ethanol | 89 parts by weight |

The above compounds were mixed while stirring and the resulting mixture was dispersed employing a MANTON-GAULIN homogenizer.

<Minute Particle Addition Liquid>

The following cellulose ester was added to a dissolution tank into which methylene chloride was charged. After complete dissolution via heating, the resulting solution was filtered via AZUMI ROSHI No. 244, produced by Azumi Filter Co., Ltd. After filtration, while vigorously stirring the cellulose ester solution, the above minute particle dispersion was gradually added. Further, the resulting mixture was dispersed employing an attritor so that the diameter of the secondary particles reached the specified size. The resulting dispersion was filtered through FINE MET NF, produced by Nippon Seisen Co., Ltd., whereby a minute particle addition liquid was prepared.

| Methylene chloride | 99 parts by weight |
|---|---|
| Cellulose acetate propionate (at a degree of acetyl group substitution of 1.5, a degree of propionyl group substitution of 1.0, and a degree of total acyl group substitution of 2.5) | 4 parts by weight |
| Minute particle dispersion | 11 parts by weight |

Main Dope 1 formulated as described below was prepared. Initially, added to a pressurized dissolution tank were methylene chloride and ethanol. While stirring, charged into the pressurized dissolution tank containing the above solvents was cellulose ester. While stirring and heating, dissolution was completed. Subsequently, plasticizers and UV absorbers were added and dissolved. The resulting solution was filtered through AZUMI ROSHI No. 244, produced by Azumi Filter Co., Ltd., whereby Main Dope 1 was prepared.

One hundred parts by weight of Main Dope 1 and 5 parts by weight of the minute particle addition liquid were added and sufficiently mixed employing an in-line mixer (TORAY STATIC TYPE IN-LINE MIXER HI-MIXER, SWJ). Subsequently, the resulting mixture was uniformly cast onto a 2 m wide stainless steel band employing a belt casting apparatus. Peeling from the stainless steel band was carried out under conditions of a peeling tension of 130 N/m, a residual solvent amount of 100% by weight, and a cooling air temperature of 20° C., and conveyance was carried out in such a manner that the rate of a portion (being a roller) which reduced the tension of the peeling portion was made different from that of the portion (being another roller) which applied the subsequent conveyance tension. The stretching ratio at the yield point of the web in First Process Subsequently, by employing the tenter apparatus exemplified by the present invention, both web edges were held via clips and, in Zone A in First Process, pre-casting was carried out at a stretching factor of 3% with a tension of 170 N/mm at 135° C. After pre-stretching, in Zone B in Second Process maintained at 135° C., shrinkage was carried out by decreasing the distance between the clips by 3%. After maintaining the resulting width in Zone C, in Zone D in Third Process, main stretching by a factor of 30% was carried out at 145° C. After maintaining the resulting width at 145° C. in Zone E, the distance between the clips was decrease by 1% at 145° C. in Zone F, followed by releasing from the width holding. Further, drying was carried out in a drying zone maintained at 145° C. for 30 minutes under conveyance, whereby 1.4 m wide and 40 µm thick Retardation Film 101 carrying 1 cm wide and 8 mm high knurling at the edges was prepared. The stretching ratio at the yield point of the web in First Process was found to be 1.45.

<Composition of Main Dope 1>

| | |
|---|---|
| Methylene chloride | 390 parts by weight |
| Ethanol | 80 parts by weight |
| Cellulose acetate propionate (at a degree of acetyl group substitution of 1.5, a degree of propionyl group substitution of 1.0, and a degree of total acyl group substitution of 2.5) | 100 parts by weight |
| Plasticizer: Aromatic Termination Ester Sample No. 4 | 5 parts by weight |

<Composition of Main Dope 1>

| | |
|---|---|
| Plasticizer: trimethylolpropane tribenzoate | 5.5 parts by weight |
| UV absorber: TINUVIN 109 (produced by Ciba Specialty Chemicals Co., Ltd.) | 1 part by weight |
| UV absorber TINUVIN 171 (produced by Ciba Specialty Chemicals Co., Ltd.) | 1 part by weight |

Retardation Films 102-107 were prepared in the same manner as Retardation Film 101, except that the residual solvents of the Zone A inlet, the film width ratio in each zone, the temperature of each zone, and the film thickness were changed as listed in Table 1.

Further, Employed in Retardation Films 106 and 107 were

<Composition of Main Dope 2>

| | |
|---|---|
| Methylene chloride | 390 parts by weight |
| Ethanol | 80 parts by weight |
| Cellulose acetate propionate (at a degree of acetyl group substitution of 1.7, a degree of propionyl group substitution of 1.0, and a degree of total acyl group substitution of 2.7) | 100 parts by weight |
| Plasticizer: triphenyl phosphate | 5 parts by weight |
| Plasticizer: ethylphthalyl ethyl glycolate | 5 parts by weight |
| UV absorber: TINUVIN 109 (produced by Ciba Specialty Chemicals Co., Ltd.) | 1 part by weight |
| UV absorber TINUVIN 171 (produced by Ciba Specialty Chemicals Co., Ltd.) | 1 part by weight |

(Preparation of Comparative Retardation Films 201-203)

Comparative Retardation Films 201-203 were prepared employing the same formula as that of above Retardation Film 106 under the conditions listed in Table 2, employing each apparatus of Comparative (1), Comparative (2) or Comparative (3) shown in FIG. 1. In Table 2, a-f each shows each zone of comparative apparatus in FIG. 1.

<<Evaluation>>

Retardation values Ro and Rt of Retardation Films 101-107 and 201-203, prepared as above, were determined. Tables 1 and 2 show the results. Further, it was found that all the shifts of the slow axis with respect to the film in-plane lateral direction of Retardation Films 101-107 and 201-203, as prepared above, were within 1 degree.

TABLE 1

| *1 | Main Dope No. | *2 | *3 A | B | C | D | E | F | Zone Temperature/° C. A | B | C | D | E | F | *4 | Ro (nm) | Rt (nm) | Remarks |
|---|---|---|---|---|---|---|---|---|---|---|---|---|---|---|---|---|---|---|
| 101 | 1 | 0 | 1.03 | 1.00 | 1.00 | 1.30 | 1.30 | 1.29 | 135 | 135 | 145 | 145 | 145 | 145 | 40 | 46 | 125 | Inv. |
| 102 | 1 | 0 | 1.03 | 1.00 | 1.00 | 1.30 | 1.30 | 1.29 | 128 | 128 | 135 | 135 | 135 | 135 | 40 | 47 | 127 | Inv. |
| 103 | 1 | 0 | 1.10 | 1.08 | 1.08 | 1.30 | 1.30 | 1.29 | 135 | 135 | 145 | 145 | 145 | 145 | 40 | 49 | 130 | Inv. |
| 104 | 1 | 20 | 1.03 | 1.00 | 1.00 | 1.30 | 1.30 | 1.29 | 135 | 135 | 145 | 145 | 145 | 145 | 40 | 44 | 125 | Inv. |
| 105 | 1 | 20 | 1.10 | 1.08 | 1.08 | 1.30 | 1.30 | 1.29 | 135 | 135 | 145 | 145 | 145 | 145 | 40 | 46 | 130 | Inv. |

TABLE 1-continued

| *1 | Main Dope No. | *2 | *3 A | B | C | D | E | F | Zone Temperature/° C. A | B | C | D | E | F | *4 | Ro (nm) | Rt (nm) | Remarks |
|---|---|---|---|---|---|---|---|---|---|---|---|---|---|---|---|---|---|---|
| 106 | 2 | 0 | 1.03 | 1.00 | 1.00 | 1.30 | 1.30 | 1.29 | 135 | 135 | 145 | 145 | 145 | 145 | 80 | 46 | 128 | Inv. |
| 107 | 2 | 20 | 1.10 | 1.08 | 1.08 | 1.30 | 1.30 | 1.29 | 135 | 135 | 145 | 145 | 145 | 145 | 80 | 46 | 128 | Inv. |

*1: Retardation Film No.
*2: Residual Solvent (% by weight) [residual solvent at the inlet of Zone A]
*3: Film Width Ratio at End of Zone [ratio of film width at the end of each zone when the width at the start point of holding in Zone A is set to 1.00]
*4: Film Thickness (μm)
Inv.: Present Invention

TABLE 2

| *1 | Main Dope No. | *2 | *3 | *4 a | b | c | d | e | f | Zone Temperature/° C. a | b | c | d | e | f | *5 | Ro (nm) | Rt (nm) | Remarks |
|---|---|---|---|---|---|---|---|---|---|---|---|---|---|---|---|---|---|---|---|
| 201 | 2 | 0 | Comp. (1) | 1.30 | 1.29 | — | — | — | — | 135 | 145 | — | — | — | — | 80 | 47 | 128 | Comp. |
| 202 | 2 | 0 | Comp. (2) | 1.03 | 1.03 | 1.30 | 1.29 | — | — | 135 | 145 | 145 | 145 | — | — | 80 | 47 | 126 | Comp. |
| 203 | 2 | 0 | Comp. (3) | 1.03 | 1.02 | 1.01 | 1.30 | 1.30 | 1.29 | 135 | 135 | 145 | 145 | 145 | 145 | 80 | 42 | 128 | Comp. |

*1: Retardation Film No.
*2: Residual Solvent (% by weight) [residual solvent at the inlet of Zone A]
*3: Tenter Apparatus in FIG. 1
*4: Film Width Ratio at End of Zone [ratio of film width at the end of each zone when the width at the start point of holding in Zone A is set to 1.00]
*5: Film Thickness (μm)
Comp.: Comparative Subsequently, polarizing plates were prepared as described below, employing each of Retardation Films 101-107 and 201-203 and evaluated as follows.

<<Preparation of Polarizing Plates>>

Subsequently, polarizing plates were prepared employing each of Retardation Films 101-107 and 201-203.

A 120 μm thick polyvinyl alcohol film was uniaxially stretched (at 110° C. and a factor of 5). The resulting film was immersed for 60 seconds in an aqueous solution composed of 0.075 g of iodine, 5 g of potassium iodide, and 100 g of water, and subsequently immersed in an aqueous solution at 68° C., which was composed of 6 g of potassium iodide, 7.5 g of boric acid, and 100 g of water, followed by washing and drying, whereby a polarizing film was obtained.

Subsequently, according to following Processes 1-5, a polarizing plate was prepared in such a manner that each of above Retardation Films 101-107 and 201-203 was adhered to the polarizing film and, as a cellulose ester film on the reverse side, KONICA MINOLTA TAC KC8UX-RHA (produced by Konica Minolta Opto, Inc.) was adhered.

Process 1: Cellulose ester film, in which the side to be adhered was saponified, was prepared via immersion in a 1 mol/L aqueous sodium hydroxide solution at 50° C. for 60 seconds, followed by washing and drying. Incidentally, 123-128 were made to be hydrophilic via a plasma treatment instead of the saponification treatment.

Process 2: The above polarizing film was immersed in a 2% by weight polyvinyl alcohol adhesive tank for 1-2 seconds.

Process 3: Any excessive adhesive adhered to the polarizing film in Process 2 was gently wiped off and the resulting polarizing film was placed on the cellulose ester film which was treated in Process 1. Further, an antireflection layer of KC8UX-RHA was laminated to locate on the outer side.

Process 4: The retardation film laminated in Process 3, the polarizing film, and the cellulose ester sample were adhered under a pressure of 20-30 N/cm² at a conveying rate of 2 m/minute.

Process 5: A sample which was prepared in Process 4 via adhesion of the polarizing film, the cellulose ester film, and each of Retardation Films 101-107 and 201-203 was dried for two minutes in an 80° C. drying apparatus, whereby Polarizing Plates 101-107, and 201-203 were prepared.

<<Preparation of Liquid Crystal Displays>>

The polarizing plate of a commercial liquid crystal TV (AQUOS 32AD5, produced by Sharp Corp.) was peeled off. Subsequently, each of Polarizing Plates 101-107 and 201-203 was adhered to the glass surface of the liquid crystal cell.

During the above operation, the polarizing plate was adhered in such a manner that the surface of the retardation film was on the liquid crystal cell side, and the absorption axis was directed to the same direction as that of the previously adhered polarizing plate, whereby each of Liquid Crystal Displays 101-107 and 202-203 was prepared.

<<Evaluation>>

(Evaluation of Front Contrast)

Measurement was made, at an ambience of 23° C. and 55% relative humidity, 30 minutes after turning on the backlight of the above liquid crystal TV. By employing EZ-CONTRAST 160D, produced by ELDI Co., front luminance of the white display and the black display of the liquid crystal TV was determined from the normal direction and the ratio was designated as front contrast. A higher ratio refers to a more desired contrast.

Front contrast=luminance of the white display determined from the normal of the display/luminance of the black display determined from the normal of the display.

Table 3 shows the results.

When a liquid crystal cell and a polarizing film are changed, the front contrast value also changes. Since in the above experiments, the same cell and the same polarizing film are employed, the contrast value shown in the present invention represents relatively the difference in contrasts due to any differences in the retardation films.

TABLE 3

| Retardation Film No. | Contrast | Remarks |
|---|---|---|
| 101 | 1000 | Present Invention |
| 102 | 980 | Present Invention |
| 103 | 930 | Present Invention |
| 104 | 1000 | Present Invention |
| 105 | 950 | Present Invention |
| 106 | 970 | Present Invention |
| 107 | 920 | Present Invention |
| 201 | 780 | Comparative |
| 202 | 800 | Comparative |
| 203 | 750 | Comparative |

The contrast of Liquid Crystal Displays 201-203 employing the Comparative retardation films was between 700 and 800. On the other hand, the contrast of Liquid Crystal Displays 101-107 of the present invention was in the range of 900-1,000, indicating that the contrast was markedly enhanced.

It is common knowledge that contrast decreases due to the shift of the slow axis in the plane of a film. However, Retardation Films 101-107 and Retardation Films 201-203, prepared as above, exhibited a shift of the slow axis in the lateral direction in the plane of the film within 0.1 degree.

Example 2

Preparation of Cellulose Ester Based Fused Film (Employed Materials)

| <Cellulose Ester> | |
|---|---|
| C-1. Cellulose acetate propionate: degree of acetyl substitution of 1.9, degree of propionyl group substitution of 0.7, molecular weight Mn of 70,000, molecular weight Mw of 200,000, and Mw/Mn of 2.9 | 100 parts by weight |
| <Plasticizer> | |
| P-1. Compound 7 exemplified below | 15 parts by weight |

(Synthesis of Compound 7 Exemplified Below)

While stirring a mixed solution of 27 parts by weight of trimethylolpropane, 111 parts by weight of pyridine, and 300 parts by weight of ethyl acetate, which was maintained at 10° C., a solution, prepared by dissolving 180 parts by weight of acetylsalicyl chloride in 200 parts by weight of ethyl acetate, was dripped over 30 minutes. Thereafter, the resulting mixture was heated to 80° C. and stirred for 5 hours. After complete reaction, the temperature was lowered to room temperature and precipitates were collected via filtration. Thereafter, washing was carried out by the addition of a 1 mol/L aqueous HCl solution and washing was further carried out by the addition of a 1% by weight aqueous $Na_2CO_3$ solution. Subsequently, the organic phase was separately collected, followed by distilling out ethyl acetate, whereby a 99 parts by weight transparent liquid was obtained (at a yield of 80%). The molecular weight of the resulting compound was 621.

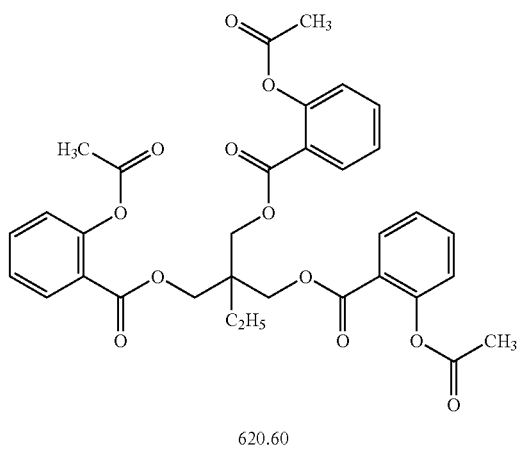

Exemplified Compound 7

620.60

| <Antioxidant> | |
|---|---|
| A-1. IRGANOX-1010 (produced by Ciba Specialty Chemicals Co. | 1 part by weight |

| <UV Absorber> | |
|---|---|
| UV-1: LA31 (at a weight average molecular weight of 486 and a molar absorption coefficient of 6,780 at 380 nm, produced by Asahi Denka K.K.) | 2 parts by weight |

The above cellulose ester was thermally treated at 120° C. for one hour and was allowed to cool to room temperature in $N_2$. Subsequently, a plasticizer was added in the above amount with respect to 100 parts by weight of the dried cellulose resin, and further, each of the additives (being the antioxidant and the UV absorber) in the above amount. The resulting mixture was blended via a HENSCHEL mixer, and was subjected to production of pellets while heated, employing an extruder. The resulting pellets were allowed to cool.

The above pellets were dried at 120° C. and heat-melted at a melting temperature of 230° C. In a melt state, filtration was carried out employing a filter. Subsequently, a cellulose ester film, to be employed for a polarizing plate protective film of a liquid crystal display (LCD), was prepared through a die at a targeted thickness of 80 μm.

Employed as the above filter was FILTER FINE PORE, produced by Nippon Seisen Co. Ltd., at a capturing size of at most 15 μm, which was prepared by the fiber composed of sintered stainless steel fibers.

Casting was carried out as follows. Extrusion molding was carried out through a T-type die. A film was stretched at 158° C. by a factor of 1.1 in the longitudinal direction via a take-up roller. Subsequently, both edges were held via a tenter, and each of the films was stretched under the same conditions as Retardation Film 101 of the present invention prepared in Example 1 and Retardation Film 201 of Comparative Example. After stretching, while carrying out relaxation and cooling, both edges in lateral direction were removed via slitting. After cooling to room temperature (being 20° C.), 10

μm high and 1.5 cm wide knurling was conducted on both edges, and winding was carried out, whereby Retardation Film 301 and Comparative Retardation Film 302 were prepared which exhibited a roll width of 1.4 m, a film thickness of 80 μm, retardation values Ro of 45 nm, and Rt of 130 nm.

(Preparation of Cycloolefin Based Polymer Film)

Under a nitrogen ambience, 500 parts of dehydrated cyclohexane, 1.2 parts of 1-hexane, 0.15 part of dibutyl ether, and 0.30 part of triisobutyl aluminum were charged into a reaction vessel. After blending, while maintaining 45° C., a norbornene based monomer mixture, composed of 20 parts of tricyclo[4.3.0.12,5]deca-3,7-diene (dicyclopentadiene, hereinafter abbreviated as DCP), 140 parts of 1,4-methano-1,4,4a,9a-tetrahydrofluorene (hereinafter abbreviated as MTF), 40 parts of 8-methyl-tetracyclo[4.4.0.12,5.17,10]-dodeca-3-ene (hereinafter abbreviated as MTD), and 40 parts of tungsten hexachloride (being a 0.7% toluene solution) were continuously added over two hours, whereby polymerization was carried out. By adding 1.06 parts of butyl glycidyl ether and 0.52 part of isopropyl alcohol to the polymerization solution, polymerization catalysts were inactivated to terminate the polymerization reaction.

Subsequently, 270 parts of cyclohexane were added to 100 parts of the reaction solution incorporating the resulting ring opening polymer, and 5 parts of a nickel-alumina catalyst (Nikki Chemical Co., Ltd.) were further added as a hydrogenation catalyst. While stirring, under 5 MPa pressure, employing hydrogen, the mixture was heated to 200° C. Thereafter, reaction was carried out for 4 hours, whereby a reaction solution incorporating a 20% hydrogenated DCP/MTF/MTD ring opening polymer. After removing the hydrogenation catalyst via filtration, a soft polymer (SEPTON 2002 produced by Kuraray Co., Ltd.) and an antioxidant (IRGANOX 1010, produced by Ciba Specialty Chemicals Co.) were added (0.1 part of each per 100 parts of the polymer) to the resulting solution and allowed to dissolve. Subsequently, cyclohexane and other vaporizing components as a solvent were removed from the solution, employing a cylinder-type thickening dryer (produced by Hitachi, Ltd.), and the hydrogenated polymer in a melted state was extruded from the extruder in the form of strands, palletized after cooling, and recovered. The copolymerization ratio of each norbornene based monomer in the polymer was calculated based on the residual norbornene composition (based on gas chromatography) in the solution after polymerization, resulting in DCP/MTF/MTD=10/70/20, which was nearly equal to the formulated composition. The hydrogenated ring opening polymer exhibited a weight average molecular weight (Mw) of 31,000, a molecular weight distribution (Mw/Mn) of 2.5, a hydrogenation ratio of 99.9%, and a Tg of 134° C.

Prepared pellets of the hydrogenated ring opening polymer were dried at 70° C. for two hours, employing a hot air circulating dryer. Subsequently, the above pellets were subjected to melt extrusion molding, employing a uniaxial extruder at a lip width of 1.5 m, incorporating a coat hanger type T-die (in which the screw diameter was 90 mm, the material of the T-die grip section was of tungsten carbide, and the peeling strength to fused resins was 44N, produced by Mitsubishi Heavy Industries, Ltd.), whereby a 2,500 m long and 90 μm thick ring opening olefin resin film was prepared. Extrusion molding was carried out in a clean room of Class 10,000 or less under molding conditions at a melt resin temperature of 240° C. and a T die temperature of 240° C. The above film was peeled under the conditions of a peeling tension of 105 N/m and a cold air flow temperature of 23° C. in the same manner as Retardation Film 101, and was stretched under the same conditions as Retardation Film 101 of the present invention and Comparative Retardation Film 201. Both edges of the resulting cycloolefin resin film were slit to result in a width of 1.4 m, whereby Retardation Film 401 of the present invention and Comparative Retardation Film 402 at a thickness of 80 μm were prepared. Retardation values Ro and Rt of each were 50 nm and 140 nm, respectively. During winding, a polyester film was simultaneously wound together as a protective film.

(Preparation of Polycarbonate Based Film)

| <Dope Composition> | |
|---|---|
| Polycarbonate resin (Bisphenol Type A at an average molecular weight of 40,000) | 100 parts by weight |
| 2-(2'-hydroxy-3',5'-di-t-butylphenyl)benzotriazole | 1.0 part by weight |
| Methylene chloride | 430 parts by weight |
| Methanol | 90 parts by weight |

The above components were charged into a sealed vessel and while stirring at 80° C. under application of pressure, were completely dissolved, whereby a dope composition was prepared.

Subsequently, the above dope composition was filtered, cooled and maintained at 33° C., cast uniformly onto a stainless steel band, and subsequently dried at 33° C. for 5 minutes. When peeled from the stainless steel band, the peeling was carried out in the same manner as Retardation Film 101 under conditions of a peeling tension of 120 N/m, a residual solvent amount of 45% by weight, and a cold air flow temperature of 23° C. By holding both edges via a tenter, stretching was carried out under the same conditions as Retardation Film 101 of the present invention and Comparative Retardation Film 201. Both edges of the resulting polycarbonate resin film were slit to result in a width of 1.4 m, whereby Retardation Film 501 of the present invention and Comparative Retardation Film 502 at a thickness of 80 μm were prepared. Retardation values Ro and Rt of each were 48 nm and 143 nm, respectively.

By employing resulting Retardation Films 301, 302, 401, 402, 501, and 502, polarizing plates and liquid crystal displays were prepared in the same manner as Example 1, and the front contrast was evaluated.

As a result, it was found that the contrast of Liquid Crystal Displays 302, 402, and 502, employing the Comparative Retardation Films, was 700-800, and the contrast of Liquid Crystal Displays 301, 401, and 501 of the present invention was in the range of 900-1,000, exhibiting significant improvement in contrast.

Example 3

A retardation film was prepared in the same manner as Example 1, except that the tenter stretching apparatus employed in Example 1 was replaced with a tenter stretching apparatus capable of independently controlling the left and right web holding distance (being the distance from the holding initiation to the holding termination), and the front contrast of the resulting liquid cryptal display was evaluated in the same manner as Example 1, whereby it was found that the retardation film of the present invention resulted in enhancement in the front contrast which was equal to or better than that of Retardation Films 101-107 of the present invention of Example 1.

What is claimed is:

1. A method of producing a long roll retardation film comprising the sequential steps of:
   (a) casting a film forming material on an endless support to form a long roll film;
   (b) stretching the long roll film in a lateral direction of the long roll film while both edges of the long roll film are held employing a plurality of clips for each of the edges in a tenter, the step (b) being designated as First Process;
   (c) reducing distances in the lateral direction between the clips holding the both edges of the long roll film while the edges of the long roll film are held continuously from First Process with the clips, the step (c) being designated as Second Process; and
   (d) enlarging the distances in the lateral direction between the clips holding the both edges of the long roll film while the edges of the long roll film are held continuously from Second Process with the clips, the step (d) being designated as Third Process, wherein
   (i) a stretching ratio of the long roll film in First Process is 1.01 to 1.10;
   (ii) a stretching ratio of the long roll film in Second Process is 0.90 to 0.99 based on a width of the long roll film stretched in First Process;
   (iii) a stretching ratio of the long roll film in Third Process is 1.15 to 2.0 based on a width of the long roll film stretched in Second Process;
   (iv) distances in the lateral direction between the clips are reduced while the edges of the long roll film are continuously held after Third Process is over,
   wherein the long roll retardation film has a thickness of 20 to 200 μm and an in-plane retardation Ro of 100 nm or less,
   wherein the long roll film is one of a cellulose ester type film, a cycoolefin polymer film, a polycarbonate type film, and a polysulfon type film, and
   wherein the long roll retardation film has a front contrast of 900 or more.

2. The method of claim 1, wherein the long roll film is stretched in First Process so that a stretching force does not to exceed a yield point of the long roll film.

3. The method of claim 1, wherein the long roll retardation film is a cellulose ester film.

4. The method of claim 2, wherein the long roll retardation film has a thickness of 20 to 60 μm.

5. The method of claim 1, wherein the long roll retardation film has an in-plane retardation Ro of 30 to 100 nm.

6. The method of claim 1, wherein the long roll retardation film has a thickness-direction retardation Rt of 70 to 300 nm.

7. The method of claim 1, wherein a shift of a slow axis in a lateral direction in a plane of the long roll retardation film is within 0.1 degree.

* * * * *